US012393159B2

(12) United States Patent
Ota et al.

(10) Patent No.: US 12,393,159 B2
(45) Date of Patent: Aug. 19, 2025

(54) IMAGE FORMING APPARATUS HAVING SEPARATION GEAR TRAIN, FIXING GEAR TRAIN AND ADJUSTING GEAR TRAIN OPERATED BY A COMMON MOTOR

(71) Applicant: BROTHER KOGYO KABUSHIKI KAISHA, Nagoya (JP)

(72) Inventors: Shuji Ota, Okazaki (JP); Shoichiro Nishimura, Yokkaichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/419,711

(22) Filed: Jan. 23, 2024

(65) Prior Publication Data

US 2024/0255894 A1 Aug. 1, 2024

(30) Foreign Application Priority Data

Jan. 27, 2023 (JP) ................................ 2023-011103
Jan. 27, 2023 (JP) ................................ 2023-011104
Jan. 27, 2023 (JP) ................................ 2023-011105
Jan. 27, 2023 (JP) ................................ 2023-011106

(51) Int. Cl.
*G03G 21/18* (2006.01)
*G03G 15/00* (2006.01)
*G03G 15/20* (2006.01)
*G03G 21/16* (2006.01)

(52) U.S. Cl.
CPC ..... *G03G 21/1857* (2013.01); *G03G 15/2017* (2013.01); *G03G 15/2064* (2013.01); *G03G 15/6573* (2013.01); *G03G 21/1647* (2013.01)

(58) Field of Classification Search
None
See application file for complete search history.

(56) References Cited

U.S. PATENT DOCUMENTS

2014/0169833 A1 6/2014 Kawamura et al.
2020/0310281 A1 10/2020 Haruta et al.
2021/0311428 A1 10/2021 Yamaguchi et al.

FOREIGN PATENT DOCUMENTS

JP 2004-317811 A 11/2004
JP 2014-089358 A 5/2014
JP 2014-134780 A 7/2014
JP 2015-064511 A 4/2015
JP 2020-160405 A 10/2020
JP 2021-110847 A 8/2021
JP 2022-108579 A 7/2022

*Primary Examiner* — Arlene Heredia
(74) *Attorney, Agent, or Firm* — Merchant & Gould P.C.

(57) ABSTRACT

An image forming apparatus including a photosensitive drum, a development roller, a separation cam, a fixing device, an adjusting cam, a main motor, a separation gear train, a fixing gear train, and an adjusting gear train. The development roller is movable relative to the photosensitive drum between a contact position and a separate position. The adjusting cam switches a nip pressure of the fixing device between first and second pressures. The separation gear train transmits a driving force of the main motor to the separation cam. The fixing gear train transmits the driving force of the main motor received from the separation gear train to the fixing device. The adjusting gear train transmits the driving force of the main motor received from the separation gear train to the adjusting cam.

18 Claims, 24 Drawing Sheets

IMAGE FORMING APPARATUS HAVING SEPARATION GEAR TRAIN, FIXING GEAR TRAIN AND ADJUSTING GEAR TRAIN OPERATED BY A COMMON MOTOR

REFERENCE TO RELATED APPLICATIONS

This application claims priority from Japanese Patent Application Nos. 2023-011103, 2023-011104, 2023-011105, and 2023-011106 filed on Jan. 27, 2023. The entire contents of the priority applications are incorporated herein by reference.

BACKGROUND ART

An image forming apparatus including a first cam configured to cause a development roller to be located selectively in contact with and apart from a photosensitive drum, and a second cam configured to switch a nip pressure of a heating roller and a pressure roller of a fixing device is known in the art.

An image forming apparatus including a first photosensitive drum, a second photosensitive drum located upstream of the first photosensitive drum in a sheet conveyance direction, a first development roller configured to supply toner to the first photosensitive drum, a second development roller configured to supply toner to the second photosensitive drum, and a separation mechanism is also known in the art. The separation mechanism is configured to cause the first development roller to move between a contact position in which the first development roller is in contact with the first photosensitive drum and a separate position in which the first development roller is separate from the first photosensitive drum, and to cause the second development roller to move between a contact position in which the second development roller is in contact with the second photosensitive drum and a separate position in which the second development roller is separate from the second photosensitive drum. In this image forming apparatus, the second development roller moves from the contact position to the separate position when the first development roller is located in the contact position.

An image forming apparatus including development rollers for multiple colors, a development roller for black, a process motor, and a gear train configured to transmit a driving force of the process motor to the development rollers for multiple colors is also known in the art. In this image forming apparatus, the gear train is located upstream of the development rollers for multiple colors, and a moving gear configured to swing to a transmit position in which the driving force is transmitted and to a disconnect position in which the transmission of the driving force is disconnected is provided.

An image forming apparatus including a cam rotatable about an axis parallel to a rotation axis of the development roller configured to thereby cause the development roller to move between a contact position in which the development roller is in contact with the photosensitive drum and a separate position in which the development roller is separate from the photosensitive drum, and a cam follower slidable in a direction parallel to the rotation axis, is known in the art. In this image forming apparatus, the cam follower slides according to the rotation of the cam, pushes a development cartridge including the development roller to move the development roller from the contact position to the separate position, and separates from the development cartridge, thereby causing the development roller to move from the separate position to the contact position.

SUMMARY

In an image forming apparatus, reducing the number of motors is desirable.

Thus, the development roller, a fixing device, and a fixing device, being operated by one motor is desirable.

Also, when a toner image is being transferred from a first photosensitive drum to a sheet under a state in which a first development roller is located in the contact position, a position of a sheet may be shifted undesirably due to an undesirable shift of the position of a second photosensitive drum by a second development roller moving from a contact position to a separate position. Also, the position of the first photosensitive drum may be shifted undesirably when an impact that occurs by the second development roller moving from the contact position to the separate position is transmitted to the first photosensitive drum. Therein, the relative positions of the sheet and the first photosensitive drum are shifted undesirably, and the image quality is degraded.

Thus, the second development roller not moving from the contact position to the separate position while the first development roller is located in the contact position is desirable.

Also an image forming apparatus may include a member for moving the moving gear to control the position of the moving gear. The design of the shape of such a member for moving the moving gear may desirably have a high degree of freedom is desirable.

Thus, increasing the degree of freedom of the design of the shape of the member for moving the moving gear is desirable.

Also, if a backlash of a gear for transmitting a driving force to a cam is large, the cam follower may slide suddenly when the development roller starts moving from the separate position to the contact position.

Thus, restraining a sudden slide of a cam follower is desirable.

In one aspect, an image forming apparatus comprises a first photosensitive drum, a first development roller, a first separation cam, a fixing device, an adjusting cam, a main motor, a separation gear train, a fixing gear train, and an adjusting gear train.

The first development roller is movable relative to the first photosensitive drum between a contact position in which the first development roller is in contact with the first photosensitive drum and a separate position in which the first development roller is separate from the first photosensitive drum.

The first separation cam is configured to move the first development roller between the contact position and the separate position when receiving a driving force.

The fixing device comprises a heating portion and a pressure portion. The fixing device is configured to convey a sheet nipped between the heating portion and the pressure portion upon receipt of a driving force.

The adjusting cam is configured to switch a nip pressure to be produced by the heating portion and the pressure portion between a first nip pressure and a second nip pressure higher than the first nip pressure when receiving of a driving force.

The separation gear train is configured to transmit a driving force of the main motor to the first separation cam.

The fixing gear train is configured to transmit the driving force of the main motor received from the separation gear train to the fixing device.

The adjusting gear train is configured to transmit the driving force of the main motor received from the separation gear train to the adjusting cam.

With this image forming apparatus comprising the separation gear train, the fixing gear train, and the adjusting gear train, the development roller, the fixing device, and the adjusting cam can be operated by one motor.

The fixing gear train may comprise an output gear and a moving gear.

The output gear outputs the driving force to the fixing device.

The moving gear is capable of being moved, when receiving a driving force from the main motor, between a transmit position in which the moving gear is engaged with the output gear and a disconnect position in which the moving gear is disengaged from the output gear.

By the use of the moving gear for switching the transmission and disconnection of the driving force of the main motor to the fixing device, the cost can be reduced.

The main motor may be a motor rotatable in forward and reverse directions, and the image forming apparatus may be configured such that the moving gear is located in the transmit position when the main motor rotates in the forward direction, and is located in the disconnect position when the main motor rotates in the reverse direction.

By locating the moving gear in the transmit position when the main motor rotates in the forward direction, the fixing device is made able to convey a sheet. By locating the moving gear in the disconnect position when the main motor rotates in the reverse direction, the driving force of the main motor can be stopped from being transmitted to the fixing gear.

The image forming apparatus may be configured to further comprise an electromagnetic clutch switchable to a transmit state in which the driving force of the main motor is transmitted from the separation gear train to the adjusting gear train, and a disconnect state in which the driving force of the main motor is not transmitted from the separation gear train to the adjusting gear train.

The adjusting gear train may include a clutch connecting gear configured to rotate when the electromagnetic clutch is in the transmit state. The clutch connecting gear rotates about an axis that is coaxial with an axis of a gear included in the separation gear train.

With the clutch connecting gear rotating about the axis that is coaxial with the axis of the gear included in the separation gear train, the gear train can be arranged more compactly.

The first separation cam may be configured to move the first development roller between the contact position and the separate position when receiving a driving force.

The image forming apparatus may be configured to comprise a first development cartridge and a first cam follower.

The first development cartridge includes the first development roller, the first development cartridge being movable relative to the first photosensitive drum between a first position in which the first development roller is located in the contact position, and a second position in which the first development roller is located in the separate position.

The first cam follower is slidable according to rotation of the first separation cam, in a direction parallel to a rotation axis of the first separation cam between a push position in which the first cam follower pushes and causes the first development cartridge to be located in the second position and a no-push position in which the first development cartridge is located in the first position.

The image forming apparatus may be configured such that the main motor is rotatable in forward and reverse direction, and the first separation cam is configured to move the first development roller from the separate position to the contact position when the main motor rotates in the forward direction, and move the first development roller from the contact position to the separate position when the main motor rotates in the reverse direction.

With the separation cam used by switching the rotation direction, the shape of the separation cam can be designed more freely. The separation cam can also be made smaller in size, and the image forming apparatus can be made smaller in size.

The moving gear may be configured to be located in the transmit position when the main motor rotates in the forward direction and located in the disconnect position when the main motor rotates in the reverse direction.

By locating the moving gear in the transmit position when the main motor rotates in the forward direction, the sheet can be conveyed by the fixing device. Also, by locating the moving gear in the disconnect position when the main motor rotates in the reverse direction, the driving force of the main motor can be stopped from being transmitted to the fixing device.

The image forming apparatus may be configured such that the heating portion includes a heating roller, and the pressure portion is a pressure roller configured to nip a sheet between the heating roller and the pressure roller. The fixing gear train may be configured to transmit the driving force of the main motor received from the separation gear train to the heating roller.

The image forming apparatus may be configured to comprise a sheet feeder mechanism configured to feed a sheet to the first photosensitive drum upon receipt of a driving force, a sheet feeder gear train configured to transmit the driving force of the main motor to the sheet feeder mechanism, and a motor gear provided on an output shaft of the main motor. The motor gear is engaged with a gear included in the separation gear train and a gear included in the sheet feeder gear train.

With the motor gear being engaged with both the gear included in the separation gear train and the gear included in the sheet feeder gear train, the driving force of the main motor can be directly transmitted to both the separation gear train and the sheet feeder gear train.

The image forming apparatus may further comprise a process motor configured to drive the first photosensitive drum and the first development roller.

The image forming apparatus may further comprise an ejection roller configured to eject a sheet conveyed out from between the heating portion and the pressing portion upon receipt of the driving force of the main motor from the fixing gear train.

With the ejection roller configured to receive the driving force of the main motor from the fixing gear train, the ejection roller can be driven by the main motor.

The image forming apparatus may further comprise a second photosensitive drum, a second development roller, and a second separation cam.

The second development roller is movable relative to the second photosensitive drum between a contact position in which the second development roller is in contact with the second photosensitive drum and a separate position in which the second development roller is separate from the second photosensitive drum.

The second separation cam is configured to move the second development roller between the contact position and the separate position when receiving a driving force.

The first separation cam is configured to receive a driving force to rotate and move the first development roller between the contact position and the separate position, and the second separation cam is configured to receive a driving force to rotate and move the second development roller between the contact position and the separate position. The separation gear train may include a first separation gear train configured to transmit the driving force of the main motor to the first separation cam, and a second separation gear train configured to transmit the driving force of the main motor received from the first separation gear train to the second separation cam.

In another aspect, an image forming apparatus is disclosed herein which comprises a first photosensitive drum, a first development roller, a first separation cam, a fixing device, an adjusting cam, a main motor, a separation gear train, a fixing gear train, and an adjusting gear train.

The first development roller is movable relative to the first photosensitive drum between a contact position in which the first development roller is in contact with the first photosensitive drum and a separate position in which the first development roller is separate from the first photosensitive drum.

The first separation cam is configured to move the first development roller between the contact position and the separate position when receiving a driving force.

The fixing device comprises a heating roller and a pressure roller. The fixing device may be configured to convey a sheet nipped between the heating roller and the pressure roller when receiving a driving force.

The adjusting cam is configured to switch a nip pressure to be produced by the heating roller and the pressure roller between a first nip pressure and a second nip pressure higher than the first nip pressure when receiving a driving force.

The separation gear train is configured to transmit a driving force of the main motor to the first separation cam.

The fixing gear train is configured to transmit the driving force of the main motor received from the separation gear train to the fixing device.

The adjusting gear train is configured to transmit the driving force of the main motor received from the separation gear train to the adjusting cam.

With this image forming apparatus comprising the separation gear train, the fixing gear train, and the adjusting gear train, contact and separation of the development roller, drive of the fixing device, and the switching of the adjusting cam can be operated by one motor.

The image forming apparatus may further comprise a second photosensitive drum, a second development roller, a separation mechanism, and a controller.

The second photosensitive drum is located downstream of the first photosensitive drum in a direction of conveyance of a sheet.

The second development roller is movable relative to the second photosensitive drum between a contact position in which the second development roller is in contact with the second photosensitive drum and a separate position in which the second development roller is separate from the second photosensitive drum.

The separation mechanism includes a first separation cam configured to rotate and thereby cause the first development roller to move between the contact position and the separate position, and a second separation cam configured to rotate and thereby cause the second development roller to move between the contact position and the separate position.

In this instance, the controller may be configured to exercise control over the separation mechanism such that while the first development roller is located in the contact position, the second development roller located in the separate position is moved from the separate position to the contact position, and thereafter moved from the contact position to the separate position.

Because the first development roller located in the separate position is moved from the separate position to the contact position and thereafter the moved from the contact position to the separate position, while the second development roller is located in the contact position, the second development roller does not move from the contact position to the separate position while the first development roller is located in the contact position.

The controller may be configured to exercise control over the separation mechanism such that the first development roller is moved from the separate position to the contact position and thereafter the second development roller is moved from the separate position to the contact position. The controller may be also configured to exercise control over the separation mechanism such that the second development roller is moved from the contact position to the separate position, and thereafter the first development roller is moved from the contact position to the separate position.

The main motor may be a motor that drives the separation mechanism and is configured to rotate in forward and reverse directions.

In this instance, when the main motor rotates in the forward direction, the controller exercises control over the separation mechanism such that the first development roller is moved from the separate position to the contact position, and thereafter the second development roller is moved from the separate position to the contact position, and when the main motor rotates in the reverse direction, the controller exercises control over the separation mechanism such that the second development roller is moved from the contact position to the separate position, and thereafter the first development roller is moved from the contact position to the separate position.

Because the rotation direction of the separation cam of the separation mechanism is switchable depending on the direction (forward or reverse) of the main motor, the shape of the separation cam can be designed more freely. The separation cam can also be made smaller in size. Therefore, the image forming apparatus can be made smaller in size.

The image forming apparatus may be configured to further comprise a first development cartridge and a second development cartridge, and the separation mechanism may comprise a first cam follower and a second cam follower.

The first development cartridge includes the first development roller, and is movable relative to the first photosensitive drum between a first position in which the first development roller is located in the contact position and a second position in which the first development roller is located in the separate position.

The second development cartridge includes the second development roller, and is movable relative to the second photosensitive drum between a first position in which the second development roller is located in the contact position and a second position in which the second development roller is located in the separate position.

The first cam follower is configured to slide, according as the first separation cam rotates, in a direction parallel to a rotation axis of the first separation cam, between a push position in which the first cam follower presses and causes the first development cartridge to be located in the second position and a no-push position in which the first development cartridge is located in the first position.

The second cam follower is configured to slide, according as the second separation cam rotates in a direction parallel to a rotation axis of the second separation cam, between a push position in which the second cam follower presses and causes the second development cartridge to be located in the second position and a no-push position in which the second development cartridge is located in the first position.

In yet another aspect, an image forming apparatus disclosed herein comprises a first photosensitive drum, a second photosensitive drum, a first development roller, a second development roller, a separation mechanism, and a controller.

The second photosensitive drum is located upstream of the first photosensitive drum in a sheet conveyance direction.

The first development roller is movable relative to the first photosensitive drum between a contact position in which the first development roller is in contact with the first photosensitive drum and a separate position in which the first development roller is separate from the first photosensitive drum.

The second development roller is movable relative to the second photosensitive drum between a contact position in which the second development roller is in contact with the second photosensitive drum and a separate position in which the second development roller is separate from the second photosensitive drum.

The separation mechanism includes a first separation cam configured to rotate and thereby cause the first development roller to move between the contact position and the separate position, and a second separation cam configured to rotate and thereby cause the second development roller to move between the contact position and the separate position.

The controller is configured to exercise control over the separation mechanism such that while the second development roller is located in the contact position, the first development roller located in the separate position is moved from the separate position to the contact position, and thereafter moved from the contact position to the separate position.

Because the first development roller located in the separate position is moved from the separate position to the contact position and thereafter the moved from the contact position to the separate position, while the second development roller is located in the contact position, the second development roller does not move from the contact position to the separate position while the first development roller is located in the contact position.

The controller may be configured to exercise control over the separation mechanism such that the second development roller is moved from the separate position to the contact position and thereafter the first development roller is moved from the separate position to the contact position. The controller may be also configured to exercise control over the separation mechanism such that the first development roller is moved from the contact position to the separate position, and thereafter the second development roller is moved from the contact position to the separate position The image forming apparatus may further comprise a main motor that drives the separation mechanism. The main motor is configured to rotate in forward and reverse directions.

In this instance, the controller may be configured to exercise control over the separation mechanism such that when the main motor rotates in the forward direction, the first development roller is moved from the separate position to the contact position, and thereafter the second development roller is moved from the separate position to the contact position, and when the main motor rotates in the reverse direction, the second development roller is moved from the contact position to the separate position, and thereafter the first development roller is moved from the contact position to the separate position.

Because the rotation direction of the separation cam of the separation mechanism is switchable depending on the direction (forward or reverse) of the main motor, the shape of the separation cam can be designed more freely. The separation cam can also be made smaller in size. Therefore, the image forming apparatus can be made smaller in size.

The image forming apparatus may be configured to further comprise a first development cartridge and a second development cartridge, and the separation mechanism may further comprise a first cam follower and a second cam follower.

The first development cartridge includes the first development roller, and is movable relative to the first photosensitive drum between a first position in which the first development roller is located in the contact position and a second position in which the first development roller is located in the separate position.

The second development cartridge includes the second development roller, and is movable relative to the second photosensitive drum between a first position in which the second development roller is located in the contact position and a second position in which the second development roller is located in the separate position.

The first cam follower is configured to slide, according as the first separation cam is rotated, in a direction parallel to a rotation axis of the first separation cam, between to be located in the second position and a no-push position in which the first development cartridge is located in the first position.

The second cam follower is configured to slide, according as the second separation cam is rotated in a direction parallel to a rotation axis of the second separation cam, between a push position in which the second cam follower pushes and causes the second development cartridge to be located in the second position and a no-push position in which the second development cartridge is located in the first position.

The first separation cam may include a first cam portion protruding in a direction parallel to a rotation axis of the first separation cam and the second separation cam may include a second cam portion protruding in a direction parallel to a rotation axis of the second separation cam.

The first cam portion has a first retaining surface configured to retain the first cam follower in the push position, and a first guide surface configured to guide the first cam follower between the push position and the no-push position, the first guide surface being inclined with respect to a plane perpendicular to a rotation axis of the first separation cam.

The second cam portion has a second retaining surface configured to retain the second cam follower in the push position, and a second guide surface configured to guide the second cam follower between the push position and the no-push position, the second guide surface being inclined with respect to a plane perpendicular to a rotation axis of the second separation cam.

The controller is configured to execute a printing process in a first printing mode in which an image is formed on a sheet using both the first development roller and the second development roller, and a second printing mode in which image is formed on a sheet using only the first development roller. The controller in the first printing mode is configured to exercise control over the separation mechanism such that the second development roller is moved from the separate position to the contact position, and thereafter the first development roller is moved from the separate position to the contact position. The controller may also be configured to exercise control over the separation mechanism such that the first development roller is moved from the contact position to the separate position, and thereafter the second development roller is moved from the contact position to the separate position.

When executing a printing process in the first printing mode, the time for which the first development roller (i.e., the development roller more frequently used because the first development roller is used in both the first printing mode and the second printing mode) is in contact with the first photosensitive drum can be made shorter in that the first development roller contacts the first photosensitive drum after the second development roller contacts the second photosensitive drum and the first development roller separates from the first photosensitive drum before the second development roller separates from the second photosensitive drum. Thus, the toner used in the first development roller and the first development roller can be made long-lasting.

The image forming apparatus may be configured to further comprise a main motor, a first electromagnetic clutch, and a second electromagnetic clutch.

The controller is configured to exercise control over the first electromagnetic clutch to switch to a transmit state in which a driving force from the main motor is transmitted to the first separation cam and to a disconnect state in which the driving force from the main motor is not transmitted to the first separation cam.

The controller is configured to exercise control over the second electromagnetic clutch to switch to a transmit state in which the driving force from the main motor is transmitted to the second separation cam and to a disconnect state in which the driving force from the main motor is not transmitted to the second separation cam.

The first electromagnetic clutch regulates the motion of the first separation cam and the second electromagnetic clutch regulates the motion of the second separation cam, such that the contact and separation of each development roller can be controlled more precisely.

The image forming apparatus may be configured to further comprise a main motor and a third electromagnetic clutch.

The controller is configured to exercise control over the third electromagnetic clutch to switch to a transmit state in which a driving force of the main motor is transmitted to the first separation cam and the second separation cam, and a disconnect state in which the driving force of the main motor is not transmitted to the first separation cam and the second separation cam.

The third electromagnetic clutch regulates the motion of the first separation cam and the second separation cam, the cost can be reduced.

The image forming apparatus may further comprise a fixing device for fixing a toner image transferred to a sheet, and a fixing gear train configured to transmit a driving force of the main motor to the fixing device.

The fixing gear train may comprise an output gear and a moving gear.

The output gear outputs the driving force to the fixing device.

The moving gear is a gear capable of being moved, when receiving a driving force, relative to the output gear between a transmit position in which the moving gear is engaged with the output gear and a disconnect position in which the moving gear is disengaged from the output gear.

The moving gear is located in the transmit position when the main motor rotates in the forward direction, and located in the disconnect position when the main motor rotates in the reverse direction.

With this configuration in which the moving gear is located in the disconnect position when the main motor rotates in the reverse direction, the driving force of the main motor is not transmitted to the fixing device.

The image forming apparatus may further comprise a fixing gear, an adjusting cam, and a fourth electromagnetic clutch.

The fixing device may comprise a heating portion and a pressure portion. The fixing device may be configured to convey a sheet nipped between the heating portion and the pressure portion when receiving a driving force.

The adjusting cam may be configured to switch a nip pressure to be produced by the heating portion and the pressure portion between a first nip pressure and a second nip pressure higher than the first nip pressure.

The fourth electromagnetic clutch is configured to switch to a transmit state in which a driving force from the main motor is transmitted to the adjusting cam, and a disconnect state in which the driving force from the main motor can be interrupted so as not to be transmitted to the adjusting cam.

With this configuration in which the fourth electromagnetic clutch is in the disconnect state when the main motor rotates in the reverse direction, the driving force of the main motor is not transmitted to the adjusting cam.

The image forming apparatus may be further configured to comprise a third photosensitive drum, a fourth photosensitive drum, a third development roller, and a fourth development roller. The separation mechanism may be configured to further include a third separation cam and a fourth separation cam.

The third photosensitive drum is located upstream of the second photosensitive drum in the direction of conveyance of a sheet.

The fourth photosensitive drum is located upstream of the third photosensitive drum in the direction of conveyance of a sheet.

The third development roller is movable relative to the third photosensitive drum between a contact position in which the third development roller is in contact with the third photosensitive drum and a separate position in which the third development roller is separate from the third photosensitive drum.

The fourth development roller is movable relative to the fourth photosensitive drum between a contact position in which the fourth development roller is in contact with the fourth photosensitive drum and a separate position in which the fourth development roller is separate from the fourth photosensitive drum.

The third separation cam is configured to rotate and thereby cause the third development roller to move between the contact position and the separate position.

The fourth separation cam is configured to rotate and thereby cause the fourth development roller to move between the contact position and the separate position.

In this instance, the controller is configured to exercise control over the separation mechanism such that the fourth, third, second and first development rollers each located in the corresponding separate position are moved to the corresponding contact position one after another in this order. The controller is also configured to exercise control over the separation mechanism such that the first, second, third and fourth development rollers each located in the corresponding contact position are moved from to the separate position one after another in this order.

The image forming apparatus may be configured to comprise a housing having an opening and a drawer.

The drawer is movable through the opening of the housing between an inside position in which the drawer is installed in the housing and an outside position in which at least a part of the drawer is exposed. The drawer includes a frame by which the first development cartridge and the second development cartridge in a manner that permits each of the cartridges to be installed therein and removed therefrom.

The frame may be configured to support the first photosensitive drum and the second photosensitive drum in a manner that renders each of the photosensitive drums rotatable.

In yet another aspect, an image forming apparatus comprises a first photosensitive drum, a first development roller, a process motor, a first development roller gear train, a first separation cam, and a main motor.

The first development roller is movable relative to the first photosensitive drum between a contact position in which the first development roller is in contact with the first photosensitive drum and a separate position in which the first development roller is separate from the first photosensitive drum.

The process motor drives the first photosensitive drum and the first development roller.

The first development roller gear train transmits the driving force of the process motor to the first development roller.

The first separation cam is configured to rotate and thereby cause the first development roller to move between the contact position and the separate position.

The main motor is a motor that drives the first separation cam and is rotatable in forward and reverse directions.

The first development roller gear train includes a first output gear and a moving gear.

The first output gear outputs a driving force to the first development roller.

The moving gear is a gear capable of being moved, when receiving a driving force from the process motor, between a first transmit position in which the moving gear is engaged with the first output gear and a first disconnect position in which the moving gear is disengaged from the first output gear.

The image forming apparatus may further comprise a switching cam configured to rotate when receiving the driving force, between a first phase in which the moving gear is located in the first disconnect position, and a second phase in which the moving gear is located in the first transmit position.

When the main motor rotates in the forward direction, the switching cam rotates from the first phase to the second phase to move the moving gear from the first disconnect position to the first transmit position. When the main motor rotates in the reverse direction, the switching cam rotates, from the second phase to the first phase to move the moving gear from the first transmit position to the first disconnect position.

With this configuration in which the switching cam as a member for moving the moving cam moves the moving gear to the transmit position when the main motor rotates in the forward direction, and moves the moving gear to the disconnect position when the main motor rotates in the reverse direction, the shape of the switching cam can be designed more freely. The switching cam can also be made smaller in size.

The image forming apparatus may further comprise a separation gear train configured to transmit a driving force of the main motor to the first separation cam. The separation gear train may be configured to include a first cam gear having the first separation cam.

In this instance, the switching cam may be configured to receive the driving force of the main motor from the first cam gear.

With the switching cam configured to receive the driving force from the first cam gear, The gear train can be made more compact.

The separation gear train may include an idle gear configured to engage with the first cam gear, and the switching cam gear may receive the driving force of the main motor from the first cam gear via the idle gear.

The image forming apparatus may further comprise a metal sheet by which the idle gear is rotatably supported. The idle gear may include a first gear portion configured to engage with the first cam gear and a second gear portion configured to output a driving force to the switching cam.

In this instance, the first cam gear and the first gear portion is located on a first side of the metal sheet as defined by a side surface thereof facing in a direction parallel to a rotation axis of the idle gear, and the second gear portion and the switching cam are located on a second side, opposite to the first side, of the metal sheet.

With the first cam gear located on one side (first side) of the metal sheet, and the switching cam located on the other side (second side opposite to the first side) of the metal sheet, the shape and position of the switching cam can be designed more freely. The gear train can also be made more compact.

When moving the moving gear from the first disconnect position to the first transmit position, the switching cam causes the moving gear to be located in the first transmit position at a time before the first development roller is located in the contact position. When moving the moving gear from the first transmit position to the first disconnect position, the switching cam causes the moving gear to be located in the first disconnect position at a time after a time in which the first development roller is located in the separate position.

With this configuration in which the moving gear is located in the first transmit position at a time before the first development roller is located in the contact position, the first development roller can be caused to start rotating before the first development roller contacts the first photosensitive drum. Also, because the first moving gear is located in the first disconnect position at a time after the first development roller is located in the separate position, the first development roller can be caused to stop rotating after the first development roller separates from the first photosensitive drum.

The image forming apparatus may be configured to further comprise a second photosensitive drum, a second development roller, and a second separation cam.

The second photosensitive drum receives a driving force from the process motor.

The second development roller is movable relative to the second photosensitive drum between a contact position in which the second development roller is in contact with the second photosensitive drum and a separate position in which the second development roller is separate from the second photosensitive drum.

The second separation cam is configured to rotate and thereby cause the second development roller to move between the contact position and the separate position.

The image forming apparatus may be configured to further comprise a second development roller gear train and a switching lever. The second development roller gear train is configured to transmit a driving force of the process motor to the second development roller.

The second development roller gear train is a planetary gear train comprising an input element configured to receive a driving force of the process motor, an output element configured to output the driving force to the second development roller, and a transmission element configured to allow the driving force to be transmitted from the input element to the output element when rotation of the transmission element is restrained, and not allow the driving force to be transmitted from the input element to the output element when rotation of the transmission element is not restrained.

The switching lever is movable relative to the planetary gear train between a second transmit position and a second disconnect position, according to rotation of the second separation cam.

The switching lever in the second transmit position restrains the rotation of the transmit element. The switching lever in the second disconnect position does not restrain the rotation of the transmit element.

The second separation cam includes a protrusion contactable with the switching lever, the protrusion being configured to cause the switching lever to move between the second transmit state and the second disconnect state according to rotation of the second separation cam.

To cause the switching lever to move from the second disconnect position to the second transmit position, the protrusion is configured to cause the switching lever to be located in the second transmit position at a time before the second development roller is located in the contact position. To cause the switching lever to move from the second transmit position to the second disconnect position, the protrusion is configured to cause the switching lever to be located in the second disconnect position at a time after the second development roller is located in the separate position.

Because the switching lever is located in the transmit position at a time before the second development roller is located in the contact position, the second development roller can be caused to start rotating before the second development roller contacts the second photosensitive drum. Because the switching lever is located in the disconnect position at a time after the second development roller is located in the separate position, the second development roller can be cause to stop rotating after the second development roller separates from the second photosensitive drum.

The image forming apparatus may further comprise a third photosensitive drum, a third development roller, and a third separation cam, and the separation gear train may be configured to include a second cam gear having a third separation cam.

The third development roller is movable relative to the third photosensitive drum between a contact position in which the third development roller is in contact with the third photosensitive drum and a separate position in which the third development roller is separate from the third photosensitive drum.

The third separation cam is configured to rotate and thereby cause the third development roller to move between the contact position and the separate position.

In this instance, the first cam gear may be configured to receive the driving force of the main motor from the second cam gear.

The image forming apparatus may further comprise a fourth photosensitive drum, a fourth development roller, and a fourth separation cam, and the separation gear train may be configured to include a third cam gear having the fourth separation cam.

The fourth development roller is movable relative to the fourth photosensitive drum between a contact position in which the fourth development roller is in contact with the fourth photosensitive drum and a separate position in which the fourth development roller is separate from the fourth photosensitive drum.

The fourth separation cam may be configured to rotate and thereby cause the fourth development roller to move between the contact position and the separate position.

The third cam gear may engage with the idle gear.

The second development roller drive train may be configured to include a first gear and a second gear.

The first gear is configured to receive a driving force from the process motor, and engages with a gear provided on the input element.

The second gear is configured to output a driving force to the second development roller, and engages with a gear provided on the output element.

The first gear and the second gear rotate about a common axis.

Because the first gear rotates about one and the same axis as that about which the second gear rotates, the second development roller gear train can be made compact as viewed from a direction parallel to the rotation axis of the first gear and the second gear.

In yet another aspect, an image forming apparatus comprises a first photosensitive drum, a first development cartridge, a first cam gear having a first separation cam, a first cam follower, an idle gear, and a rotation resistance member.

The first development cartridge includes the first development roller, and is movable relative to the first photosensitive drum between a first position in which the first development roller is in contact with the first photosensitive drum and a second position in which the first development roller is separate from the first photosensitive drum.

The first separation cam may be configured to rotate and thereby cause the first development cartridge to move between a first position and a second position.

The first cam follower is slidable, according as the first separation cam is rotated, in a direction parallel to a rotation axis of the first separation cam, between a push position in which the first cam follower pushes and causes the first development cartridge to be located in the second position and a no-push position in which the first development cartridge is located in the first position.

The idle gear engages with the first cam gear.

The rotation resistance member applies rotation resistance to the idle gear.

With the rotation resistance member provided to apply rotation resistance to the idle gear that engages with the first cam gear, the free rotation of the first cam gear can be restrained. Therefore, the sudden sliding of the first cam follower caused by the free rotation of the first cam gear can be restrained.

The rotation resistance member may be configured to press the idle gear in a direction parallel to the rotation axis of the idle gear to apply rotation resistance to the idle gear.

Because the rotation resistance member is configured to push the idle gear in a direction parallel to the rotation axis of the idle gear, the rotation resistance member can be made compact on the idle gear as viewed from the direction parallel to the rotation axis of the idle gear.

For example, the rotation resistance member is a spring.

The rotation resistance member may be a leaf spring.

With the rotation resistance member being a leaf spring, the rotation resistance member can be arranged more compactly.

The image forming apparatus may be configured to comprise a metal sheet by which the idle gear is rotatably supported.

In this instance, the idle gear may be configured to include a first rib having an annular shape and protruding in a direction parallel to the rotation axis of the idle gear toward the metal sheet. The first rib is kept in contact with the metal sheet by the pushing force of the rotation resistance member.

With the idle gear kept in contact with the metal sheet by the pushing force of the rotation resistance member, a necessary amount of rotation resistance can be applied to the idle gear without restraining the rotation of the idle gear too much.

The first rib may be located at end portion of the idle gear in a plane perpendicular to the rotation axis.

With the first rib located at an end portion of the idle gear in a plane perpendicular to the rotation axis, the contact area of the first rib and the metal sheet can be increased. Therefore, a necessary amount of rotation resistance can be applied sufficiently to the idle gear by the contact of the first rib and the metal sheet.

The idle gear may include a gear portion configured to engage with the first cam gear. The first cam gear and the gear portion are located on a first side of the metal sheet as defined by a side surface thereof facing in a direction parallel to the rotation axis of the idle gear, and the first rib and the rotation resistance member are located on a second side, opposite to the first side, of the metal sheet.

In this instance, the rotation resistance member pushes the idle gear in a direction parallel to the rotation axis of the idle gear, which is a direction opposite to the direction in which the side surface of the metal sheet faces.

Because the first cam gear and the rotation resistance member are located on opposite sides of the metal sheet as defined by the opposite side surfaces facing in the direction parallel to the rotation axis of the idle gear, the shape and position of the rotation resistance member can be designed more freely.

The idle gear may be configured to include an annular second rib protruding in a direction away from the metal sheet on the second side of the metal sheet.

In this instance, the rotation resistance member pushes the second rib in a direction parallel to the rotation axis of the idle gear, which is a direction opposite to the direction in which the side surface of the metal sheet faces, and the inner diameter of the second rib is larger than a pitch diameter of the gear portion.

With the rotation resistance member pushing a second rib having a diameter larger than a pitch diameter of the gear potion, a necessary amount of rotation resistance can be applied to the idle gear with a smaller load. Also, since the diameter of the gear portion can be made smaller, the gear train can be made compact, and the members can be arranged compactly. Therefore, the image forming apparatus can be made smaller in size.

The image forming apparatus may further comprise a second photosensitive drum, a second development cartridge, a second cam gear having a second separation cam, and a second cam follower.

The second development cartridge includes the second development roller, and is movable relative to the second photosensitive drum between a first position in which the second development roller is in contact with the second photosensitive drum and a second position in which the second development roller is separate from the second photosensitive drum.

The second separation cam is configured to rotate and thereby cause the second development cartridge to move between a first position and a second position.

The second cam follower is configured to slide, according as the second separation cam is rotated, in a direction parallel to the rotation axis of the second cam gear, between a push position in which the second cam follower pushes and causes the second development cartridge to be located in the second position and a no-push position in which the second development cartridge is located in the first position.

In this instance, the idle gear can be configured to engage with both the first cam gear and the second cam gear.

Since the idle gear, to which rotation resistance is applied, engages with both the first cam gear and the second cam gear, the free rotation of the first cam gear and the second cam gear can be restrained. Therefore, the sudden sliding of the first cam follower and the second cam follower caused by the free rotation of the first cam gear and the second cam gear can be restrained.

The image forming apparatus may further comprise a stopper configured to restrain the rotation of the cam follower about the rotation axis of the first cam gear.

With this stopper, the rotation of the first cam follower can be restricted. Therefore, the sudden sliding of the first cam follower caused by the rotation of the first cam follower can be restrained.

The first cam follower may be configured to include a slide shaft, an arm, and a pin.

The slide shaft is slidable in directions parallel to the rotation axis of the first cam gear.

The arm extends from the slide shaft in a direction perpendicular to the rotation axis of the first cam gear.

The pin extends from the arm in a direction parallel to the rotation axis of the first cam gear. The pin is configured to push the first development cartridge.

In this instance, the stopper may be configured to hold the arm.

The image forming apparatus may be configured to comprise a spring configured to bias the first cam follower toward the no-push position.

With this configuration in which the first cam follower is biased toward no-push position, the free rotation of the first cam gear can be restrained by the rotation resistance member, and therefore the sudden sliding of the first cam follower caused by the free rotation of the first cam gear can be effectively restrained.

The first separation cam may be configured to include a cam portion protruding in a direction of a rotation axis of the first cam gear.

The cam portion may be configured to include a retaining surface and a guide surface.

The retaining surface retains the first cam follower in the push position.

The guide surface guides the first cam follower from the push position to the no-push position, and is inclined with respect to a plane perpendicular to the rotation axis of the first cam gear.

DESCRIPTION

Figure 1:
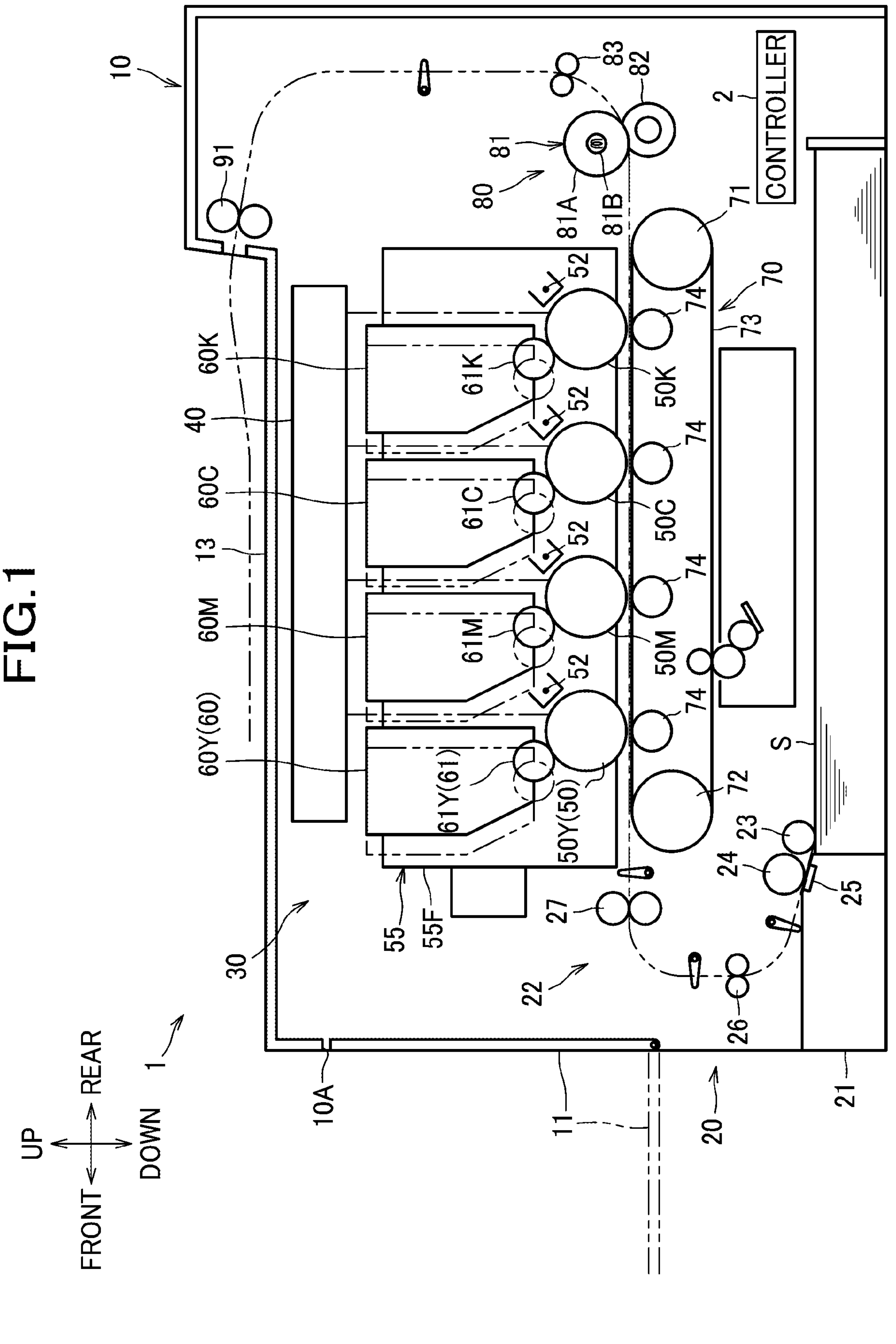
FIG. 1 is a diagram of an image forming apparatus.

As shown in FIG. 1, an image forming apparatus 1 is a color printer, comprising a housing 10, a front cover 11, a sheet feeder unit 20, an image forming unit 30, a second ejection roller 91 as an example of an ejection roller, and a controller 2. In the following description, directions will be referred to as directions shown in FIG. 1. That is, the left-hand side of FIG. 1 is referred to as “front,” the right-hand side of FIG. 1 as “rear,” the front side of the drawing sheet of FIG. 1 as “right,” and the back side of the drawing sheet of FIG. 1 as “left.” Similarly, upward direction (upper side) of FIG. 1 is referred to as “upward (upper),” and the downward direction (lower side) of FIG. 1 is referred to as “downward (lower).”

The housing 10 has an opening 10A at a front side thereof. The front cover 11 is configured to openably close the opening 10A. Specifically, the front cover 11 is configured to rotate between a closed position indicated by a solid line and an open position indicated by a chain double-dashed line, relative to the housing 10. The closing position is a position in which the opening 10A is closed and the open position is a position in which the opening 10A is open.

The sheet feeder unit 20 comprises a sheet tray 21 and a sheet feeder mechanism 22. Sheets S are held in the sheet tray 21. The sheet feeder mechanism 22 is a mechanism that receives a driving force and thereby feeds a sheet S toward photosensitive drums 50 (50Y, 50M, 50C, 50K), which will be described below, of the image forming unit 30. The sheet feeder mechanism 22 comprises a pickup roller 23, a separation roller 24, a separation pad 25, a conveyor roller 26, and a registration roller 27.

Sheet S in the sheet tray S21 are picked up by the pickup roller 23. Next, one sheet S is separated from the others by the separation roller 24 and the separation pad 25 of the sheet feeder mechanism 22. Then, the sheet S is fed by the conveyor roller 26 and the registration roller 27 of the sheet feeder mechanism 22 to the image forming unit 30.

The image forming unit 30 comprises an exposure unit 40, four photosensitive drums 50, four development cartridges 60, a transfer unit 70, and a fixing device 80.

The exposure unit 40 comprises, for example, a light source, deflectors, lenses, and mirrors. The exposure unit 40 emits light beams as shown by alternate long and short dashed lines to expose the surfaces of the photosensitive drums 50 to light.

The photosensitive drums 50 include a photosensitive drum 50Y for yellow, a photosensitive drum 50M for magenta, a photosensitive drum 50C for cyan, and a photosensitive drum 50K for black. The four photosensitive drums 50 are arranged in the sheet conveyance direction in the following sequence: the photosensitive drum 50Y, the photosensitive drum 50M, the photosensitive drum 50C, and the photosensitive drum 50K.

Specifically, the photosensitive drum 50Y is located upstream of the photosensitive drum 50M in a direction of conveyance of a sheet S. The photosensitive drum 50M is located upstream of the photosensitive drum 50C in the direction of conveyance of the sheet S. The photosensitive drum 50C is located upstream of the photosensitive drum 50K in the direction of conveyance of the sheet S.

In the description and the drawings, each of the members provided for the corresponding colors may be designated by a specific reference numeral with a label Y, M, C, or K appended thereto if distinction in color is necessary for explanation. On the other hand, if explanation is given without distinction in color, the reference numeral without the label Y, M, C, or K may be used.

The image forming apparatus 1 further comprises a drawer 55. The drawer 55 is movable through the opening 10A of the housing 10, which is uncovered by opening the front cover 11, in directions in which the photosensitive drums 50 are arranged, between an inside position and an outside position. The inside position is a position in which the drawer 55 is installed in the housing 10. The outside position is a position in which at least a part of the drawer 55 is exposed to view from outside of the housing 10. In the present embodiment, the outside position is a position in which the drawer 55 has been pulled out frontward from the inside position. The drawer 55 is configured herein to be installable into and removable from the housing 10.

The drawer 55 comprises a frame 55F. The frame 55F supports the four photosensitive drums 50 (50Y, 50M, 50C, 50Y) in a manner that renders each of the photosensitive drums 50 rotatable. The frame 55F also supports four chargers 52. The chargers 52 electrically charge surfaces of the respective photosensitive drums 50.

The development cartridges 60 include a development cartridge 60Y for holding yellow toner, a development cartridge 60M for holding magenta toner, a development cartridge 60C for holding cyan toner, and a development cartridge 60K for holding black toner. The development cartridge 60Y includes a development roller 61Y for supplying yellow toner to the photosensitive drum 50Y. The development cartridge 60M includes a development roller 61M for supplying magenta toner to the photosensitive drum 50M. The development cartridge 60C includes a development roller 61C for supplying cyan toner to the photosensitive drum 50C. The development cartridge 60K includes a development roller 61K for supplying black toner to the photosensitive drum 50K.

The development roller 61Y is movable relative to the photosensitive drum 50Y between a contact position in which the development roller 61Y is in contact with the photosensitive drum 50Y and a separate position in which the development roller 61Y is separate from the photosensitive drum 50Y. The development roller 61M is movable relative to the photosensitive drum 50M between a contact position in which the development roller 61M is in contact with the photosensitive drum 50M and a separate position in which the development roller 61M is separate from the photosensitive drum 50M. The development roller 61C is movable relative to the photosensitive drum 50C between a contact position in which the development roller 61C is in contact with the photosensitive drum 50C and a separate position in which the development roller 61C is separate from the photosensitive drum 50C. The development roller 61K is movable relative to the photosensitive drum 50K between a contact position in which the development roller 61K is in contact with the photosensitive drum 50K and a separate position in which the development roller 61K is separate from the photosensitive drum 50K.

The frame 55F of the drawer 55 supports the development cartridges 60 (60Y, 60M, 60C, 60K) in a manner that permits each of the development cartridges 60 to be installed therein and removed therefrom. Each development cartridge 60 is replaceable when the drawer 55 is located in the outside position or when the drawer 55 is removed from the housing 10.

The development cartridge 60 is supported by the frame 55F in a manner that permits the development cartridge 60 to move in a front-rear direction between a first position indicated by a solid line and a second position indicated by a chain double-dashed line. The first position is a position in which the corresponding development roller 61 is located in the contact position. The second position is a position in which the corresponding development roller 61 is located in the separate position.

Specifically, the development cartridge 60Y is movable relative to the photosensitive drum 50Y between a first position in which the development roller 61Y is located in the contact position and a second position in which the development roller 61Y is located in the separate position. In other words, the development cartridge 60Y is movable relative to the photosensitive drum 50Y between the first position in which the development roller 61Y is in contact with the photosensitive drum 50Y and the second position in which the development roller 61Y is separate from the photosensitive drum 50Y.

The development cartridge 60M is movable relative to the photosensitive drum 50M between a first position in which the development roller 61M is located in the contact position and a second position in which the development roller 61M is located in the separate position. In other words, the development cartridge 60M is movable relative to the photosensitive drum 50M between the first position in which the development roller 61M is in contact with the photosensitive drum 50M and the second position in which the development roller 61M is separate from the photosensitive drum 50M.

The development cartridge 60C is movable relative to the photosensitive drum 50C between a first position in which the development roller 61C is located in the contact position and a second position in which the development roller 61C is located in the separate position. In other words, the development cartridge 60C is movable relative to the photosensitive drum 50C between the first position in which the development roller 61C is in contact with the photosensitive drum 50C and the second position in which the development roller 61C is separate from the photosensitive drum 50C.

The development cartridge 60K is movable relative to the photosensitive drum 50K between a first position in which the development roller 61K is located in the contact position and a second position in which the development roller 61K is located in the separate position. In other words, the development cartridge 60K is movable relative to the photosensitive drum 50K between the first position in which the development roller 61K is in contact with the photosensitive drum 50K and the second position in which the development roller 61K is separate from the photosensitive drum 50K.

The transfer unit 70 includes a drive roller 71, a follower roller 72, an endless conveyor belt 73, and four transfer rollers 74. The conveyor belt 73 is looped round and stretched between the drive roller 71 and the follower roller 72. An outside surface of the conveyor belt 73 is in contact with the four photosensitive drums 50. The transfer rollers 74 are located inside the conveyor belt 73. The conveyor belt 73 is nipped between each transfer roller 74 and the corresponding photosensitive drum 50.

The fixing device 80 is a device for fixing a toner image transferred to a sheet S onto the sheet S. The fixing device 80 includes a heating portion 81, a pressure portion 82, and a first ejection roller 83 as an example of an ejection roller. The heating portion 81 includes a heating roller 81A and a heater 81B. The heating roller 81A is a cylinder-shaped roller. The heater 81B is a heater that heats the heating roller 81A. The heater 81B is located such that the heater 81B passes inside the heating roller 81A.

The pressure portion 82 nips a sheet S between the heating portion 81 and the pressure portion 82. Specifically, the pressure portion 82 is a pressure roller that nips the sheet S between the heating roller 82 and the pressure portion 82. The pressure roller is a roller having a metal core and a rubber layer covering the metal core. The fixing device 80 receives a driving force and thereby conveys a sheet S through between the heating roller 81A of the heating portion 81 and the pressure portion 82 (pressure roller). When receiving the driving force, the fixing device 80 further conveys a sheet S by the first ejection roller 83.

The image forming unit 30 uniformly charges the surfaces of the photosensitive drums 50 by the chargers 52, and then exposes the surfaces of the photosensitive drums 50 to light beams emitted from the exposure unit 40. Thereby, the image forming unit 30 forms an electrostatic latent image based on image data on each photosensitive drum 50. Thereafter, the image forming unit 30 supplies toner held in the development cartridge 60 to each photosensitive drum 50 via the development roller 61 located in the contact position. Thereby, the image forming unit 30 forms a toner image on the photosensitive drum 50.

The image forming unit 30 conveys a sheet S fed from the sheet feeder unit 20 through between the photosensitive drum 50 and the transfer roller 74, and thereby transfers the toner image formed on the photosensitive drum 50 onto the sheet S. Subsequently, the image forming unit 30 conveys the sheet S with the toner image transferred thereon through between the heating roller 81A and the pressure portion 82 of the fixing device 80, so that the toner image is fixed onto the sheet.

The first ejection roller 83 and a second ejection roller 91 receive a driving force and thereby eject a sheet S conveyed from between the heating portion 81 and the pressure portion 82 to the outside of the housing 10. Specifically, the first ejection roller 83 and the second ejection roller 91 eject a sheet S with the toner image fixed thereon, onto an output tray 13.

Figure 2:
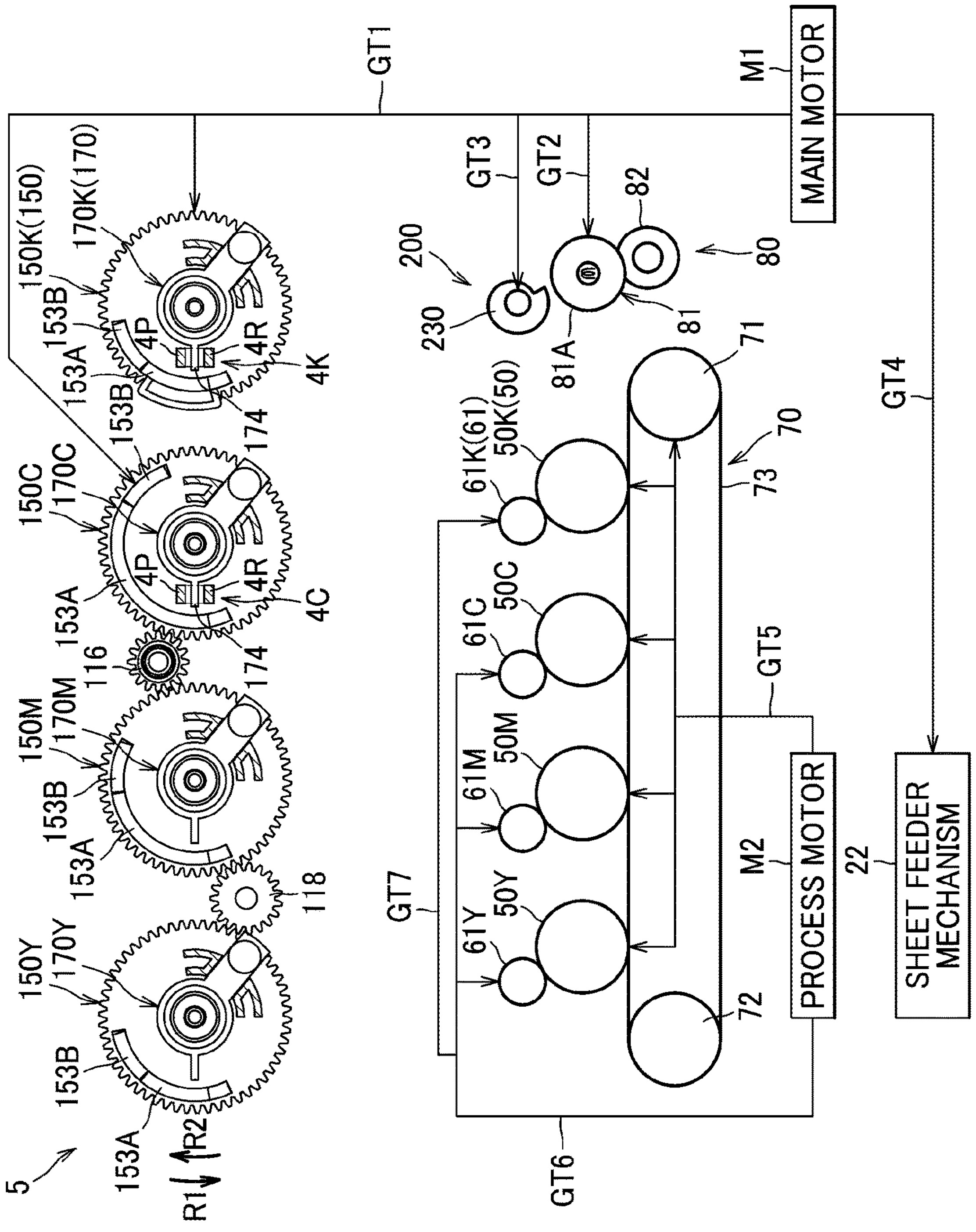
FIG. 2 is a schematic diagram showing a system for transmitting a driving force in the image forming apparatus.

As shown in FIG. 2, the image forming apparatus 1 further comprises a main motor M1, a process motor M2, a separation mechanism 5, and an adjusting mechanism 200.

The main motor M1 is a motor that drives a separation cam 150 of the separation mechanism 5, the fixing device 80, the adjusting mechanism 200, and the sheet feeder mechanism 22. In other words, the separation cam 150 of the separation mechanism 5, the fixing device 80, the adjusting mechanism 200, and the sheet feeder mechanism 22 each receive a driving force from the main motor M1. The main motor M1 is rotatable in the forward and reverse directions. The main motor rotates in the forward direction when a sheet S is conveyed from the sheet tray 21 toward the output tray 13 to form an image on the sheet S.

The process motor M2 is a motor that drives the photosensitive drums 50, the development rollers 61, and the transfer unit 70. In other words, the photosensitive drums 50, the development rollers 61, and the transfer unit 70 each receive a driving force from the process motor M2.

Figure 3:
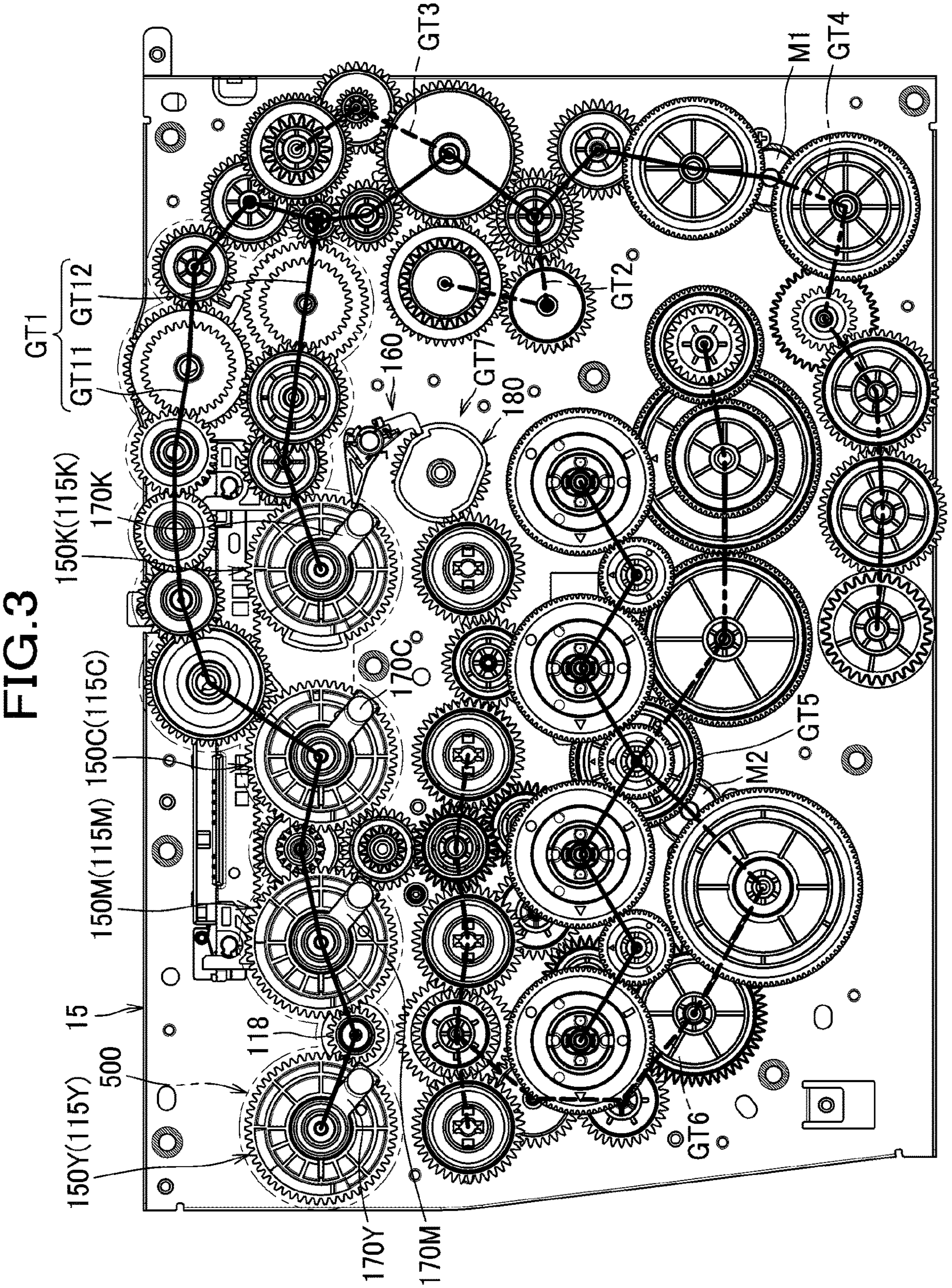
FIG. 3 is a diagram showing a gear train and a metal sheet of the image forming apparatus.

As shown in FIG. 2 and FIG. 3, the image forming apparatus 1 further comprises a separation gear train GT1, a fixing gear train GT2, an adjusting gear train GT3, a sheet feeder gear train GT4, a drum gear train GT5, a first development roller gear train GT6, and a second development roller gear train GT7.

The separation gear train GT1 is a gear train configured to transmit a driving force of the main motor M1 to the separation cams 150 (150Y, 150M, 150C, 150K) of the separation mechanism 5.

The fixing gear train GT2 is a gear train configured to transmit a driving force of the main motor M1 as received from the separation gear train GT1 to the fixing device 80. Specifically, the fixing gear train GT2 is configured to transmit the driving force of the main motor M1 as received from the separation gear train GT1 to the heating roller 81A.

The adjusting gear train GT3 is a gear train configured to transmit the driving force of the main motor M1 as received from the separation gear train GT1 to the adjusting cam 230 of the adjusting mechanism 200.

The sheet feeder gear train GT4 is a gear train configured to transmit the driving force of the main motor M1 to the sheet feeder mechanism 22.

The drum gear train GT5 is a gear train configured to transmit a driving force of the process motor M2 to the photosensitive drums 50 (50Y, 50M, 50C, 50K).

The first development roller gear train GT6 is a gear train configured to transmit a driving force of the process motor M2 to the development rollers 61Y, 61M, and 61C.

The second development roller gear train GT7 is a gear train configured to transmit a driving force of the process motor M2 to the development roller 61K. Specifically, the second development roller gear train GT7 is configured to transmit the driving force of the process motor M2 as received from the first development roller gear train GT6 to the development roller 61K.

The separation mechanism 5 is a mechanism configured to cause the development rollers 61 to move between the contact position and the separate position when receiving a driving force from the main motor M1. The separation mechanism 5 comprises four separation cams 150 and four cam followers 170.

The separation cams 150 include a separation cam 150Y, a separation cam 150M, a separation cam 150C, and a separation cam 150K.

The separation cam 150Y is caused, when receiving the driving force of the main motor M1, to rotate and thereby move the development roller 61Y between the contact position and the separate position. Specifically, the separation cam 150Y rotates and causes the development cartridge 60Y to move between the first position and the second position, and thereby causes the development roller 61Y to move between the contact position and the separate position.

The separation cam 150M is caused, when receiving the driving force of the main motor M1, to rotate and thereby move the development roller 61M between the contact position and the separate position. Specifically, the separation cam 150M rotates and causes the development cartridge 60M to move between the first position and the second position, and thereby causes the development roller 61M to move between the contact position and the separate position.

The separation cam 150C is caused, when receiving the driving force of the main motor M1, to rotate and thereby move the development roller 61C between the contact position and the separate position. Specifically, the separation cam 150C rotates and causes the development cartridge 60C to move between the first position and the second position, and thereby causes the development roller 61C to move between the contact position and the separate position.

The separation cam 150K is caused, when receiving the driving force of the main motor M1, to rotate and thereby move the development roller 61K between the contact position and the separate position. Specifically, the separation cam 150K rotates and causes the development cartridge 60K to move between the first position and the second position, and thereby causes the development roller 61K to move between the contact position and the separate position.

Figure 4:
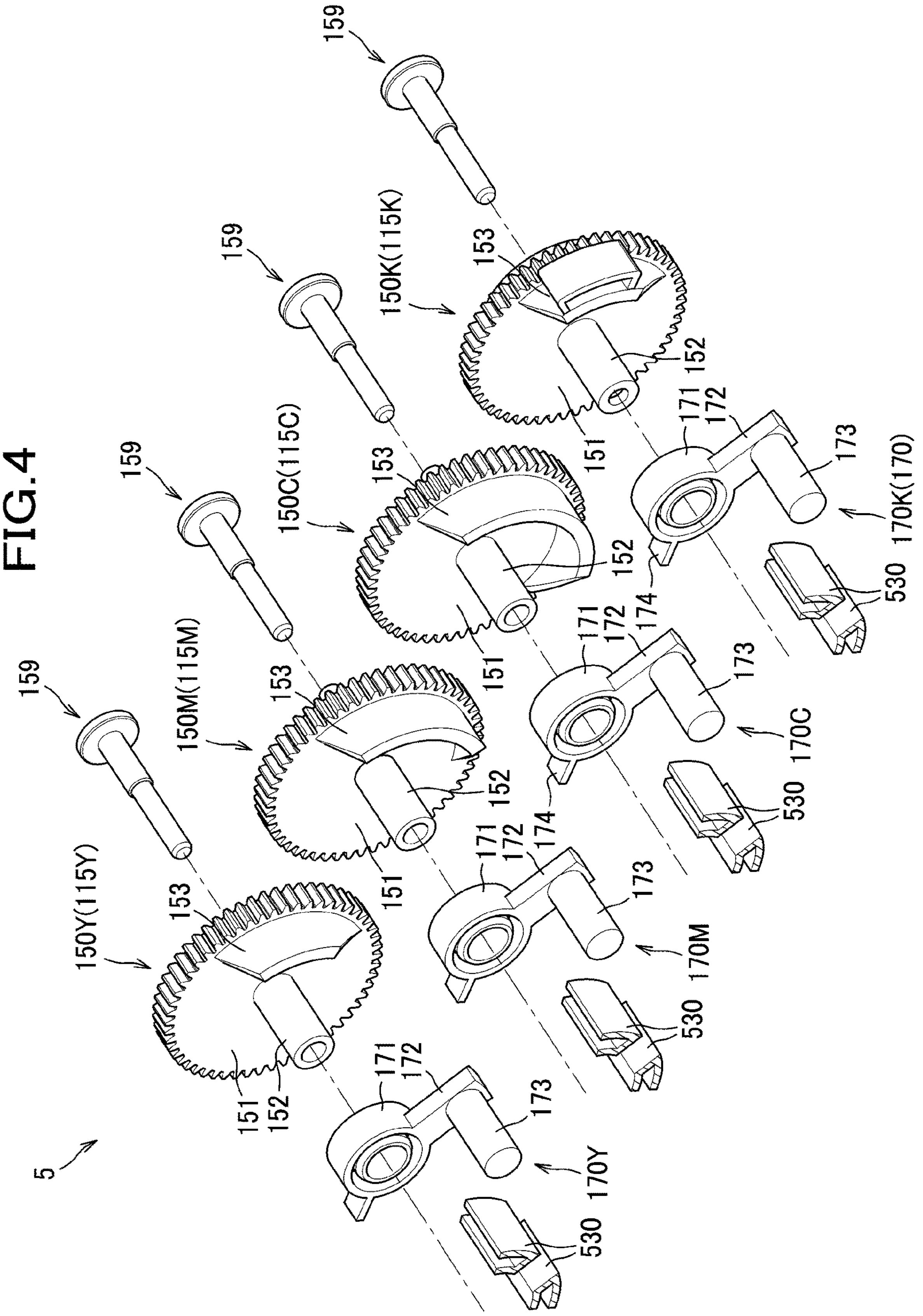
FIG. 4 is a diagram showing separation cams, cam followers, shafts, and stoppers.

As shown in FIG. 4, the cam followers 170 include a cam follower 170Y, a cam follower 170M, a cam follower 170C, and a cam follower 170K. The cam followers 170 are slidable in directions parallel to the rotation axes of the corresponding separation cams 150. The rotation axes of the separation cams 150 are indicated by the alternate long and short dashed lines in FIG. 4. The rotation axis direction is also a direction parallel to rotation axes of cam gears 115 (115Y, 115M, 115C, 115K) described below.

The cam follower 170Y is slidable and caused to slide, as the separation cam 150Y (cam gear 115Y) rotates, between a push position and a no-push position. For the cam follower 170Y, the push position is a position in which the cam follower 170Y pushes and causes the development cartridge 60Y to be located in the second position, and the no-push position is a position in which the development cartridge 60Y is located in the first position.

The cam follower 170M is slidable and caused to slide, as the separation cam 150M (cam gear 115M) rotates, between a push position and a no-push position. For the cam follower 170M, the push position is a position in which the cam follower 170M pushes and causes the development cartridge 60M to be located in the second position, and the no-push position is a position in which the development cartridge 60M is located in the first position.

The cam follower 170C is slidable and caused to slide, as the separation cam 150C (cam gear 115C) rotates, between a push position and a no-push position. For the cam follower 170C, the push position is a position in which the cam follower 170C pushes and causes the development cartridge 60C to be located in the second position, and the no-push position is a position in which the development cartridge 60C is located in the first position.

The cam follower 17K is slidable and caused to slide, as the separation cam 150K (cam gear 115K) rotates, between a push position and a no-push position. For the cam follower 170K, the push position is a position in which the cam follower 170K pushes and causes the development cartridge 60K to be located in the second position, and the no-push position is a position in which the development cartridge 60K is located in the first position.

Figure 5A:
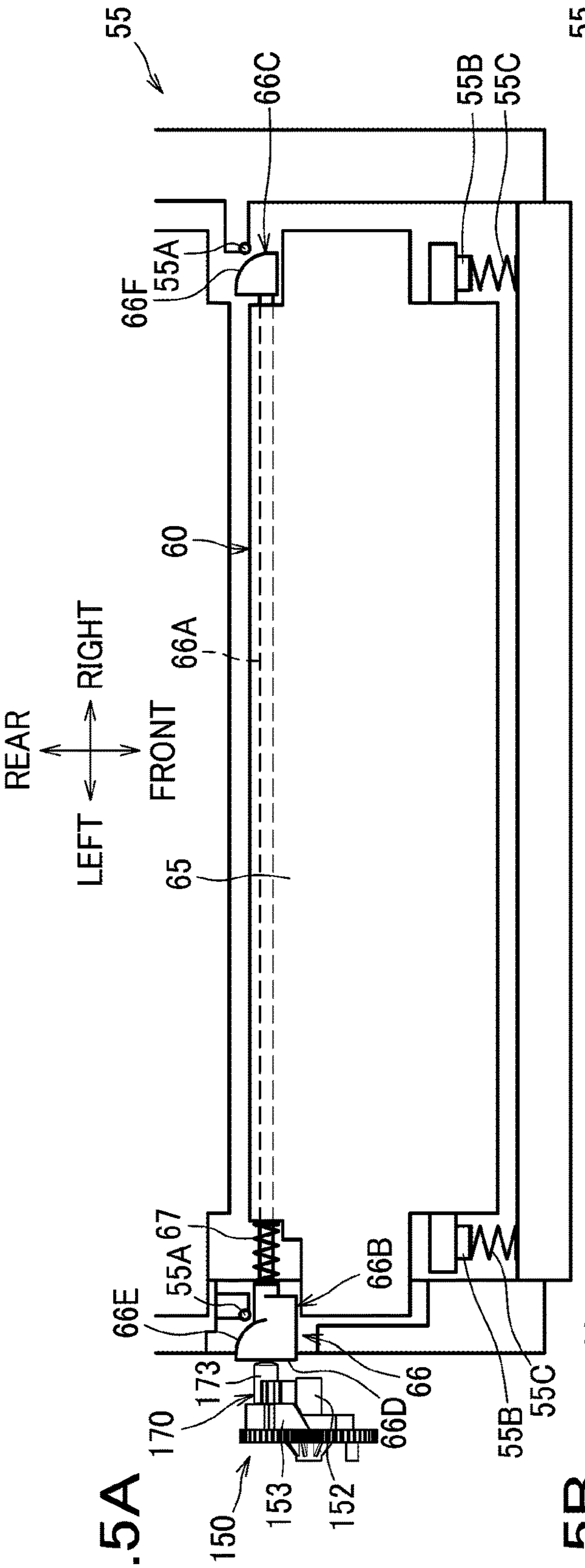
FIG. 5A is a diagram for explaining an arrangement for moving a development cartridge, showing a state in which the development cartridge is located in a contact position.

As shown in FIG. 5A, the drawer 55 includes contact portions 55A, push members 55B, and springs 55C. The contact portions 55A are portions with which a slide member 66, which will be described below, is contactable. Each of the contact portions 55A consists of a roller rotatable on a vertical axis. The push members 55B are biased by the springs 55C rearward. When the development cartridge 60 is installed in the drawer 55, the push member 55B pushes the development cartridge 60 rearward by the biasing force of the spring 55C. Thereby, the development cartridge 60 is caused to move to the first position in which the development roller 61 is in contact with the photosensitive drum 50.

The development cartridge 60 comprises a case 65 that holds toner, and a slide member 66. The slide member 66 is caused to move in a direction parallel to a rotation axis direction when pushed by the cam follower 170. The slide member 66 includes a shaft 66A, a first contact member 66B, and a second contact member 66C. The shaft 66A is supported by the case 65 in such a manner that the shaft 66A is slidable in directions parallel to the rotation axis. The first contact member 66B is fixed to one end of the shaft 66A, and the second contact member 66C is fixed to the other end of the shaft 66A.

Figure 5B:
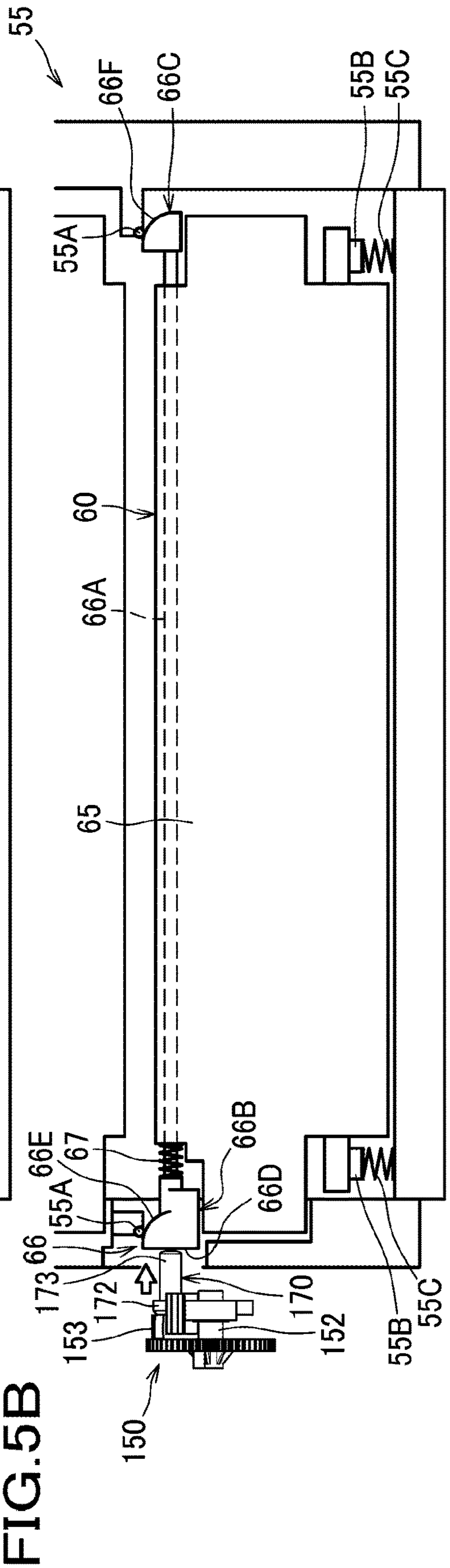
FIG. 5B is a diagram for explaining the arrangement for moving the development cartridge, showing a state in which the development cartridge is located in a separate position.

The first contact member 66B has a to-be-pushed surface 66D and an inclined surface 66E. The second contact member 66C has an inclined surface 66F. The to-be-pushed surface 66D is a surface pushed by the cam follower 170. The inclined surfaces 66E and 66F are surfaces inclined relative to the left-right direction. As shown in FIG. 5B, when the slide member 66 is pushed by the cam follower 170, the inclined surfaces 66E and 66F come in contact with the contact portions 55A and cause the development cartridge 60 to move to the front. Thereby, the development cartridge 60 is moved to the second position in which the development roller 61 is separate from the photosensitive drum 50. A spring 67 is located between the first contact member 66B and the case 65. The spring 67 biases the slide member 66 leftward.

As shown in FIG. 4, the separation cams 150 are end cams. Each separation cam 150 includes a disk portion 151, a boss 152, and a cam portion 153.

The boss 152 extends in a direction parallel to the rotation axis from the center of the disk portion 151. The boss 152 has a cylindrical shape.

The image forming apparatus 1 further comprises four shafts 159 and a metal sheet 15 (see FIG. 3). The metal sheet 15 is a member by which the gears of each gear trains are rotatably supported. The shaft 159 is fixed to the metal sheet 15. The separation cam 150 (cam gear 115) is rotatably supported by the metal sheet 15 by the engaging of the boss 152 with the shaft 159.

The cam portion 153 protrudes from the disk portion 151 in a direction parallel to the rotation axis. The cam portion 153 protrudes from a surface of the disk portion 151 facing away from the metal sheet 15 (see FIG. 3) in a direction parallel to the rotation axis.

Figure 6A:
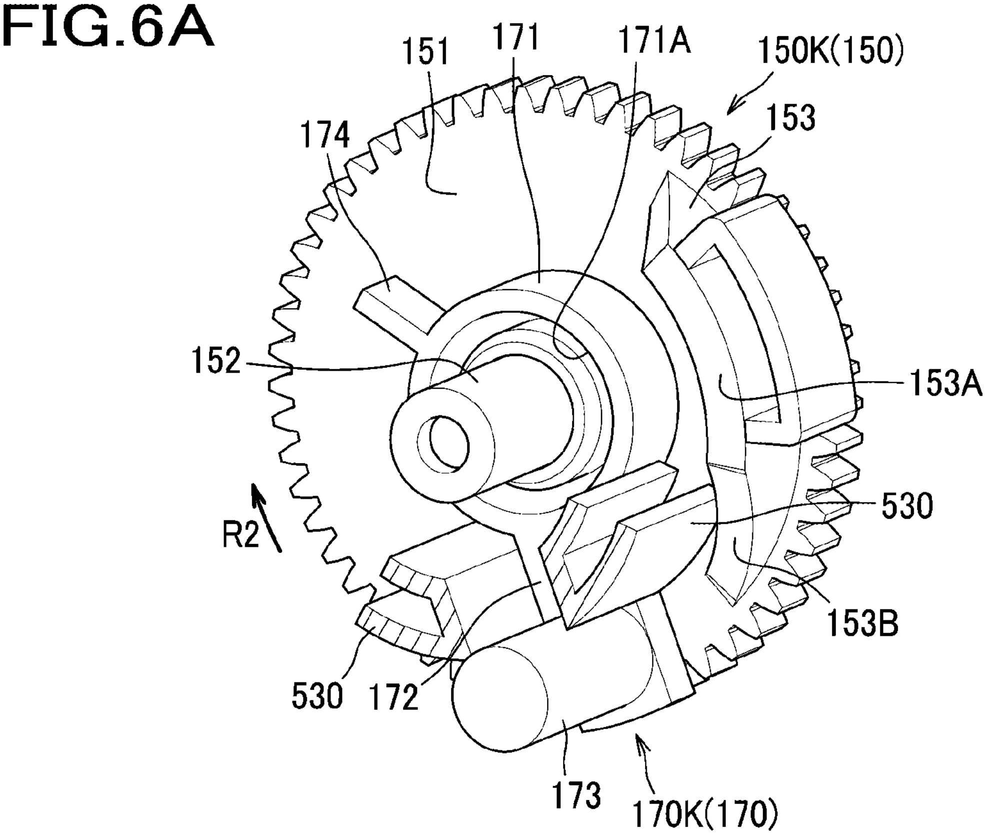
FIG. 6A is a perspective view showing a separation cam and a cam follower located in a no-push position.
Figure 6B:
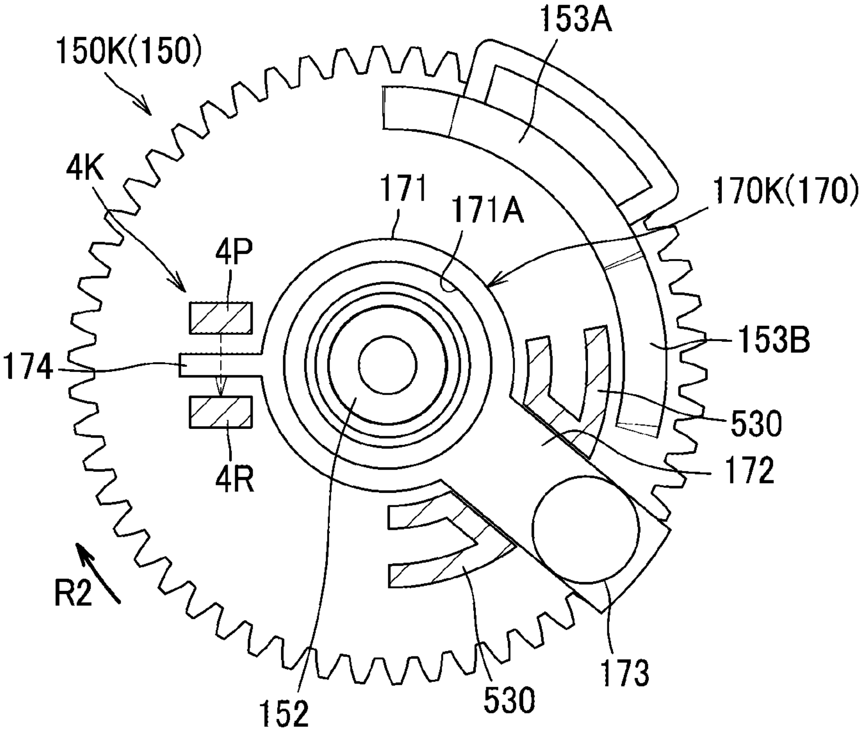
FIG. 6B is a side view showing the separation cam and the cam follower located in the no-push position.

As shown in FIGS. 6A and 6B, the cam portion 153 includes a retaining surface 153A and a guide surface 153B.

The retaining surface 153A is a surface configured to retain the cam follower 170 in the push position. The retaining surface 153A is approximately parallel to a plane perpendicular to the rotation axis of the separation cam 150 (cam gear 115).

The guide surface 153B is a surface configured to guide the cam follower 170 between the push position and the no-push position. The guide surface 153B is inclined with respect to a plane perpendicular to the rotation axis of the separation cam 150 (cam gear 115). Specifically, the guide surface 153B extending toward the retaining surface 153A in the direction of rotation of the separation cam 150 slopes gradually away from the disk portion 151.

Figure 7A:
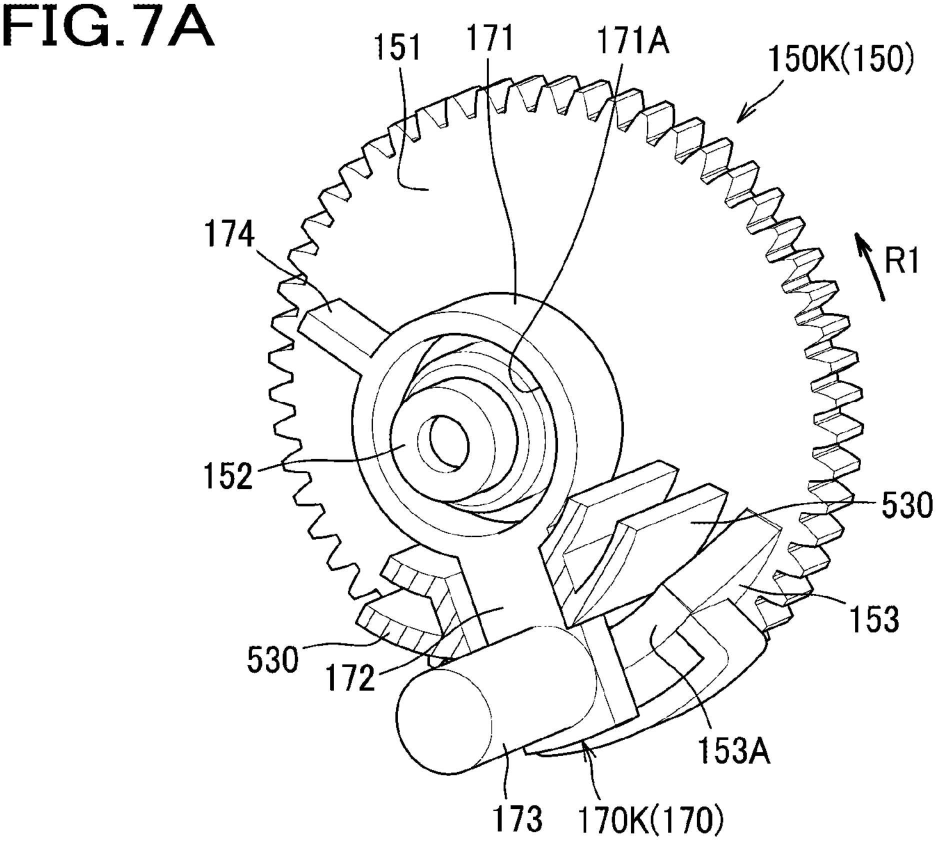
FIG. 7A is a perspective view of the separation cam and the cam follower located in a push position.
Figure 7B:
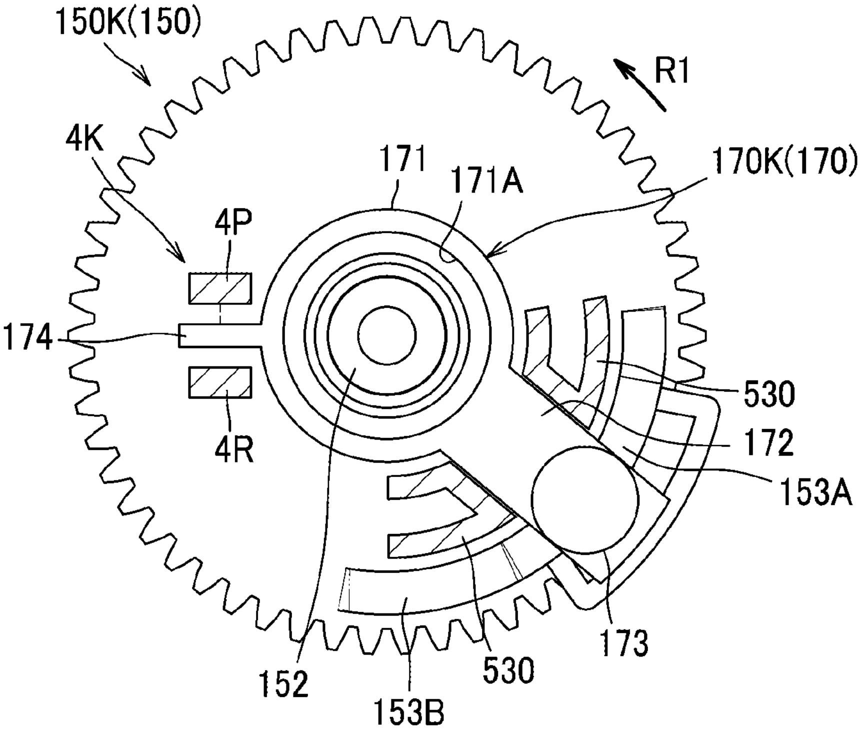
FIG. 7B is a side view of the separation cam and the cam follower located in the push position.

As shown in FIGS. 7A and 7B, the guide surface 153B is configured to cause the cam follower 170 to move from the push positon to the no-push position when the separation cam 150 rotates in a first rotation direction R1. The first rotation direction R1 is a direction in which the separation cam 150 rotates when the main motor M1 rotates in the forward direction. Also, as shown in FIGS. 6A and 6B, the guide surface 153B is configured to cause the cam follower 170 to move from the no-push position to the push position when the separation cam 150 rotates in a second rotation direction R2. The second rotation direction R2 is a direction in which the separation cam 150 rotates when the main motor M1 rotates in the reverse direction. The second rotation direction R2 is a rotation direction opposite to the first rotation direction R1.

The cam follower 170 includes a slide shaft 171, an arm 172, a pin 173, and a rib 174.

The slide shaft 171 is slidable in a direction parallel to the rotation axis of the separation cam 150. Specifically, the slide shaft 171 has a cylindrical shape. The slide shaft 171 is engaged with the boss 152 of the separation cam 150, allowing the slide shaft 171 to slide in a direction parallel to the rotation axis of the separation cam 150 relative to the boss 152. Thereby, the cam follower 170 is slidable between the no-push position shown in FIGS. 6A and 6B and the push position shown in FIGS. 7A and 7B.

The arm 172 extends from the slide shaft 171 in a direction perpendicular to the rotation axis of the separation cam 150. Specifically, the arm 172 extends outward from the slide shaft 171 in a direction aligned with a radius of the slide shaft 171. The arm 172 is has a shape of a plate.

The pin 173 extends from the arm 172 in the rotation axis of the separation cam 150. Specifically, the pin 173 extends from an end portion of the arm 172 farther away from the slide shaft 171, in one direction parallel the rotation axis off the separation cam 150. The pin 173 has a cylindrical shape, with an end having a convex surface. The end of the pin 173 pushes the development cartridge 60 when the cam follower is caused to move from the no-push position to the push position. Specifically, the end of the pin 173 pushes the to-be-pushed surface 66D of the slide member 66 provided on the development cartridge 60 (refer to FIG. 5B).

The rib 174 extends from the slide shaft 171 in a direction perpendicular to the rotation axis of the separation cam 150. Specifically, the rib 174 extends outward from the slide shaft 171 in a direction aligned with a radius of the slide shaft 171. The rib 174 extends in a direction different from the direction in which the arm 172 extends. In the present embodiment, the rib 174 extends frontward from the slide shaft 171, and the arm 172 extends obliquely rearward and downward from the slide shaft 171.

Figure 8A:
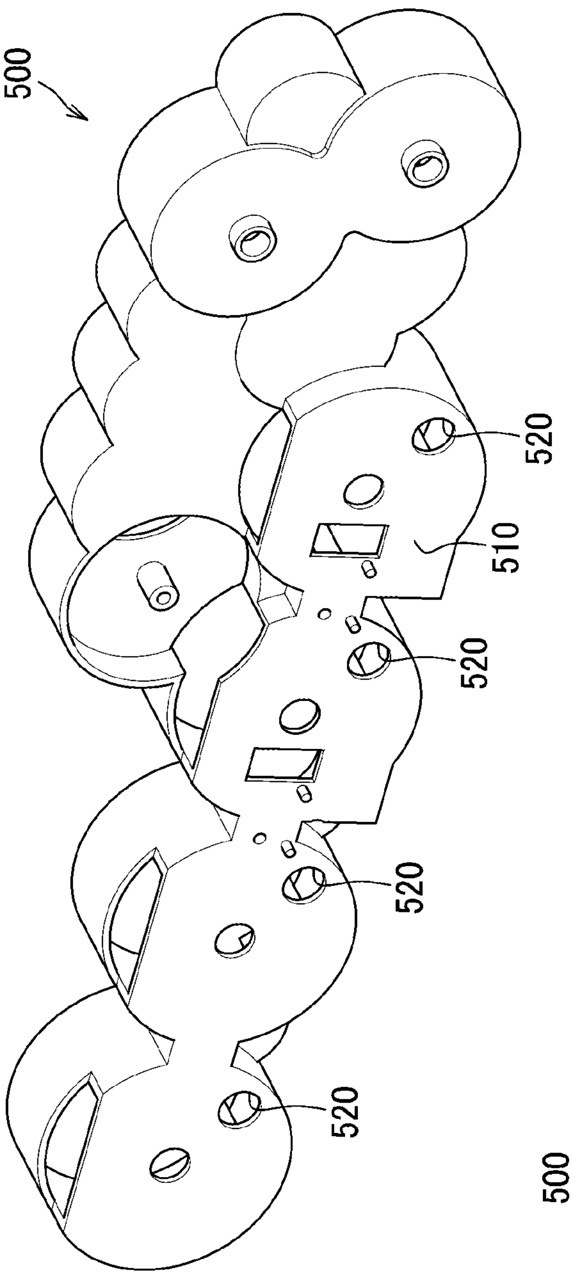
FIG. 8A is a perspective view of a gear cover.
Figure 8B:
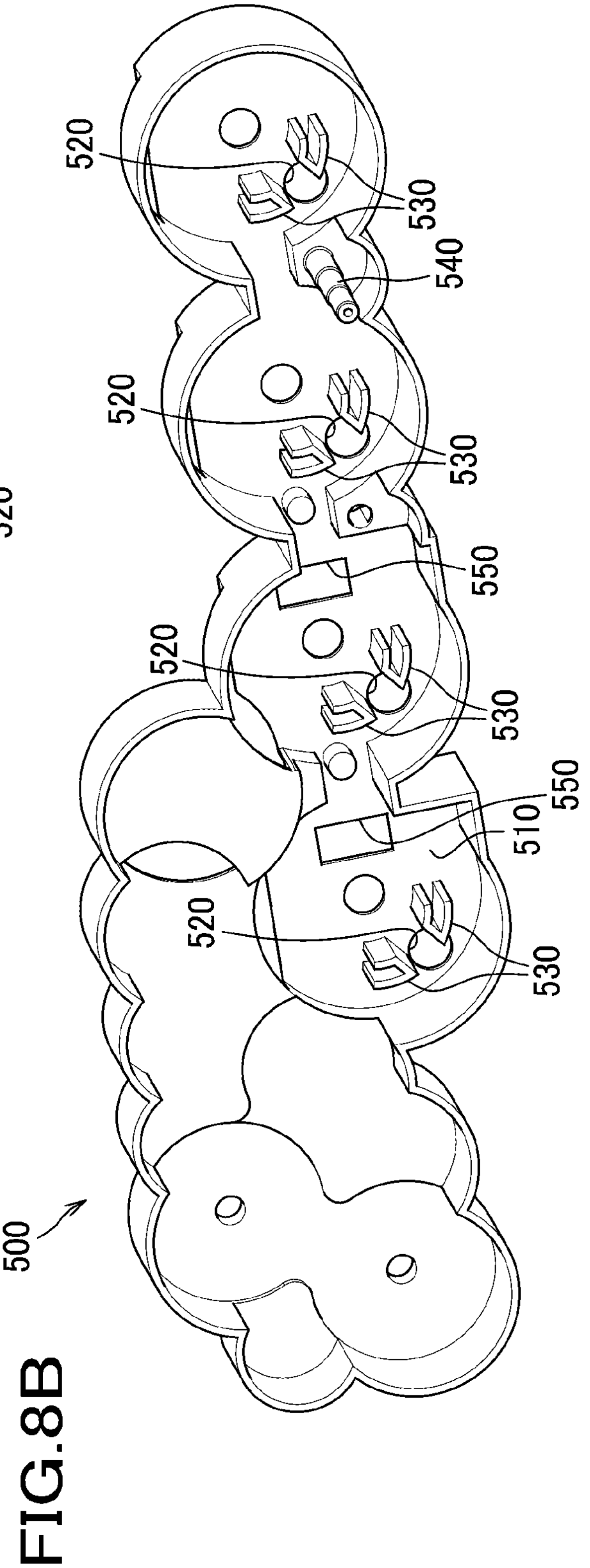
FIG. 8B is another perspective view of the gear cover.

The image forming apparatus 1 further comprise stoppers 530. Four pairs of the stoppers 530 corresponding to the four cam followers 170 are provided (refer to FIG. 4). The stoppers 530 restrain the rotation of the cam follower 170 about the rotation axis of the separation cam 150 (cam gear 115). Specifically, as shown in FIGS. 8A and 8B, the image forming apparatus 1 comprises a gear cover 500, and the gear cover 500 comprises the stoppers 530.

The gear cover 150 is fixed to the meatal sheet 15 (refer to FIG. 3) to thereby cover the separation cams 150 (cam gear 115) and the cam followers 170. The gear cover 500 comprises a cover wall 510. The cover wall 510 is a wall covering the separation cams 150 and the cam followers 170. When the gear cover 500 is fixed to the metal sheet 15, the cover wall 510 faces toward a side surface of the metal sheet 15 in a direction parallel to the rotation axis of the separation cam 150.

The stoppers 530 extend from the cover wall 510 toward the corresponding separation cams 150 in a direction parallel to the rotation axis of the separation cam 150. The stoppers 530 are each shaped like a wall. A pair of stoppers 530 are arranged side by side in the circumferential direction of the slide shaft 171, in a position that hold the arm 172 of the cam follower 170 (refer to FIGS. 6A, 6B, 7A, 7C). With this arrangement, the cam follower 170 is restrained from rotating about the boss 152.

Figure 9A:
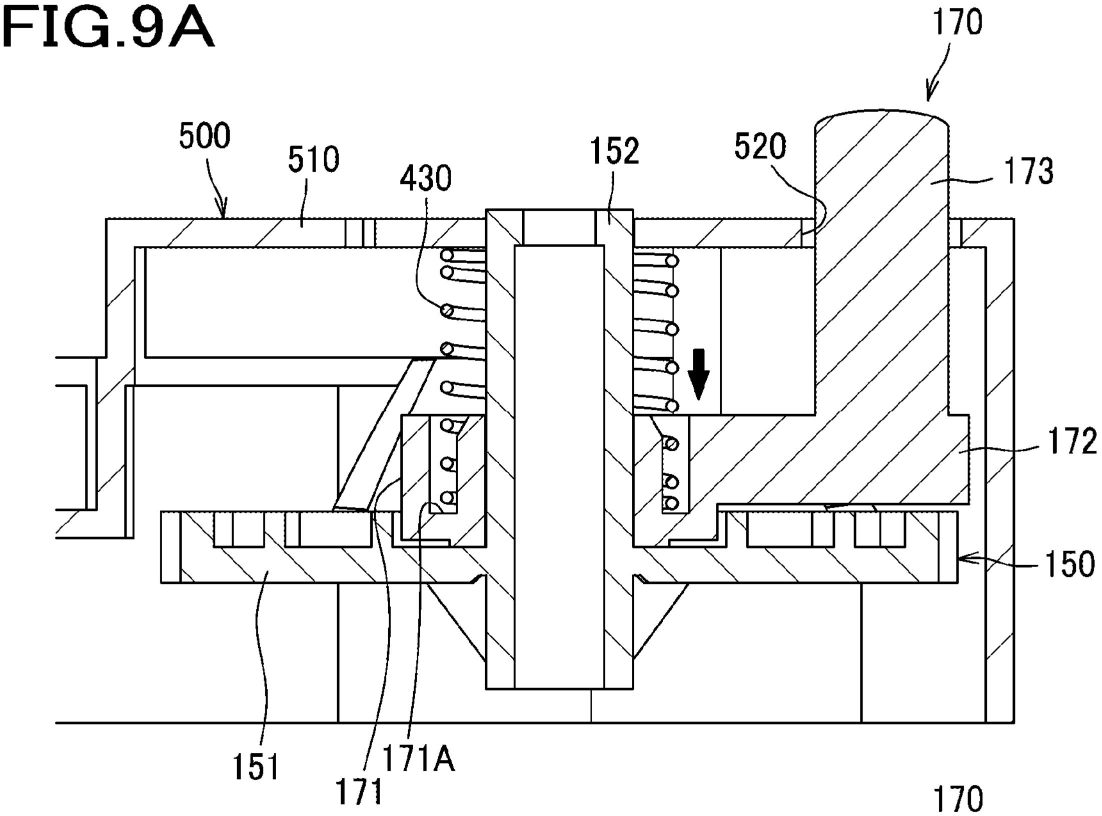
FIG. 9A is a sectional view showing the separation cam, the cam follower, the gear cover, and a spring, as taken when the cam follower is located in the no-push position.
Figure 9B:
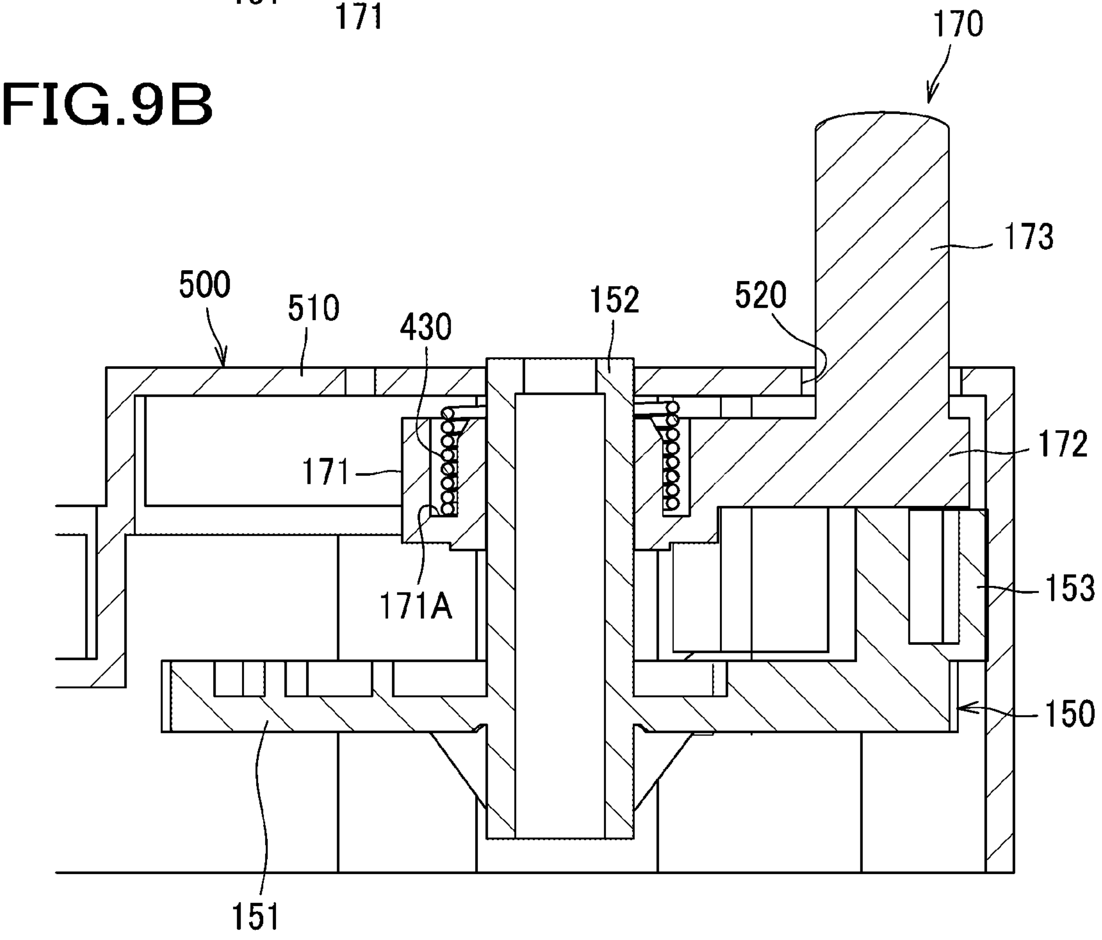
FIG. 9B is a sectional view showing the separation cam, the cam follower, the gear cover, and the spring, as taken when the cam follower is located in the push position.

The cover wall 510 further comprises four insertion holes 520. As shown in FIGS. 9A and 9B, the insertion holes 520 are through holes in which the pins 173 of the cam followers 170 are inserted.

The image forming apparatus 1 further comprises springs 430. Four springs 430 are provided one for each of the four cam followers 170. The spring 430 is a spring that biases the corresponding cam follower 170 so as to cause the corresponding cam follower 150 to move from the push position shown in FIG. 9B toward the no-push position shown in FIG. 9A. The spring 430 is, for example, a compression coil spring. The spring 430 is located between the gear cover 500 and the slide shaft 171 of the cam follower 170. Specifically, the spring 430 is located between the cover wall 510 and the slide shaft 171.

The slide shaft 171 includes a recess 171A. The recess 171A is an annular recess that opens toward the cover wall 510 in a direction parallel to the rotation axis of the separation cam 150. At least one end portion of the spring 430 is located in the recess 171A. The recess 171A restrains an undesirable shift of the position of the spring 430.

As shown in FIGS. 7A and 7B, when the development cartridge 60 is located in the second position, i.e., when the development roller 61 is located in the separate position, the cam follower 170 is located in the push position in which the arm 172 is retained by the retaining surface 153A of the separation cam 150.

The separation cam 150 is caused to rotate in the first rotation direction R1 when the main motor M1 rotates in the forward direction. Then, the arm 172 of the cam follower 170 is guided from the retaining surface 153A to the guide surface 153B and slides over the guide surface 153B until the arm 172 comes out of contact with the cam portion 153. As a result, the cam follower 170 is caused to slide from the push position to the no-push position shown in FIGS. 6A and 6B by the biasing force of the spring 430 (refer to FIGS. 9A and 9B).

Therefore, the development cartridge 60 is caused to move from the second positon to the first position, and the development roller 61 is moved from the separate position to the contact position. The separation cam 150 causes the development roller 61 to move from the separate position to the contact positon when the main motor M1 rotates in the forward direction.

On the other hand, the separation cam 150 is caused to rotate in the second rotation direction R2 when the main motor M1 rotates in the reverse direction. Then, the arm 172 of the cam follower 170 comes in contact with the guide surface 153B, slides over the guide surface 153B, and then comes in contact with the retaining surface 153A. As a result, the cam follower 170 is caused to slide from the no-push position to the push positon shown in FIGS. 7A and 7B.

Therefore, the development cartridge 60 is pushed by the cam follower 170 and caused to move from the first position to the second position, and the development roller 61 is moved from the contact position to the separate position. The separation cam 150 causes the development roller 61 to move from the contact position to the separate position when the main motor M1 rotates in the reverse direction.

Figure 10:
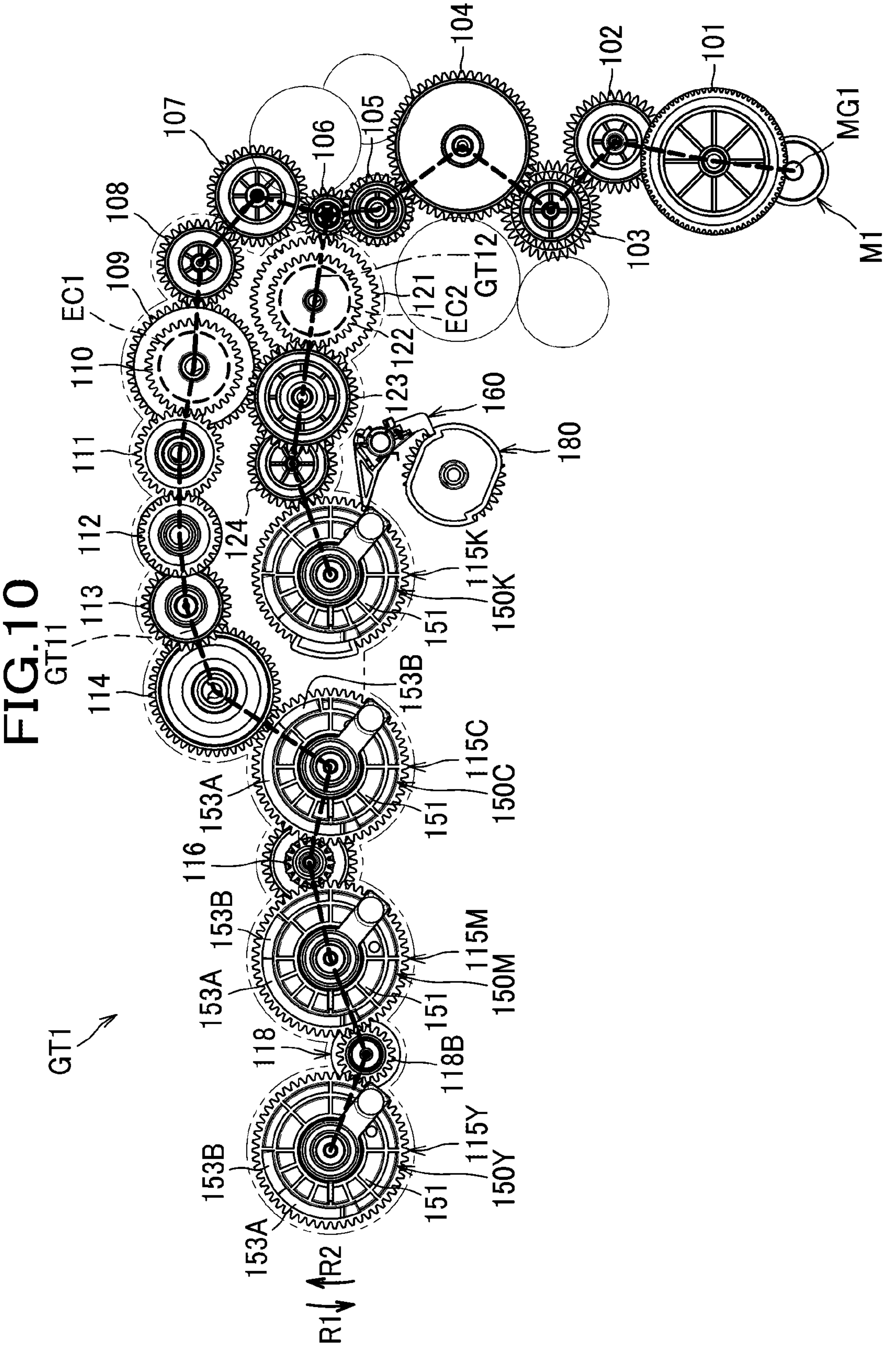
FIG. 10 is a diagram showing a separation gear train.

As shown in FIG. 10, the separation gear train GT1 includes a first separation gear train GT11 and a second separation gear train GT 12.

The first separation gear train GT11 is a gear train that transmits a driving force of the main motor M1 to the separation cams 150Y, 150M, and 150C.

The first separation gear train 11 comprises a gear 101, a gear 102, a gear 103, a gear 104, a gear 105, a gear 106, a gear 107, a gear 108, a gear 109, an electromagnetic clutch EC1, a gear 110, a gear 111, a gear 112, a gear 113, a gear 114, a cam gear 115C, a gear 116, a cam gear 115M, an idle gear 118, and a cam gear 115Y.

The gear 101 is a two-stage gear including a large-diameter gear and a small-diameter gear. The large-diameter gear engages with a motor gear MG1. The motor gear MG1 is a gear provided on the output shaft of the main motor M1. In other words, the image forming apparatus 1 comprises the motor gear MG1. The motor gear MG1 engages with the large-diameter gear of the gear 101. The gear 101 is an example of a gear included in the separation gear train GT1.

The gear 102 engages with the small-diameter gear of the gear 101.

The gear 103 is a two-stage gear including a large-diameter gear and a small-diameter gear, and the large-diameter gear engages with the gear 102.

The gear 104 engages with the small-diameter gear of the gear 103.

The gear 105 is a two-stage gear including a large-diameter gear and a small-diameter gear, and the large-diameter gear engages with the gear 104.

The gear 106 engages with the small-diameter gear of the gear 105.

The gear 107 engages with the gear 106.

The gear 108 engages with the gear 107.

The gear 109 engages with the gear 108.

The electromagnetic clutch EC1 is switchable between a transmit state and a disconnect state. For example, the electromagnetic clutch EC1 is in the transmit state when energized and is in the disconnect state when not energized. The transmit state is a state in which the electromagnetic clutch EC1 transmits a driving force from the main motor M1 to the separation cams 150Y, 150M, and 150C. The disconnect state is a state in which the electromagnetic clutch EC1 does not transmit the driving force from the main motor M1 to the separation cams 150Y, 150M, and 150C. The controller 2 (refer to FIG. 1) controls the electromagnetic clutch EC1.

The gear 110 rotates together with the gear 109 when the electromagnetic clutch EC1 is in the transmit state. When the electromagnetic clutch EC1 is in the disconnect state, the driving force of the main motor M1 is not transmitted to the gear 110; therefore, the gear 110 is not driven.

The gear 111 engages with the gear 110.

The gear 112 is a two-stage gear including a large-diameter gear and a small-diameter gear, and the large-diameter gear engages with the gear 111.

The gear 113 is a two-stage gear including a large-diameter gear and a small-diameter gear, and the large-diameter gear engages with the small-diameter gear of the gear 112.

The gear 114 engages with the small-diameter gear of the gear 113.

The cam gear 115C is a gear including the separation cam 150C. In other words, the separation cam 150C includes gear teeth at the periphery of the disc portion 151. The cam gear 115C engages with the gear 114.

The gear 116 engages with the cam gear 115C.

The cam gear 115M is a gear including the separation cam 150M. In other words, the separation cam 150M includes gear teeth at the periphery of the disc portion 151. The cam gear 115M engages with the gear 116. The cam gear 115M receives a driving force of the main motor M1 from the cam gear 115C via the gear 116.

The idle gear 118 includes a first gear portion 118B as a gear portion. The first gear portion 118B of the idle gear 118 engages with the cam gear 115M.

The cam gear 115Y is a gear including the separation cam 150Y. In other words, the separation cam 150Y includes gear teeth at the periphery of the disc portion 151. The cam gear 115Y engages with the first gear portion 118B of the idle gear 118. The first gear portion 118B of the idle gear 118 engages with both the cam gear 115Y and the cam gear 115M.

The separation cams 150Y, 150M, and 150C are configured to rotate in synchronization with each other. The length of the retaining surface 153A of the separation cam 150C in a direction of rotation of the separation cam 150C is longer than the length of the retaining surface 153A of the separation cam 150M in a direction of rotation of the separation cam 150M, and the length of the retaining surface 153A of the separation cam 150M in a direction of rotation of the separation cam 150M is longer than the length of the retaining surface 153A of the separation cam 150Y in a direction of rotation of the separation cam 150Y. The cams 150Y, 150M, and 150C are configured such that the phases of the downstream end of the retaining surfaces 153A in the first rotation direction R1 thereof coincide substantially with one another, and phases of the guide surfaces 153B thereof are shifted from one another. Specifically, the guide surface 153B of the separation cam 150Y is located downstream of the guide surface 153B of the separation cam 150M in the first rotation direction R1, and the guide surface 153B of the separation cam 150M is located downstream of the guide surface 153B of the separation cam 150C in the first rotation direction R1

Therefore, the rotation of the separation cams 150Y, 150M, and 150C in the first rotation direction R1 by the main motor M1 rotating in the forward direction, made in the state in which the cam followers 170Y, 170M, and 170C are located in the push positions, first causes the cam follower 170Y to move from the push position to the no-push position to thereby cause the development roller 61Y to move from the separate position to the contact position. Then, the cam follower 170M is caused to move from the push position to the no-push position to thereby cause the development roller 61M to move from the separate positon to the contact position. Finally, the cam follower 170C is caused to move from the push position to the no-push position to thereby cause the development roller 61C to move from the separate position to the contact position.

On the other hand, the rotation of the separation cams 150Y, 150M, and 150C in the second rotation direction R2 by the main motor M1 rotating in the reverse direction, made in the state in which the cam followers 170Y, 170M and 170C are located in the no-push positions, first causes the cam follower 170C to move from the no-push position to the push position to thereby cause the development roller 61C to move from the contact position to the separate position. Then, the cam follower 170M is caused to move from the no-push position to the push position to thereby cause the development roller 61M to move from the contact position to the separate position. Finally, the cam follower 170Y is caused to move from the no-push position to the push position to thereby cause the development roller 61Y to move from the contact positon to the separate position.

Figure 11A:
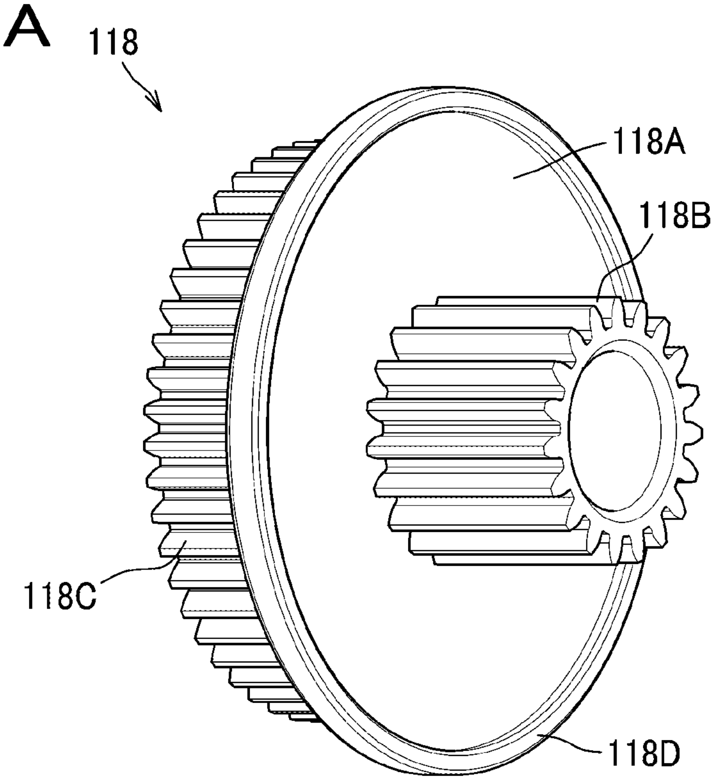
FIG. 11A is a perspective view of an idle gear of a first separation gear train.
Figure 11B:
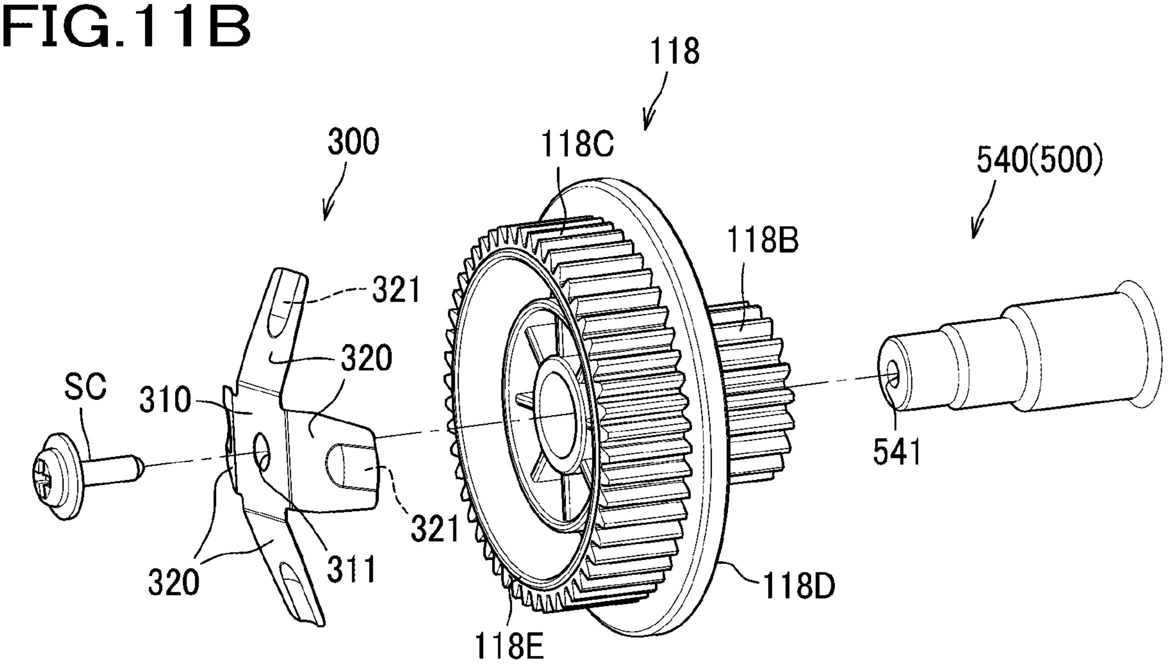
FIG. 11B is a perspective view of the idle gear, a shaft of the gear cover, and a rotation resistance member.

As shown in FIG. 11A and FIG. 11B, the idle gear 118 comprises a disc portion 118A, a first gear portion 118B, a second gear portion 118C, a first rib 118D, and a second rib 118E.

The first gear portion 118B is formed on an outer periphery of a cylindrical portion protruding from the disc portion 118A in a direction parallel to the rotation axis.

The second gear potion 118C is formed on the outer periphery of the second rib 118E. A pitch diameter of the second gear portion 118C is larger than a pitch diameter of the first gear potion 118B. The second gear portion 118C outputs a driving force to a switching cam 190 (refer to FIG. 19) which will be described below.

The first rib 118D is an annular rib protruding from the disc portion 118A in one direction parallel to the rotation axis of the idle gear 118. The second rib 118E is an annular rib protruding from the disc portion 118A in the other direction parallel to the rotation axis of the idle gear 118.

Figure 12:
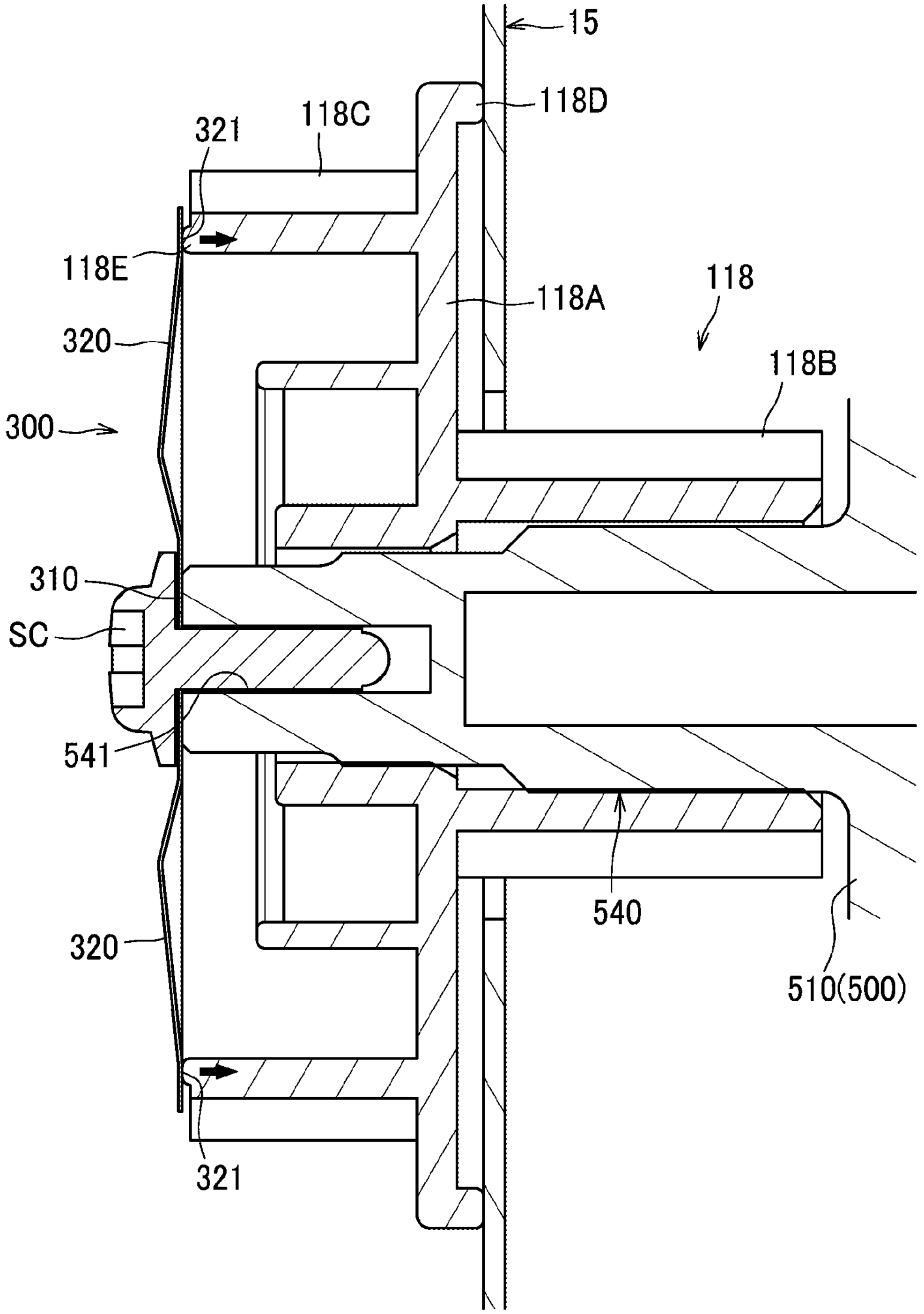
FIG. 12 is a sectional view of the idle gear, the shaft of the gear cover, the rotation resistance member, and a metal sheet.

As shown in FIG. 12, the first rib 118D protrudes toward the metal sheet 15 in a direction parallel to the rotation axis of the idle gear 118. The first rib 118D is located at an end portion of the idle gear 118 in a direction perpendicular to the rotation axis of the idle gear 118. Specifically, the first rib 118D is located at the outer end portion of the disc portion 118A in the radial direction of the disc portion 118A. The first rib 118D is pushed by a rotation resistance member 300 which will be described below, and thereby kept in contact with the metal sheet 15.

The second rib 118E protrudes away from the metal sheet 15 in the direction parallel to the rotation axis of the idle gear 118. The end portion of the second rib 118E in a direction parallel to the rotation axis of the idle gear 118 protrudes farther, than the second gear portion 118C, from the metal sheet 15. An internal diameter of the second rib 118E is smaller than an internal diameter of the first rib 118D. The internal diameter of the second rib 118E is larger than the pitch diameter of the first gear portion 118B.

The idle gear 118 is rotatable relative to the metal sheet 15. Specifically, the gear cover 500 comprises a shaft 540. The shaft 540 protrudes from the cover wall 510 from the cover wall 510 in the other direction opposite to the one direction in which the first rib 118D protrudes parallel to the rotation axis of the idle gear 118.

The idle gear 118 engages with the shaft 540 and is thereby rotatably supported by the gear cover 500. With the gear cover 500 being fixed to the metal sheet 15, the idle gear 118 is rotatable relative to the metal sheet 15. In other words, the metal sheet 15 supports the idle gear 118 via the gear cover 500 in a manner that renders the idle gear 118 rotatable.

The first gear portion 118B, and the cam gears 115Y and 115M (refer to FIG. 3) that engage with the first gear portion 118B, are located at a first side of the metal sheet 15 as defined by a side surface thereof facing in a direction parallel to the rotation axis of the idle gear 118. The second gear portion 118C is located at a second side, opposite to the first side, of the metal sheet 15. The first rib 118D and the second rib 118E are also located at the other side of the metal sheet 15.

Specifically, in FIG. 12, the first gear portion 118B and the cam gears 115Y and 115M are located at the right side of the metal sheet 15. The second gear portion 118C, the first rib 118D, and the second rib 118E are located at the left side of the metal sheet 15.

As shown in FIG. 11B, the image forming apparatus 1 further comprises a rotation resistance member 300.

The rotation resistance member 300 is a member that applies rotation resistance to the idle gear 118. Specifically, the rotation resistance member 300 is configured to push the idle gear 118 in a direction parallel to the rotation axis to apply rotation resistance to the idle gear 118.

The rotation resistance member 300 is a spring. Specifically, the rotation resistance member 300 is a leaf spring made of a metal sheet. The rotation resistance member 300 has a base portion 310 and four push portions 320.

The base portion 310 is a portion that is fixed to the shaft 540 of the gear cover 500 by a screw SC. The base portion 310 has a through hole 311 at its center. The through hole 311 is a hole through which a screw portion of the screw SC is inserted. The shaft 540 has a hole 541 in which the screw SC is screwed.

Figure 13:
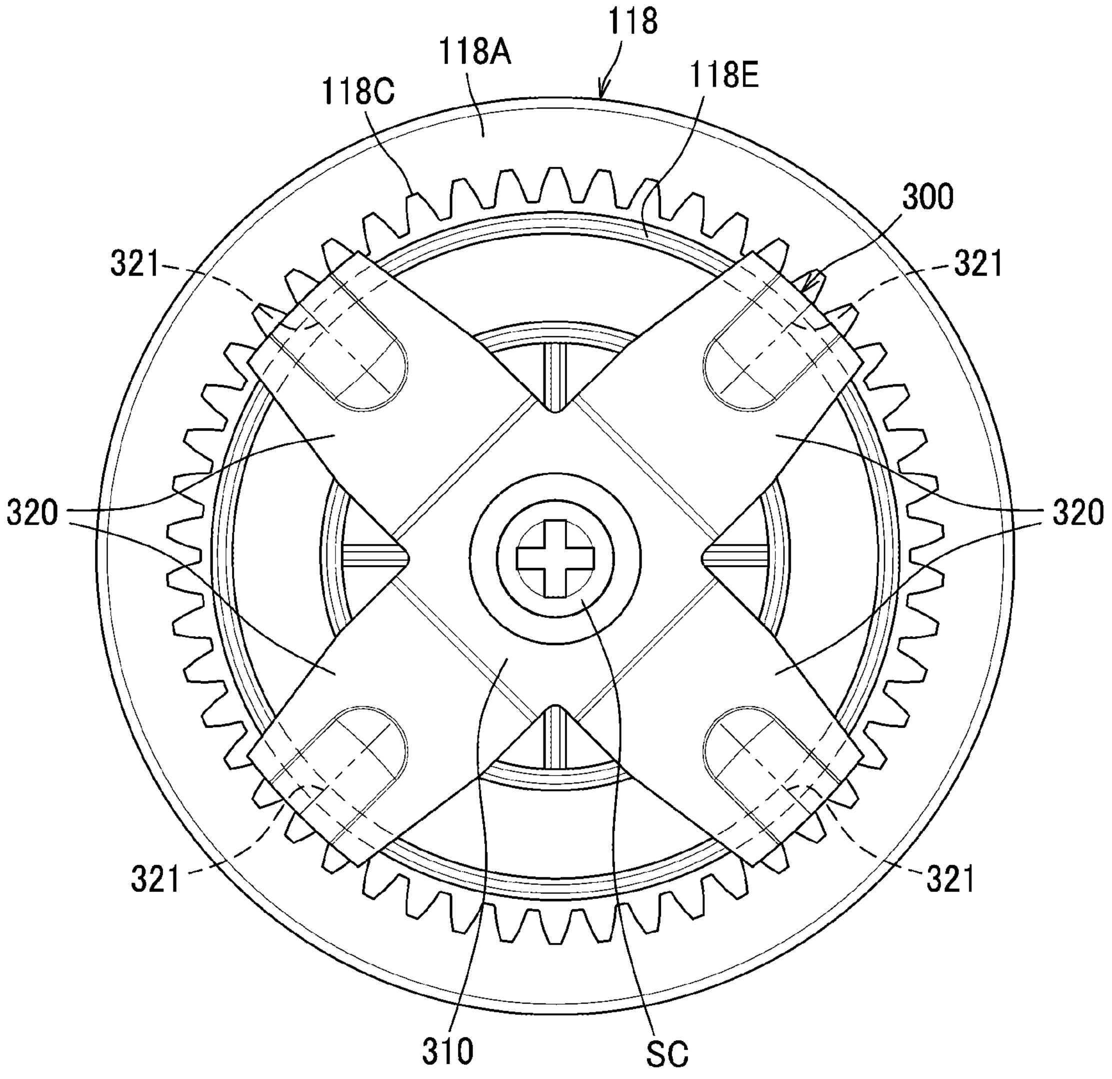
FIG. 13 is a diagram showing the idle gear and the rotation resistance member.

As shown in FIG. 13, the pressing portions 320 are portions that press the idle gear 118. The pressing portions 320 extend from the base portion 310. The four pressing portions 320 are located at positions that are symmetrical with respect to the rotation axis of the idle gear 118. Specifically, each of the four pressing portions 320 is shifted 90 degrees in the rotation direction of the idle gear 118 from the other pressing portions 320 adjacent thereto.

As shown in FIG. 12, the rotation resistance member 300 is located at the other side of the metal sheet 15 in the direction parallel to the rotation axis of the idle gear 118. The four pressing portions 320 of the rotation resistance member 300 fixed to the shaft 540 contact the idle gear 118, and the rotation resistance member 300 pushes the idle gear 118 in a direction parallel to the rotation axis of the idle gear 118, which is a direction opposite to the direction in which the side surface of the metal sheet 15 faces.

Specifically, the four pressing portions 320 of the rotation resistance member 300 contact the second rib 118E of the idle gear 118E, and the rotation resistance member 300 pushes the second rib 118E in the direction parallel to the rotation axis of the idle gear 118, which is a direction opposite to the direction in which the side surface of the metal sheet 15 faces. Therefore, the first rib 118D of the idle gear 118 is pressed against the metal sheet 15.

Since the inner diameter of the second rib 118E is larger than the pitch diameter of the first gear portion 118B, the pressing portions 320 press the idle gear 118 at positions outward, in the radial direction of the idle gear 118, of the pitch circle of the first gear portion 118B.

As shown in FIG. 13, each of the pressing portions 320 has a contact portion 321. The contact portion 321 has a part protruding in one direction parallel to the rotation axis of the idle gear 118, and has a cross section curved in an arcuate shape. The pressing portion 320 contacts the second rib 118E at a ridgeline portion of the contact portion 321 (refer to the chain double-dashed line). The ridgeline portion of the contact portion 321 extends in approximately the same direction as that in which the pressing portion 320 extends from the base portion 310 in such a manner that the ridgeline portion crosses the rib 118E.

Since the contact portion 321 configured as described above contacts the second rib 118E, even if there is some undesirable shift in the location of the rotation resistance member 300 in a direction perpendicular to the rotation axis of the idle gear 118, the pressing portion 320 can evenly contact the second rib 118E. Therefore, a load can be evenly applied to the idle gear 118.

The rotation resistance member 300 is restrained from rotating about the rotation axis of the idle gear 118 by a stopper provided on a cover that covers the rotation resistance member 300.

As shown in FIG. 10, the second separation gear train GT12 is a gear train configured to transmit a driving force of the main motor M1 as received from the first separation gear train GT11 to the separation cam 150K. The second separation gear train 12 comprise a gear 121, an electromagnetic clutch EC2, a gear 122, a gear 123, a gear 124, and a cam gear 115K.

The gear 121 engages with the gear 106 of the first separation gear train 11.

The electromagnetic clutch EC2 is switchable between a transmit state and a disconnect state. For example, the electromagnetic clutch EC2 is in the transmit state when energized and is in the disconnect state when not energized. The transmit state is a state in which the electromagnetic clutch EC2 transmits a driving force received from the main motor M1 to the separation cam 150K. The disconnect state is a state in which the electromagnetic clutch does not transmit the driving force received from the main motor M1 to the separation cam 150K. The controller 2 (refer to FIG. 1) controls the electromagnetic clutch EC2.

The gear 122 rotates together with the gear 121 when the electromagnetic clutch EC2 is in the transmit state. Since the driving force of the main motor M1 is not transmitted to the gear 122 when the electromagnetic clutch EC2 is in the disconnect state, the gear 122 is not driven.

The gear 123 is a two-stage gear including a large-diameter gear and a small-diameter gear, and the large-diameter gear engages with the gear 122.

The gear 124 engages with the small-diameter gear of the gear 123.

The cam gear 115K is a gear including the separation cam 150K. In other words, the separation cam 150K includes gear teeth at the periphery of the disc portion 151. The cam gear 115K engages with the gear 124.

Figure 14:
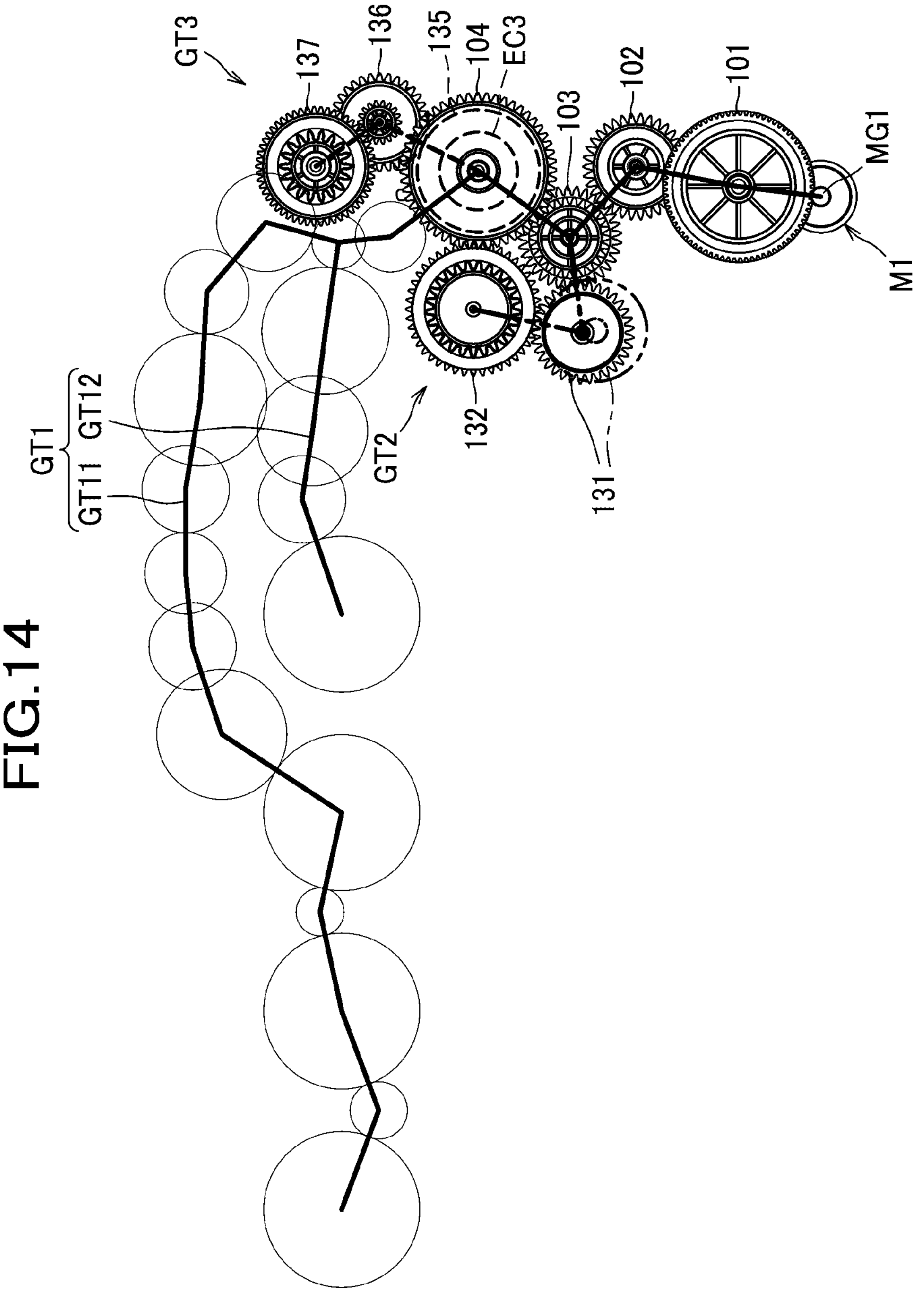
FIG. 14 is a diagram showing a fixing gear train and an adjusting gear train.

As shown in FIG. 14, the fixing gear train GT2 comprises a moving gear 131 and an output gear 132.

The moving gear 131 is a gear that receives a driving force from the main motor M1. The moving gear 131 engages with the large-diameter gear of the gear 103 included in the first separation gear train GT11. The moving gear 131 is movable relative to the output gear 132 between a transmit position indicated by a solid line and a disconnect position indicated by a chain double-dashed line. Specifically, the moving gear 131 is swingable around the gear 103 between the transmit position and the disconnect position.

The transmit position is a position in which the moving gear 131 engages with the output gear 132, and the disconnect position is a position in which the moving gear 131 does not engage with the output gear 132. The moving gear 131 is located in the transmit position when the main motor M1 rotates in the forward direction, and is located in the disconnect position when the main motor M1 rotates in the reverse direction.

The output gear 132 is a gear that outputs a driving force to the fixing device 80. Specifically, the output gear 132 outputs a driving force to the heating roller 81A. The output gear 132 is a two-stage gear including a large-diameter gear and a small-diameter gear, and the large-diameter gear engages with the moving gear 131 located in the transmit position.

Figure 15:
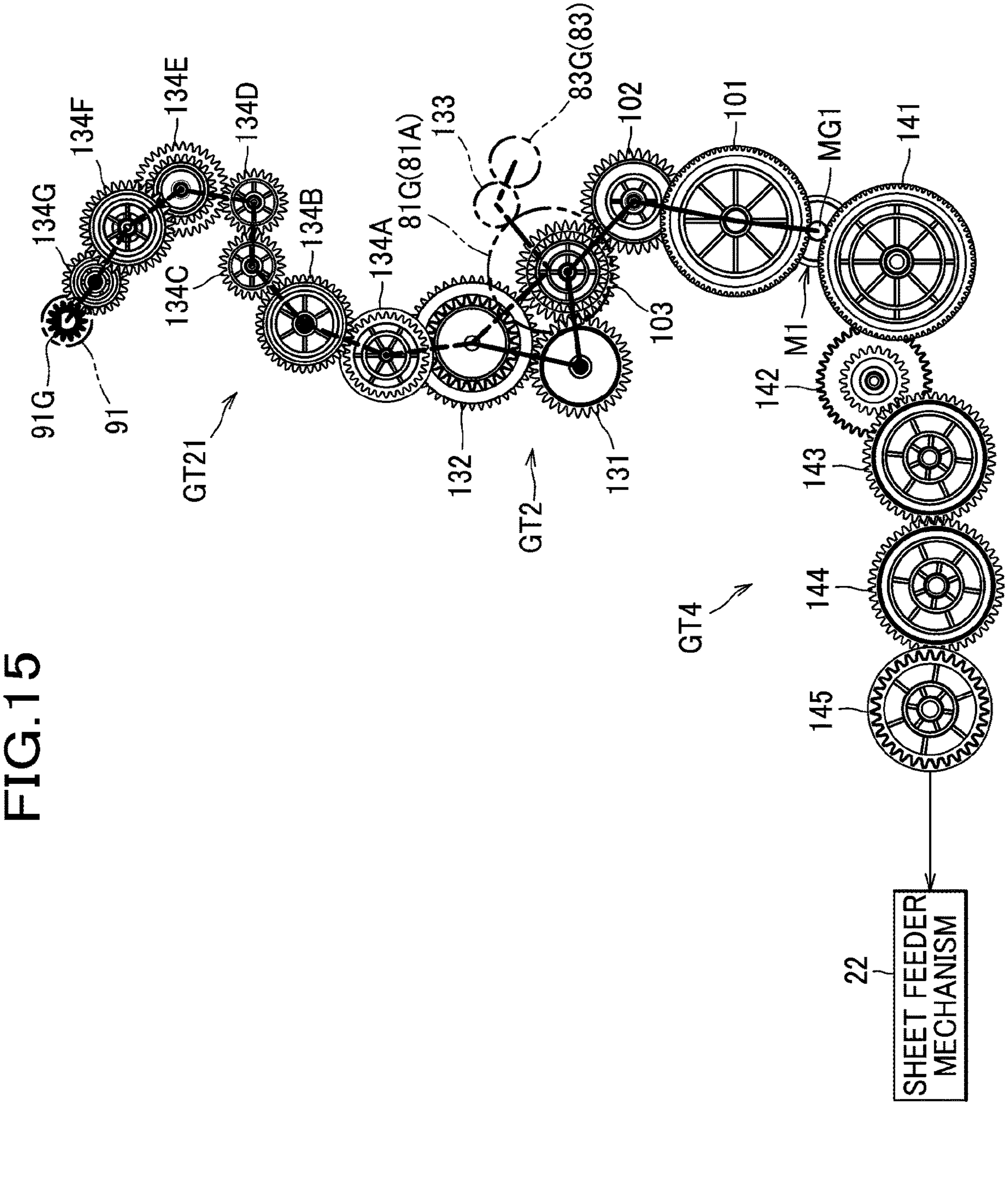
FIG. 15 is a diagram showing the fixing gear train, a first ejection roller gear, an ejection gear train, a second ejection roller gear, and a sheet feeder gear train.

As shown in FIG. 15, the heating roller 81A has a heating roller gear 81G fixed to one end thereof, and the small-diameter gear of the output roller 132 engages with the heating roller gear 81G. The pressure portion 82 (pressure roller) of the fixing device 80 is caused to rotate together with the heating roller 81A when the heating roller 81A rotates.

The first ejection roller 81 and the second ejection roller 82 receive the driving force of the main motor M1 from the fixing gear train GT2. The first ejection roller 83 has a first ejection roller gear 83G fixed to one end. The second ejection roller 91 has a second ejection roller gear 91G fixed to one end.

The image forming apparatus 1 further comprises a gear 133 and an ejection gear train GT21.

The gear 133 engages with the heating roller gear 81G, and the first ejection roller gear 83G engages with the gear 133. Therefore, the first ejection roller 83 is caused to rotate when receiving the driving force of the main motor M1 from the output gear 132 of the fixing gear train GT2, via the heating roller gear 81G and the gear 133.

The ejection gear train GT21 comprises a gear 134A, a gear 134B, a gear 134C, a gear 134D, a gear 134E, a gear 134F, and a gear 134G.

The gear 134A engages with the small-diameter gear of the output gear 132.

The gear 134B engages with the gear 134A.

The gear 134C engages with the gear 134B.

The gear 134D engages with the gear 134C.

The gear 134E is a two-stage gear including a large-diameter gear and a small-diameter gear, and the large-diameter gear engages with the gear 134D.

The gear 134F is a two-stage gear including a large-diameter gear and a small-diameter gear, and the small diameter gear engages with the small-diameter gear of the gear 134E.

The gear 134G engages with the small-diameter gear of the gear 134F.

The second ejection roller gear 91G engages with the gear 134G. Therefore, the second ejection roller 91 is caused to rotate when receiving the driving force of the main motor M1 from the output gear 132 of the fixing gear train GT2 via the ejection gear train GT21.

Figure 16A:
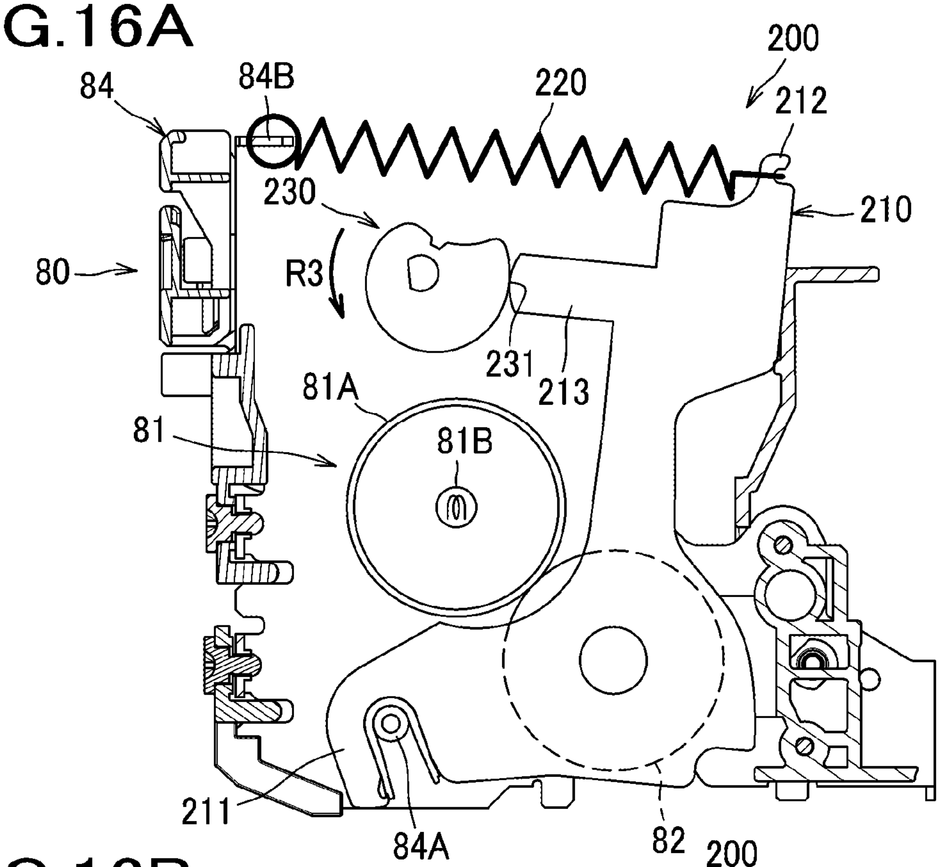
FIG. 16A is a diagram of an adjusting mechanism in which the nip pressure is adjusted to a first nip pressure.
Figure 16B:
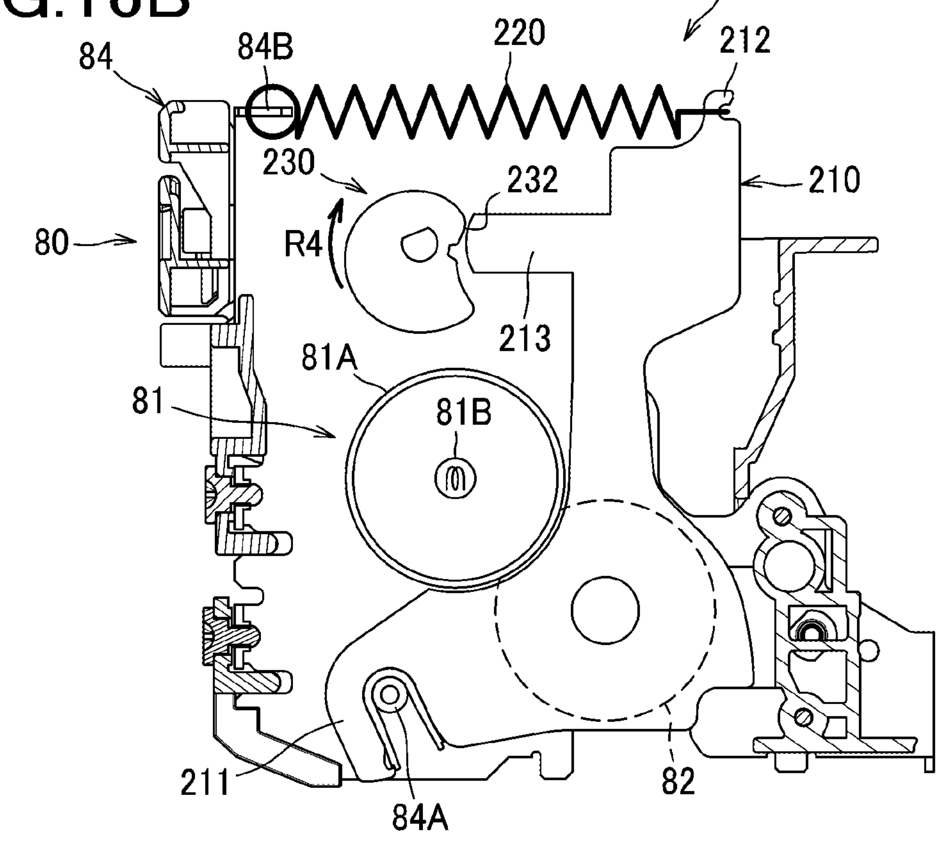
FIG. 16B is a diagram of the adjusting mechanism in which the nip pressure is adjusted to a second nip pressure.

As shown in FIGS. 16A and 16B, the adjusting mechanism 200 is a mechanism that receives a driving force from the main motor M1 and thereby switches the nip pressure to be produced by the heating portion 81 and the pressure portion 82. Specifically, the adjusting mechanism 200 switches the nip pressure to be produced by the heating roller 81A and the pressure portion 82 between a first nip pressure indicated in FIG. 16A, and a second nip pressure indicated in FIG. 16B.

The second nip pressure is a nip pressure higher than the first nip pressure. In the present embodiment, the first nip pressure is a nip pressure in a standby state before executing a printing process, and the second nip pressure is a nip pressure to be produced when the printing process is executed. In the present embodiment, the heating portion 81 and the pressure portion 82 also contact each other at the first nip pressure. Hereinafter, the first nip pressure will also be referred to as "low nip pressure," and the second nip pressure will also be referred to as "high nip pressure."

The adjusting mechanism 200 is provided in the fixing device 80. The fixing device 80 further comprises a fixing frame 84 and this adjusting mechanism 200.

The fixing frame 84 supports the heating portion 81. Specifically, the fixing frame 84 supports the heating roller 81A in a manner that renders the heating roller 81A rotatable. The fixing frame 84 comprises a shaft 84A and a spring engaging part 84B provided at each of the outer ends of the fixing frame 84 in the directions parallel to the rotation axis.

The adjusting mechanism 200 further comprises an arm 210, a spring 220, and an adjusting cam 230. The arm 210, the spring 220, and the adjusting cam 230 are provided at each of the outer ends of the pressure portion 82 in the direction parallel to the rotation axis.

The arm 210 supports the pressure portion 82 (pressure roller) in a manner that renders the pressure portion 82 rotatable. The arm 210 includes a first end portion 211, a second end portion 212, and a cam contact portion 213. The arm 210 is rotatably supported by the frame 84 at the first end portion 211 engaging with the shaft 84A. The cam contact portion 213 is located between the first end portion 211 and the second end portion 212, and extends toward the adjusting cam 230.

The spring 220 is a spring that biases the pressure portion 82 toward the heating portion 81. For example, the spring 220 is a tension spring. One end portion of the spring 220 engages with the spring engaging portion 84B of the fixing frame 84, and the other end portion of the spring 220 engages with the second end portion 212 of the arm 210.

The adjusting cam 230 receives the driving force from the main motor M1 to thereby switch the nip pressure to be produced by the heating portion 81 and the pressure portion 82 between a the first nip pressure and the second nip pressure. The adjusting cam 230 receives the driving force from the main motor M1 to thereby switch the nip pressure to be produced by the heating roller 81A and the pressure portion 82 (pressure roller) between the first nip pressure as observed by the arrangement shown in FIG. 16A and the second nip pressure as observed by the arrangement shown in FIG. 16B.

The adjusting cam 230 is rotatably supported by the fixing frame 84. Specifically, the adjusting cam 230 is rotatable about an axis parallel to the rotation axis of the heating roller 81A. The adjusting cam 230 is rotatable between a first cam phase shown in FIG. 16A and a second cam phase shown in FIG. 16B. The adjusting cam 230 is a plate cam. Specifically, the adjusting cam 230 has a first part 231 and a second part 232 at its outer edge surface.

The first part 231 is a part that contacts the cam contact portion 213 when the adjusting cam 230 is in the first cam phase shown in FIG. 16A. When the nip pressure cam 230 is in the first phase, the nip pressure produced by the heating portion 81 and the pressure portion 82 is the low nip pressure.

The second part 232 is a part facing the cam contact portion 213 when the adjusting cam 230 is in the second phase shown in FIG. 16B. When the adjusting cam 250 is in the second phase, the second part 232 is distanced from the cam contact portion 213. When the adjusting cam 230 is in the second phase, the nip pressure produced by the heating portion 81 and the pressure portion 82 is the high nip pressure.

The adjusting mechanism 200 switches the nip pressure to be produced by the heating portion 81 and the pressure portion 82 from the low nip pressure to the high nip pressure, by the adjusting cam 230 rotating in a third rotation direction R3 shown in FIG. 16A from the first cam phase 270 degrees to the second cam phase shown in FIG. 16B. The third rotation direction R3 is a direction thin which the adjusting cam 230 is caused to rotate when the main motor M1 rotates in the forward direction.

The adjusting mechanism 200 switches the nip pressure to be produced by the heating portion 81 and the pressure portion 82 from the high nip pressure to the low nip pressure, by the adjusting cam 230 rotating in a fourth rotation direction R4 shown in FIG. 16B from the second cam phase to the first cam phase shown in FIG. 16A. The fourth rotation direction R4 is a direction in which the adjusting cam 230 is caused to rotate when the main motor M1 rotates in the reverse direction. The fourth rotation direction R4 is a rotation direction opposite to the third rotation direction R3

As shown in FIG. 14, the adjusting gear train GT3 comprises a clutch connecting gear 135, a gear 136, and a gear 137. The image forming apparatus 1 further comprises an electromagnetic clutch EC3.

The electromagnetic clutch EC3 is switchable between a transmit state and a disconnect state. For example, the electromagnetic clutch EC3 is in the transmit state when energized and is in the disconnect state when not energized. The transmit state is a state in which the driving force of the main motor M1 is transmitted from the separation gear train GT1 to the adjusting gear train GT3. In other words, the transmit state is a state in which the driving force received from the main motor M1 is transmitted to the adjusting cam 230. The disconnect state is a state in which the driving force of the main motor M1 is not transmitted from the separation gear train GT1 to the adjusting gear train GT3. In other words, the disconnect state is a state in which the driving force received from the main motor M1 is not transmitted to the adjusting cam 230. The controller 2 (refer to FIG. 1) controls the electromagnetic clutch EC3.

The clutch connecting gear 135 rotates together with the gear 104 of the separation gear train GT1 when the electromagnetic clutch EC3 is in the transmit state. The clutch connecting gear 135 rotates about the same axis as that about which the gear 104 rotates. The gear 104 is an example of a gear included in the separation gear train GT1. Since the driving force of the main motor M1 is not transmitted to the clutch connecting gear 135 when the electromagnetic clutch EC3 is in the disconnect state, the clutch connecting gear 135 is not driven.

The gear 136 is a two-stage gear including a large-diameter gear and a small-diameter gear, and the large diameter gear engages with the clutch connecting gear 135.

The gear 137 is a two-stage gear including a large-diameter gear and a small-diameter gear, and the large diameter gear engages with the small-diameter gear of the gear 136. The adjusting cam 230 of the adjusting mechanism 200 (refer to FIGS. 16A and 16B) receives the driving force of the main motor M1 from the small-diameter gear of the gear 137 to thereby rotate.

As shown in FIG. 15, the sheet feeder gear train GT4 comprises a gear 141, a gear 142, a gear 143, a gear 144, and a gear 145.

The gear 141 is a two-stage gear including a large-diameter gear and a small-diameter gear, and the large-diameter gear engages with the motor gear MG1. In other words, the motor gear MG1 engages with the large-diameter gear of the gear 141. The gear 141 is an example of a gear included in the sheet feeder gear train GT4.

The gear 142 is a two-stage gear including a large-diameter gear and a small-diameter gear, and the large-diameter gear engages with the small-diameter gear of the gear 141.

The gear 143 engages with the small-diameter gear of the gear 142.

The gear 144 engages with the gear 143.

The gear 145 engages with the gear 144. The gear 145 outputs a driving force to the sheet feeder mechanism 22. The sheet feeder mechanism 22 receives the driving force from the main motor M1 to thereby feed the sheet S toward the image forming unit 30.

Figure 17:
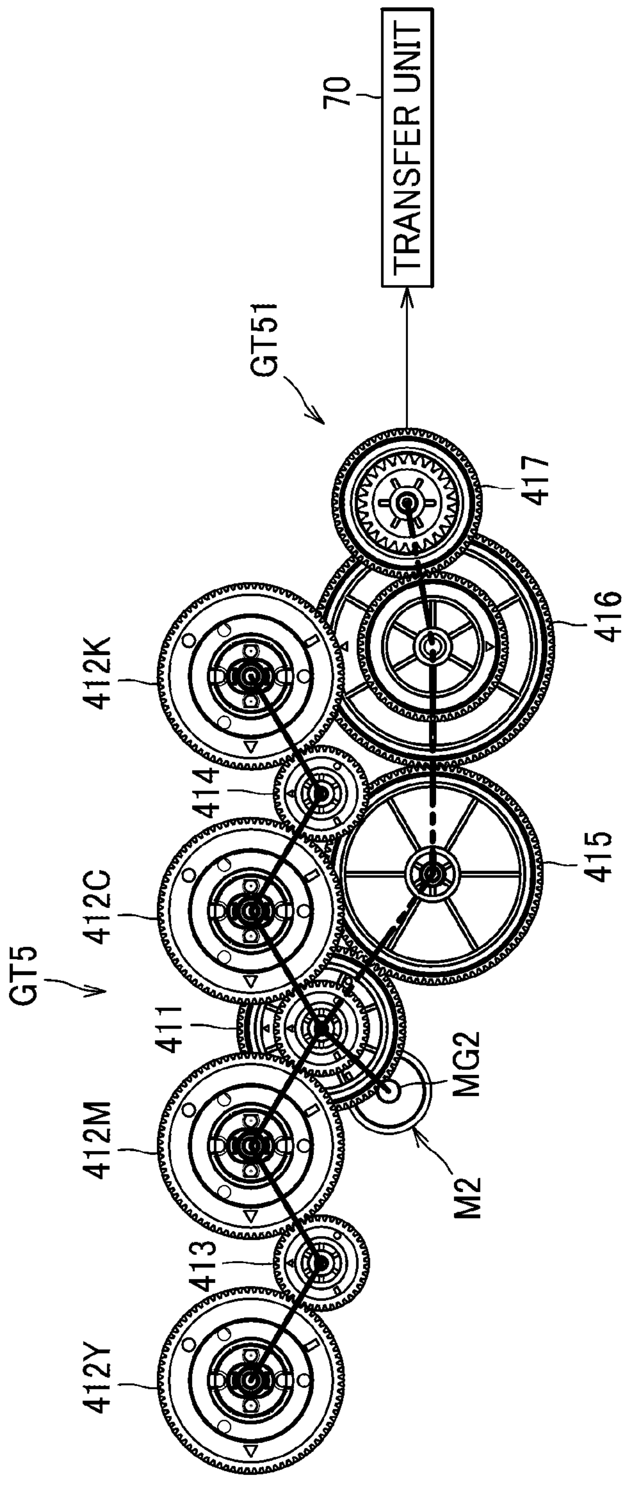
FIG. 17 is a diagram showing a drum gear train.

As shown in FIG. 17, the drum gear train GT5 comprises a gear 411, a drum gear 412M, a gear 413, a drum gear 412Y, a drum gear 412C, a gear 414, and a drum gear 412K.

The gear 411 is a two-stage gear including a large-diameter gear and a small-diameter gear, and the large-diameter gear engages with a motor gear MG2. The motor gear MG2 is a gear provided on an output shaft of the process motor M2. The motor gear MG2 is located between a center of rotation of the drum gear 412M and a center of rotation of the drum gear 412C, in a front-rear direction that is a direction in which the development rollers 50 are arranged.

The drum gear 412M is a gear that rotates together with the photosensitive drum 50M, and engages with the small-diameter gear of the gear 411.

The gear 413 engages with the drum gear 412M

The drum gear 412Y is a gear that rotates together with the photosensitive drum 50Y, and engages with the gear 413.

The drum gear 412C is a gear that rotates together with the photosensitive drum 50C, and engages with the small-diameter gear of the gear 411.

The gear 414 engages with the drum gear 412C.

The drum gear 412K is a gear that rotates together with the photosensitive drum 50K, and engages with the gear 414.

The image forming apparatus 1 further comprises a transfer gear train GT51. The transfer gear train GT51 is a gear train that receives the driving force of the process motor M2 from the drum gear train GT5 and transmits the driving force to the transfer unit 70. The transfer gear train GT51 comprises a gear 415, a gear 416, and a gear 417.

The gear 415 engages with the large-diameter gear of the gear 411.

The gear 416 is a two-stage gear including a large-diameter gear and a small-diameter gear, and its large-diameter gear engages with the gear 415.

The gear 417 is a two-stage gear including a large-diameter gear and a small-diameter gear, and this large-diameter gear engages with the small-diameter gear of the gear 416. The gear 417 outputs a driving force to the transfer unit 70. The photosensitive drum 50 and the transfer unit 70 receive the driving force from the process motor M2 and thereby convey a sheet S through between the photosensitive drum 50 and the transfer roller 74.

Figure 18:
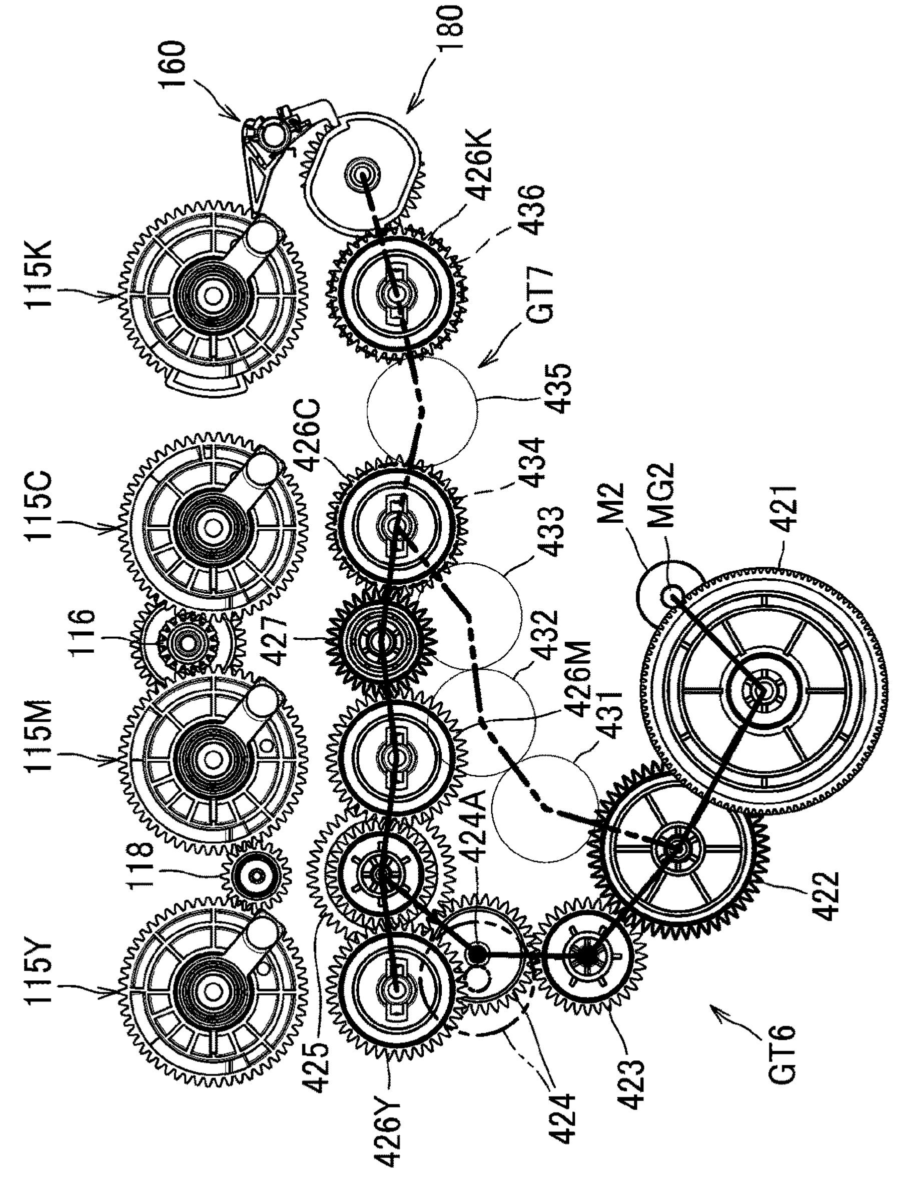
FIG. 18 is a diagram showing a first development roller gear train.

As shown in FIG. 18, the first development roller gear train GT6 comprises a gear 421, a gear 422, a gear 423, a moving gear 424, a first output gear 425, a coupling gear 426Y, a coupling gear 426M, a gear 427, and a coupling gear 426C.

The gear 421 is a two-stage gear including a large-diameter gear and a small-diameter gear, and this large-diameter gear engages with the motor gear MG2. The motor gear MG2 is located between a center of rotation of the coupling gear 426M and a center of rotation of the coupling gear 426C in the front-rear direction.

The gear 422 engages with the small-diameter gear of the gear 421.

The gear 423 engages with the gear 422.

The moving gear 424 is a gear that receives a driving force from the process motor M2, and engages with the gear 423. The moving gear 424 is movable relative to the first output gear 425 between a first transmit position indicated by a solid line and a first disconnect position indicated by a chain double-dashed line. Specifically, the moving gear 424 is swingable around the gear 423 between the first transmit position and the first disconnect position. A shaft 424A of the moving gear 424 is swingably supported by the metal sheet 15 (refer to FIG. 19).

The first transmit position is a position in which the moving gear 424 engages with the first output gear 425, and the first disconnect position is a position in which the moving gear 424 does not engage with the first output gear 425. The moving gear 424 is biased from the first disconnect position toward the first transmit position by a spring. The moving gear 424 is caused to move between the first transmit position and the first disconnect position by a switching cam 190 (refer to FIG. 19) which will be described below.

The first output gear 425 is a gear that outputs a driving force to the development rollers 61Y, 61M, and 61C. The first output gear 425 is a two-stage gear including a large-diameter gear and a small-diameter gear, and this large-diameter gear engages with the moving gear 424 located in the first transmit position.

The coupling gear 426Y engages with the small-diameter gear of the first output gear 425. The coupling gear 426Y is a gear that outputs the driving force received from the process motor M2 to the development roller 61Y. Specifically, the coupling gear 426Y outputs the driving force received from the process motor M2 to the development cartridge 60Y.

The coupling gear 426M engages with the small-diameter gear of the first output gear 425. The coupling gear 426M is a gear that outputs the driving force received from the process motor M2 to the development roller 61M. Specifically, the coupling gear 426M outputs the driving force received from the process motor M2 to the development cartridge 60M.

The gear 427 engages with the coupling gear 426M.

The coupling gear 426C engages with the gear 427. The coupling gear 426C is a gear that outputs the driving force received from the process motor M2 to the development roller 61C. Specifically, the coupling gear 426C outputs the driving force received from the process motor M2 to the development cartridge 60C.

Figure 19:
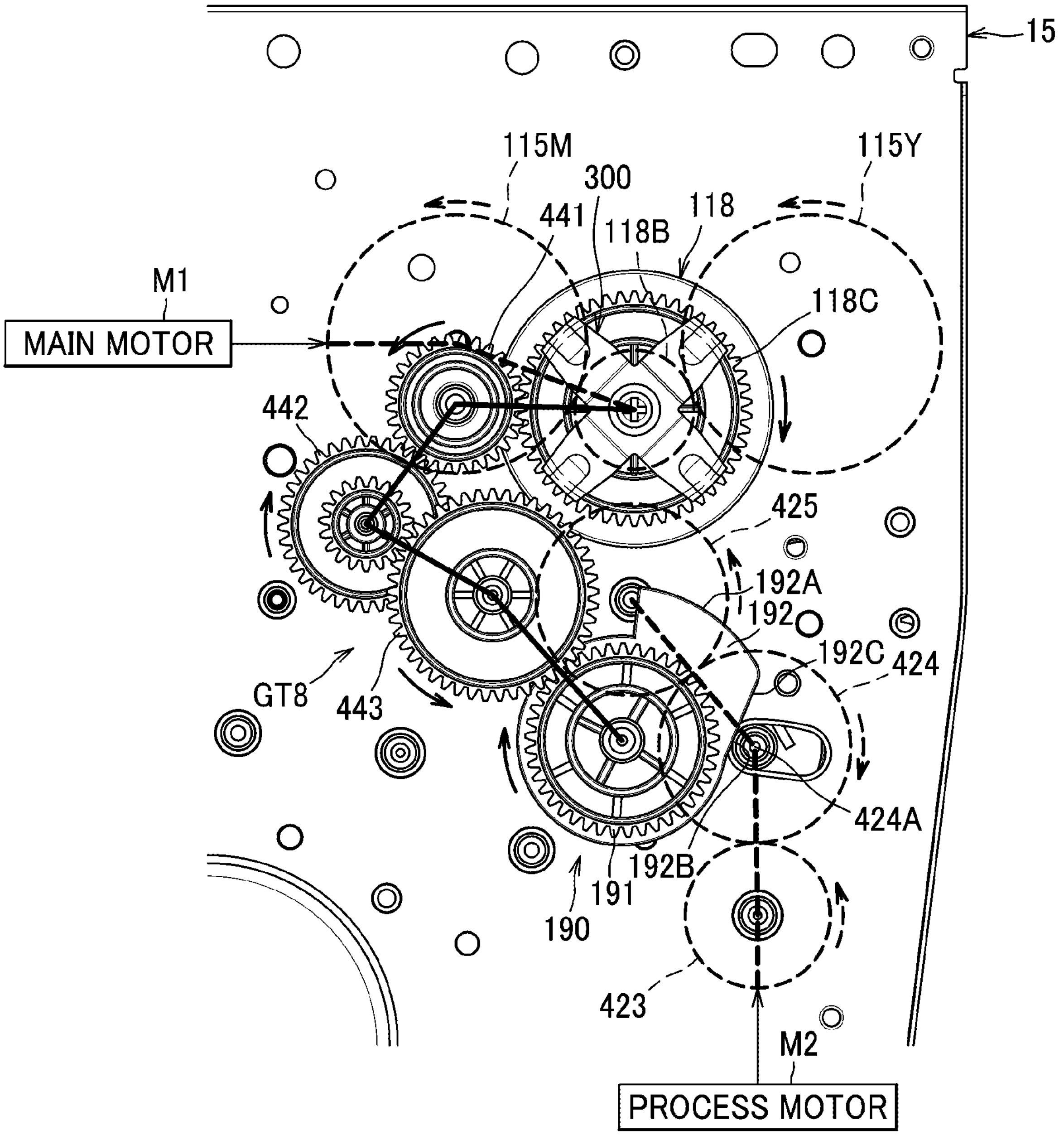
FIG. 19 is a diagram showing the idle gear, a switching gear train, and a switching cam in a first phase.

As shown in FIG. 19, the image forming apparatus 1 further comprises a switching cam 190 and a switching gear train GT8.

The switching gear train GT8 is a gear train that transmits a driving force of the main motor M1 to the switching cam 190. The switching gear train GT8 receives the driving force of the main motor M1 from the first separation gear train GT11 (refer to FIG. 10) and transmits the driving force to the switching cam 190. Specifically, the switching gear train GT8 receives the driving force of the main motor M1 from the idle gear 118 of the first separation gear train GT11 and transmits the driving force to the switching cam 190.

The switching gear train GT8 comprises a gear 441, a gear 442, and a gear 443.

The gear 441 engages with the second gear portion 118C of the idle gear 118.

The gear 442 is a two-stage gear including a large-diameter gear and a small-diameter gear, and this large-diameter gear engages with the gear 441.

The gear 443 engages with the small-diameter gear of the gear 442. The gear 443 engages with the gear potion 191, which will be described below, of the switching cam 190.

The first gear portion 118B of the idle gear 118 and the cam gear 115M are located on a first side of the metal sheet 15 as defined by a side surface thereof facing in a direction parallel to the rotation axis of the idle gear 118. On the other hand, the second gear portion 118C of the idle gear 118, the gears 441 to 443 of the switching gear train GT8, and the switching cam 190 are located on the second side, opposite to the first side, of the metal sheet 15.

The switching cam 190 is a plate cam that receives a driving force from the main motor M1 to thereby rotate. The switching cam 190 receives the driving force of the main motor M1 from the cam gear 115M. Specifically, the switching cam 190 receives the driving force of the main motor M1 from the cam gear 115 via the idle gear 118 and the switching gear train GT8.

Figure 20:
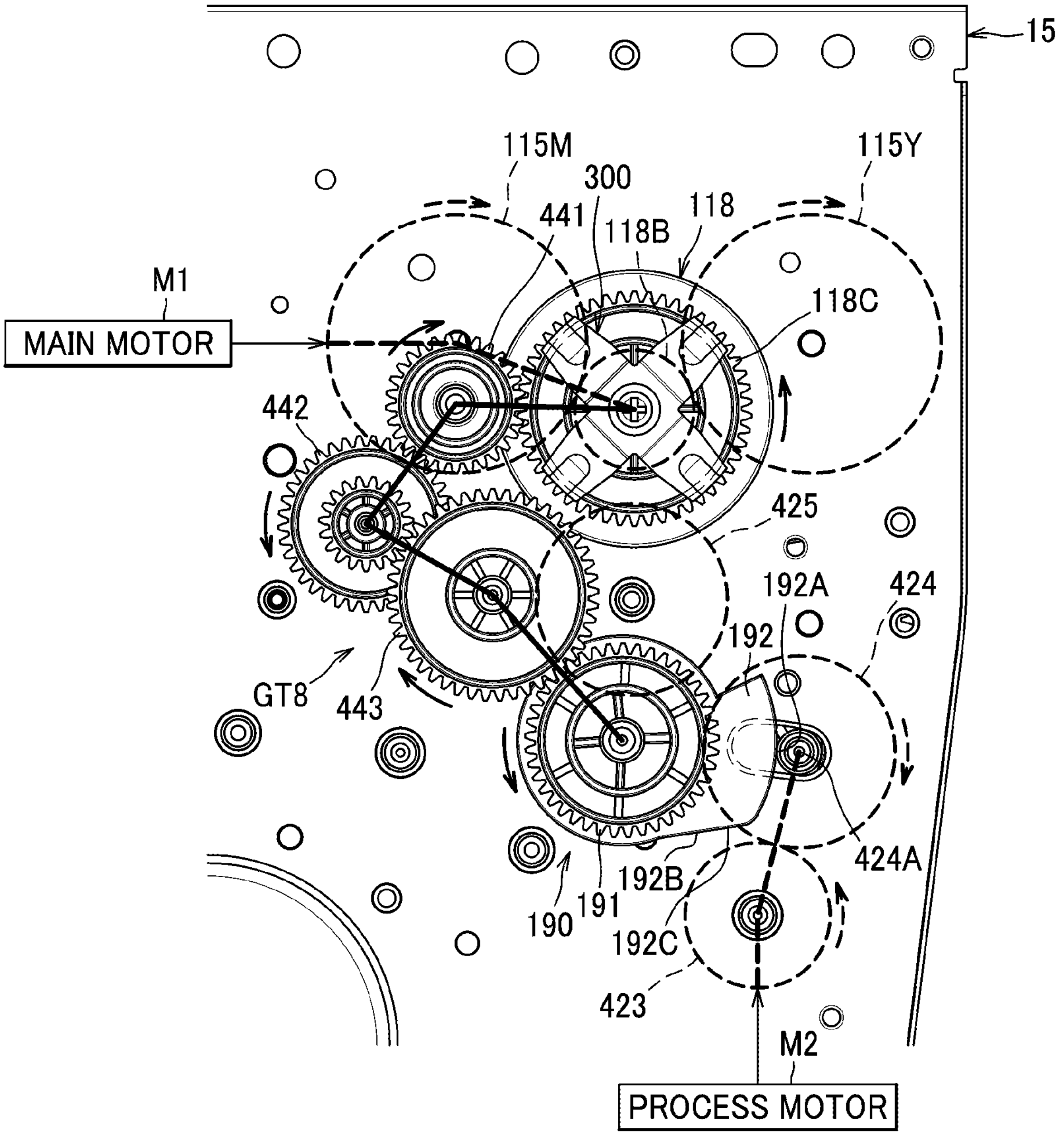
FIG. 20 is a diagram showing the idle gear, the switching gear train, and the switching cam in a second phase.

The switching cam 190 rotates and thereby causes the moving gear 424 of the first development roller gear train GT6 to move between the first transmit position indicated in FIG. 19 and the first disconnect position indicated in FIG. 20. The switching cam 190 is rotatable between a first phase indicated in FIG. 20, and a second phase indicated in FIG. 19. The first phase is a phase in which the moving gear 424 is located in the first disconnect position, and the second phase is a phase in which the moving gear 424 is located in the first transmit position.

The switching cam 190 comprises a gear portion 191 and a cam portion 192.

The gear portion 191 engages with the gear 443 of the switching gear train GT8.

The cam portion 192 includes a first part 192A, a second part 192B, and a third part 192C on the outer peripheral surface.

The first part 192A is a part that is in contact with the shaft 424A of the moving gear 424 when the switching cam 190 is in the first phase indicated in FIG. 20. The first part 192A has a shape of a segment of a circle of which a center coincides with the rotation axis of the switching cam 190.

The second part 192B is a part facing the shaft 424A of the moving gear 424 when the switching cam 190 is in the second phase indicated in FIG. 19. The distance from the center of rotation of the switching cam 190 to the second part 192B is shorter than the distance from the center of rotation of the switching cam 190 to the first part 192A. When the switching cam 190 is in the second phase, the second part 192B may be located in contact with the shaft 424A, or located apart from the shaft 424A.

The third part 192C is a part that contacts the shaft 424A of the moving gear 424 and causes the moving gear 424 to move between the first disconnect position and the first transmit position when the switching cam 190 is caused to rotate between the first phase and the second phase. The third part 192C is a flat surface connecting the first part 192A and the second part 192B.

The switching cam 190 is rotates from the first phase indicated in FIG. 20 to the second phase indicated in FIG. 19 to cause the moving gear 424 to move from the first disconnect position to the first transmit position when the main motor M1 is rotated in the forward direction. The switching cam 190 rotates from the second phase shown in FIG. 19 to the first phase shown in FIG. 20 to cause the moving gear 424 to move from the first transmit position to the first disconnect position when the main motor M1 is rotated in the reverse direction.

When the switching cam 190 causes the moving gear 424 to move from the first disconnect position to the first transmit position, the cam portion 192 of the switching cam 190, causes the moving gear 424 to be located in the first transmit position at a time before the development rollers 61Y, 61M, and 61C are located in the contact positon. Therefore, the development rollers 61Y, 61M, and 61C are caused to rotate by the driving force transmitted thereto from the process motor M2 before the development rollers 61Y, 61M, and 61C are located in the contact positions. Thereafter, the rotating development rollers 61Y, 61M, and 61C are brought into contact with the corresponding rotating photosensitive drums 50Y, 50M, and 50C.

When the switching cam 190 causes the moving gear 424 to move from the first transmit position to the first disconnect position, the cam portion 192 of the switching cam 190, causes the moving gear 424 to be located in the first disconnect position at a time after the development rollers 61Y, 61M, and 61C are located in the separate positions. Therefore, after the development rollers 61Y, 61M, and 61C are located in the separate positions, transmission of the driving force from the process motor M2 thereto is stopped with the result that the development rollers 61Y, 61M, and 61C stop rotating. The development rollers 61Y, 61M, and 61C which have not stopped rotating separate from the corresponding rotating photosensitive drums 50Y, 50M, and 50C.

Figures 21A, 21B:
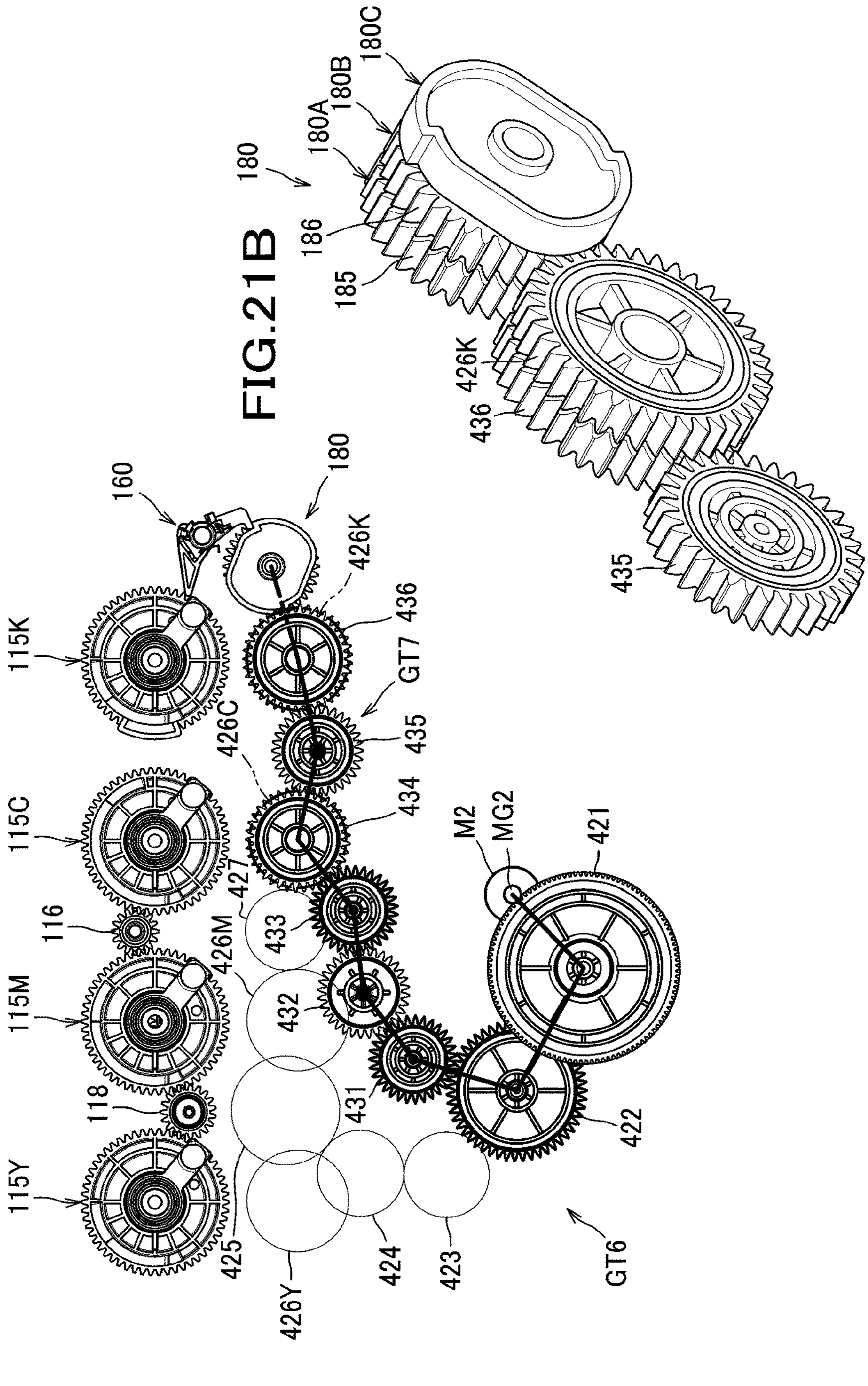
FIG. 21A is a diagram showing a second development roller gear train.
FIG. 21B is a diagram showing the second development roller gear train.

As shown in FIG. 21A, the second development roller gear train GT7 comprises a gear 431, a gear 432, a gear 433, a gear 434, a gear 435, a first gear 436, a planetary gear train 180, and a coupling gear 426K as an example of a second gear.

The gear 431 engages with the gear 422 of the first development roller gear train GT6.

The gear 432 engages with the gear 431.

The gear 433 engages with the gear 432.

The gear 434 engages with the gear 433. The gear 434 rotates about the same axis as that about which the coupling gear 426C included in the first development roller gear train GT6 rotates.

The gear 435 engages with the gear 424.

The first gear 436 is a gear that receives a driving force from the process motor M2, and engages with the gear 435. As shown in FIG. 21B, the first gear 436 engages with a first outer peripheral gear 185, which will be described below, of the planetary gear train 180. The first outer peripheral gear 185 is a gear provided on an input element 180A, which will be described below, of the planetary gear train 180. The gear 436 rotates about the same axis as that about which the coupling gear 426K rotates.

Figure 22:
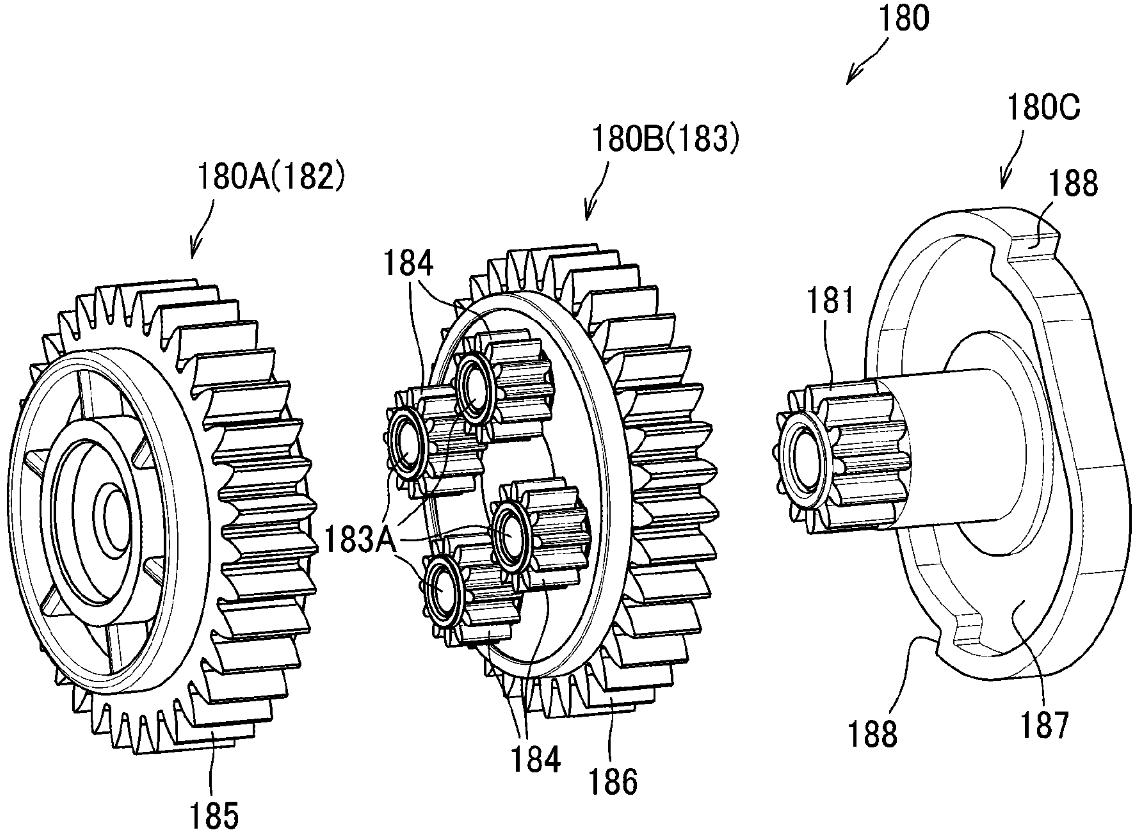
FIG. 22 is an exploded perspective view of a planetary gear train.

As shown in FIG. 22, the planetary gear train 180 comprises an input element 180A, an output element 180B, and a transmission element 180C. The input element 180A, the output element 180B, and the transmission element 180C are coaxially rotatable.

The planetary gear train 180 further comprises a sun gear 181, a ring gear 182, a carrier 183, and four planet gears 184. In the planetary gear train 180, one of the input element 180A, the output element 180B, and the transmission element 180C includes the sun gear 181, another of the input element 180A, the output element 180B, and the transmission element 180C (e.g. an element other than the element including the sun gear 181) includes the ring gear 182, and a remaining one of the input element 180A, the output element 180B, and the transmission element 180C (e.g. an element other than the element including the sun gear 181 and the element including the ring gear 182) includes the carrier 183. In the present embodiment, the transmission element 180C includes the sun gear 181, the input element 180A includes the ring gear 182, and the output element 180B includes the carrier 183.

The input element 180A is an element that receives a driving force of the process motor M2. The input element 180A includes the ring gear 182 and the first outer peripheral gear 185 located on the outer periphery of the ring gear 182. The ring gear 182 is an internal gear provided on the input element 180A and engages with the four planet gears 184.

The output element 180B is an element that outputs a driving force to the development roller 61K. The output element 180B includes the carrier 183, and a second outer peripheral gear 186 located on the outer periphery of the carrier 183. The carrier 183 includes four shafts 183A by which the four planet gears 184 are rotatably supported.

The transmission element 180C is an element configured to allow the driving force to be transmitted from the input element 180A to the output element 180B when a rotation of the transmission element 180C is restrained, and to not allow the driving force to be transmitted from the input element 180A to the output element 180B when the rotation of the transmission element 180C is not restrained. The transmission element 180C includes the sun gear 181, a rotatory plate 187 that rotates together with the sun gear 181, and two pawl portions 188 located on the outer periphery of the rotatory plate 187.

The four planet gears 184 are rotatably supported by the shaft 183A of the carrier 183. The planet gears 184 engage with the sun gear 181. The planet gears 184 also engage with the ring gear 182.

When the transmission element 180C of the planetary gear train 180 is caused to stop rotating, the planetary gear train 180 is in a transmit state in which a driving force input to the first outer peripheral gear 185 is allowed to be transmitted to the second outer peripheral gear 186. On the other hand, when the transmission element 180C is in a rotatable state, the planetary gear train 180 is in a disconnect state in which a driving force in put to the first outer peripheral gear 185 is not allowed to be transmitted to the second outer peripheral gear 186. When the planetary gear train 180 is in the disconnect state and the second outer peripheral gear 186 is under load conditions, if a driving force is input to the first outer peripheral gear 185, the output element 180B is not caused to rotate, and the transmission element 180C run idle.

As shown in FIG. 21B, the coupling gear 426K is a gear that outputs the driving force received from the process motor M2 to the development roller 61K. Specifically, the coupling gear 426K outputs the driving force to the development cartridge 60K. The coupling gear 426K engages with the second peripheral gear 186 of the planetary gear train 180. The second peripheral gear 186 is the gear provided on the output element 180B of the planetary gear train 180.

Figure 23A:
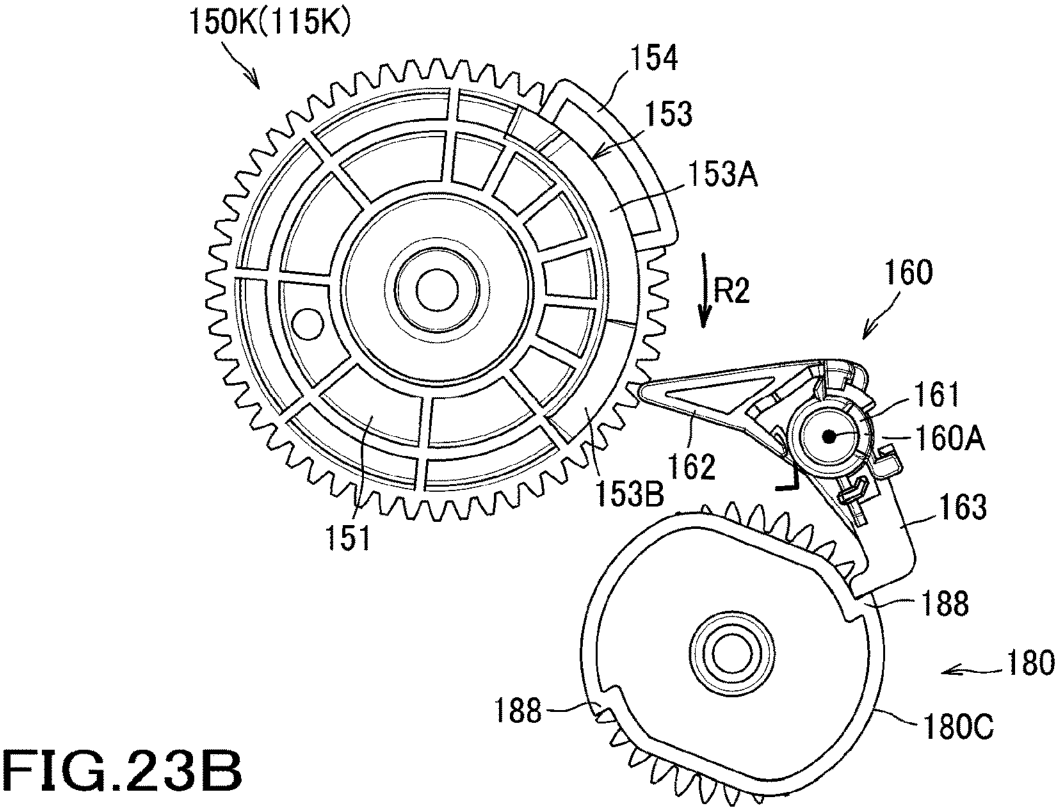
FIG. 23A is a diagram showing a separation cam for black, a switching lever, and the planetary gear train as illustrated when the switching lever is located in a second transmit position.
Figure 23B:
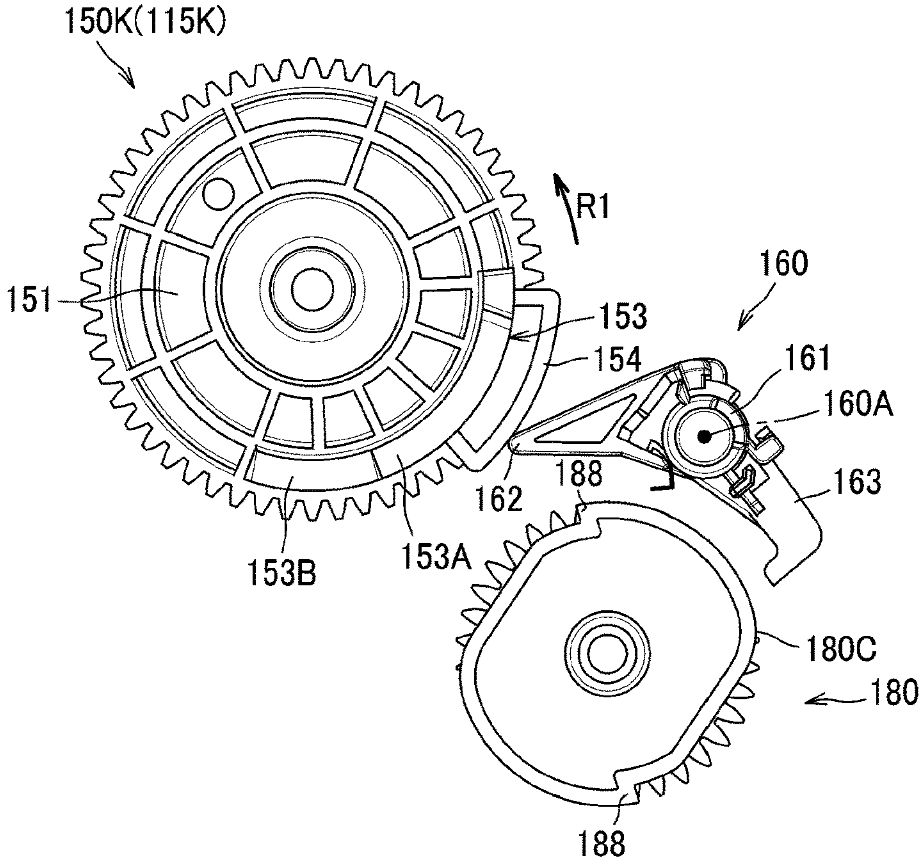
FIG. 23B is a diagram showing the separation cam for black, the switching lever, and the planetary gear train as illustrated when the switching lever is located in a second disconnect state.

As shown in FIGS. 23A and 23B, the image forming apparatus 1 further comprises a switching lever 160. The separation cam 150K corresponding to black further comprises a protrusion 154.

The protrusion 154 protrudes from an outer peripheral surface of the cam portion 153. The protrusion 154 is contactable with the switching lever 160. The protrusion 154 causes the switching lever 160 to move between a second transmit position shown in FIG. 23A and a second disconnect position shown in FIG. 23B according to rotation of the separation cam 150K.

The switching lever 160 movable relative to the planetary gear train 180 between the second transmit positon and the second disconnect position according to rotation of the separation cam 150K. Specifically, the switching lever 160 is rotatable between the second transmit position and the second disconnect position. The switching lever 160 comprises a rotation support portion 161, a first arm 162, and a second arm 163. The first arm 162 extends from the rotation support portion 161. The second arm 162 extends from the rotation support portion 161 in a direction different from a direction in which the first arm 162 extends.

The rotation support portion 161 is rotatably supported by the metal sheet 15 (refer to FIG. 3). Therefore, the switching lever 160 is swingable about a swinging axis 160A between the second transmit positon indicated in FIG. 23A and the second disconnect positon indicated in FIG. 23B. The switching lever 160 is biased by a spring from the second disconnect position toward the second transmit position.

An end portion of the second arm 163 extends toward the outer periphery of the transmission element 180C. As shown in FIG. 23A, when the switching lever 160 is located in the second transmit position, the end portion of the second arm 163 engages with the pawl portion 188 of the transmission element 180C, and restrains the rotation of the transmission element 180C. Therefore, the driving force of the process motor M2 input to the planetary gear train 180 is transmitted to the development cartridge 60K via the coupling gear 426K (refer to FIG. 18), and the development roller 61K is caused to rotate.

As shown in FIG. 23B, when the switching lever 160 is located in the second disconnect position, the end portion of the second arm 163 is disengaged from the pawl portion 188 of the transmission element 180C, and does not restrain the rotation of the transmission element 180C. Therefore, the driving force of the process motor M2 input to the planetary gear train 180 is not transmitted to the development cartridge 60K, and the development roller 61K is not caused to rotate.

The first arm 162 is contactable with the protrusion 154 of the separation cam 150K. As shown in FIG. 23A, when the contact of the first arm 162 and the protrusion 154 is broken up, the switching lever 160 is caused to swing to the second transmit position by the biasing force of the spring. As shown in FIG. 23B, when the first arm 162 comes in contact with the protrusion 154, the switching lever 160 is caused to swing to the second disconnect position against the biasing force of the spring.

When the switching lever 160 is caused to move from the second disconnect position to the second transmit position, the protrusion 154 causes the switching lever 160 to be located in the second transmit position at a time before the development roller 61K is located in the contact position. Specifically, the protrusion 154 separates from the switching lever 160 at a time before the development roller 61K is located in the contact position, and the switching lever 160 is caused to swing from the second disconnect position to the second transmit position.

Therefore, before the development roller 61K is located in the contact position, the development roller 61K receives the driving force from the process motor M2 to start rotating. Thereafter, the development roller 61K while rotating contacts the rotating photosensitive drum 50K.

When the switching lever 160 is caused to move from the second transmit position to the second disconnect position, the protrusion 154 cause the switching lever 160 to be located in the disconnect position at a time after the development roller 61K is located in the separate position. Specifically, the protrusion 154 contacts the switching lever 160 at a time after the development roller 61K is located in the separate positon, and the switching lever 160 is caused to swing from the second transmit position to the second disconnect position.

Therefore, after the development roller 61K is located in the separate position, the driving force from the process motor M2 to the development roller 61K is stopped, and as a result, the development roller 61K stops rotating. The development roller 61K separates from the rotating photosensitive drum 50K while rotating.

The controller 2 (refer to FIG. 1) comprises a central processing unit or CPU, a read-only memory or ROM, a random-access memory or RAM, and an input/output circuit, and executes a pre-stored program to execute various processes of control. The controller 2 controls the driving and stopping of the main motor M1, and the rotational direction of the output shaft of the main motor M1. The controller 2 also controls the driving and stopping of the process motor M2. The controller 2 also controls the electromagnetic clutches EC1 to EC3.

Therefore, the controller 2 controls the contacting and separating of the development rollers 61 with and from the photosensitive drums 50. The controller 2 also controls the driving and stopping of the photosensitive drums 50, the development rollers 61, and the heating roller 81A. The controller 2 also controls the nip pressure to be produced by the heating portion 81 and the pressure potion 82 of the fixing device 80.

The controller 2 is capable of executing a printing process in a print mode selected from a color print mode as a first mode, and a black-and-white print mode as a second mode.

The color print mode is a print mode in which the development roller 61Y, the development roller 61M, the development roller 61Y, and the development roller 61K are used to form an image on a sheet S.

When the image forming apparatus 1 is in the standby state before the printing process is executed, all development rollers 61 are located in the separate positions. The color print mode is a print mode in which all development rollers 61 (61Y, 61M, 61C, and 61K) are moved from the separate positions to the contact positions to form an image on a sheet S.

The black-and-white print mode is a print mode in which only the development roller 61K is used to form an image on a sheet S. Specifically, the black-and-white print mode is a print mode in which only the development roller 61K is moved from the separate position to the contact position to form an image on a sheet S.

As shown in FIG. 2, the image forming apparatus 1 further comprises sensors 4K and 4C. The sensor 4K is a sensor configured to detect the location of the cam follower 170K. The sensor 4C is a sensor configured to detect the location of the cam followers 170Y, 170M, and 170C. The sensor 4C directly detects the location of the cam follower 170C, and indirectly detects the location of the cam followers 170Y and 170M.

Each of the sensors 4K and 4C includes a light-emitting portion 4P and a light-receiving portion 4R. The light-emitting portion 4P emits a light beam to be detected, and the light-receiving portion 4R can receive the light beam emitted by the light emitting portion 4P. The sensors 4K and 4C are provided through the through holes 550 of the gear cover 500 (see FIGS. 8A and 8B), and their light-emitting portions 4P and their light-receiving portions 4R are located inside the gear cover 500.

The cam follower 170K is located in a position between the light-emitting portion 4P and the light-receiving portion 4R when the cam follower 170K is located in the push position. The cam follower 170K is located outside of the position between the light-emitting portion 4P and the light-receiving portion 4R when the cam follower 170K is located in the no-push position. Likewise, the cam follower 170C is located in a position between the light-emitting portion 4P and the light-receiving portion 4R when the cam follower 170C is located in the push position. The cam follower 170C is located outside of the position between the light-emitting portion 4P and the light-receiving portion 4R when the cam follower 170C is located in the no-push position.

Therefore, the light-receiving portion 4R of each of the sensors 4K and 4C fails to receive a light beam emitted from the corresponding light-emitting portion 4P when the corresponding cam follower 170 is located in the push position because the light beam is interrupted by the rib 174. On the other hand, the light-receiving portion 4R successfully receives a light beam emitted from the light-emitting portion 4R when the cam follower 170 is located in the no-push position. The sensors 4K and 4C determines whether the cam follower 170 is located in the push position or the no-push position by detecting the change in the result of detection of an emitted light beam.

When the cam follower 170 is located in the push position, the corresponding development roller 61 is located in the separate position. When the cam follower 170 is located in the no-push position, the corresponding development roller 61 is located in the contact position. Therefore, the sensors 4K and 4C can determine whether the development roller 61 is located in the contact position or in the separate position via determination of the position of the cam follower 170.

The rib 174 of the cam follower 170K is detectable by the sensor 4K, and the rib 174 of the cam follower 170C is detectable by the sensor 4C. In the present embodiment, the four cam followers 170 are common components, and each include a rib 174, but the ribs 174 of the cam followers 170Y and 170M do not function as parts to be detected by the sensors 4K and 4C.

An example of an operation of the controller 2 executing a printing process will be described below. Hereafter, putting the electromagnetic clutches EC1 to EC3 in the transmit state will be indicated as turning ON, and putting the electromagnetic clutches EC1 to EC3 in the disconnect state will be indicated as turning OFF.

Figure 24:
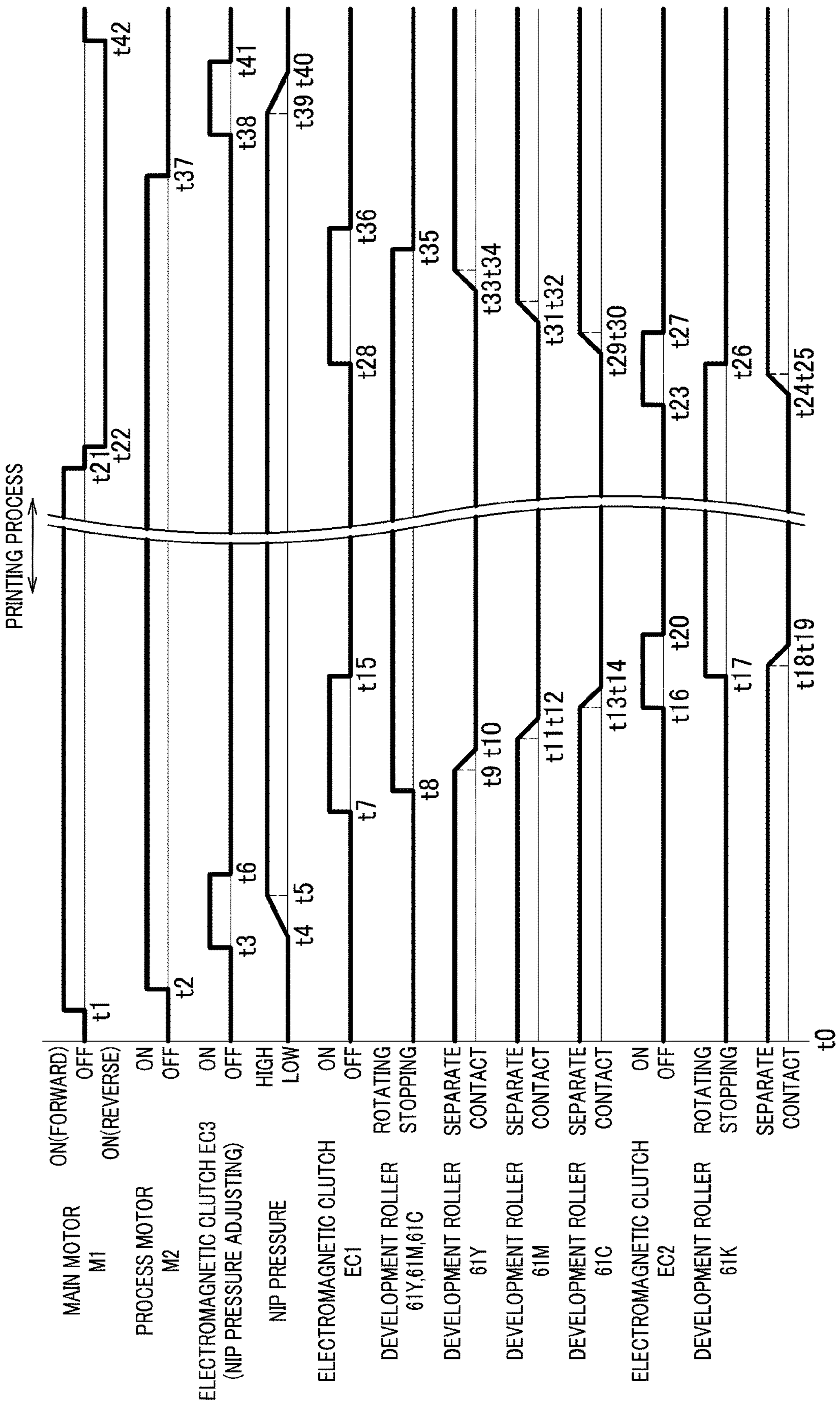
FIG. 24 is a time chart for explaining an example of an operation of a controller.

First, the operation of the controller 2 as performed when the printing process is executed in the color print mode will be described with reference to a time chart. As shown in FIG. 24, the image forming apparatus 1 in the standby state (refer to t0) has all the development rollers 61 located in the separate positions. The image forming apparatus 1 in the standby state has the nip pressure (as produced by the heating portion 81 and the pressure portion 82) set at the low nip pressure.

When the printing process is executed in the color print mode, the controller 2 causes the main motor M1 to run in the forward rotation direction (time t1). Therefore, the moving gear 131 is moved from the disconnect position to the transmit positon, the driving force of the main motor M1 is transmitted to the heating roller 81A, and the heating roller 81A and the pressure portion 82 (pressure roller) are caused to rotate. The driving force of the main motor M1 is also transmitted to the first ejection roller 83 and the second ejection roller 91, causing the first ejection roller 83 and the second ejection roller 91 to rotate.

Next, the controller 2 activates the process motor M2 (time t2). Therefore, the driving force of the process motor M2 is transmitted to the photosensitive drum 50, and the photosensitive drum 50 is caused to rotate.

Next the controller 2 turns ON the electromagnetic clutch EC3 (time t3). Therefore, the driving force of the main motor M1 is transmitted to the adjusting cam 230 of the adjusting mechanism 200 and causes the adjusting cam 230 to rotate in the third rotation direction R3, from the first cam phase to the second cam phase. Therefore, the nip pressure produced by the heating portion 81 and the pressure portion 82 is switched from the low nip pressure to the high nip pressure (time t4 to t5).

The controller 2 turns OFF the electromagnetic clutch EC3 after the nip pressure produced by the heating portion 81 and the pressure portion 82 has been switched to the high nip pressure (time t6).

Thereafter, the controller 2 turns ON the electromagnetic clutch EC1 (time t7). Therefore, the driving force of the main motor M1 is transmitted to the switching cam 190 and the separation cams 150Y, 150M, and 150C, and the switching cam 190 is caused to rotate from the first phase to the second phase, and the separation cams 150Y, 150M, and 150C are caused to rotate in the first rotation direction R1.

Thereafter, the moving gear 424 is caused to move from the first disconnect position to the first transmit position by the rotation of the switching cam 190 to the second phase. Therefore, the driving force of the process motor M2 is transmitted to the development rollers 61Y, 61M, and 61C, and causes the development rollers 61Y, 61M, and 61C to rotate (time t8).

Next, the development roller 61Y is moved from the separate position to the contact position by the separation cam 150Y rotating in the first rotation direction R1 (time t9 to t10). Next, the development roller 61M is moved from the separate position to the contact position by the separation cam 150M rotating in the first rotation direction R1 (time t11 to t12). Next, the development roller 61C is moved from the separate position to the contact position by the separation cam 150C rotating in the first rotation direction R1 (time t13 to t14).

The controller 2 turns OFF the electromagnetic clutch EC1 after a predetermined amount of time has elapsed from the time at which the sensor 4C has determined that the development rollers 561Y, 61M, and 61C are located in the contact positions (time t15).

The controller 2 also turns ON the electromagnetic clutch EC2 at a time when the development roller 61K moves from the separate position to the contact position after the development roller 61C moves from the separate position to the contact positon (time t16). Therefore, the driving force of the main motor M1 is transmitted to the separation cam 150K, and the separation cam 150K is caused to rotate in the first rotation direction R1.

Thereafter, the protrusion 154 of the separation cam 150K rotating in the first rotation direction R1 contacts the switching lever 160, and causes the switching lever 160 to swing from the second disconnect position to the second transmit position. Therefore, the driving force of the process motor M2 is transmitted via the planetary gear train 180, and the development roller 61K is caused to rotate (time t17).

Next, the development roller 61K moves from the separate position to the contact position by the separation cam 150K rotating in the first rotation direction R1 at a time after the time t14 when the development roller 61C moves from the separate position to the contact position (time t18 to t19).

The controller turns OFF the electromagnetic clutch EC2 after a predetermined amount of time has elapsed from the time when the sensor 4K has determined that the development roller 61K is located in the contact position (time t20).

As described above, when the main motor M1 rotates in the forward direction, the controller 2 controls the operation of the separation mechanism 5 and causes the development rollers 61 (development roller 61Y, development roller 61M, development roller 61C. and development roller 61K, in this sequence) in the separate positions to move to the contact position (times t9 to t19).

Specifically, when the main motor M1 rotates in the forward direction, the separation mechanism 5 causes the development roller 61M to move from the separate position to the contact position after causing the development roller 61Y to move from the separate position to the contact position. The separation mechanism 5 causes the development roller 61C to move from the separate position to the contact position after causing the development roller 61M to move from the separate position to the contact position. When the main motor M1 rotates in the forward direction, the controller 2 operates the electromagnetic clutch EC2 to control the separation mechanism, and causes the development roller 61K to move from the separate position to the contact position after causing the development roller 61C to move from the separate position to the contact position.

The controller 2 executes the printing process after causing the development rollers 61Y, 61M, 61C, and 61K to be located in the contact positions. When the sheet S is ejected in the output tray 13 and the printing process is completed, the controller 2 temporally stops the main motor M1 (time t21). Thereafter, the controller 2 causes the main motor M1 to run in the reverse rotation direction (t22).

Therefore, the moving gear 131 is caused to move from the transmit position to the disconnect position, and the transmission of the driving force of the main motor M1 to the heating roller 81A is stopped, and the heating roller 81A and the pressure portion (pressure roller) are caused to stop. Transmission of the driving force from the main motor M1 to the first ejection roller 83 and the second ejection roller 91 is also stopped, and the first ejection roller 83 and second ejection roller 91 are caused to stop rotating.

The controller 2 turns ON the electromagnetic clutch EC2 after driving the main motor M1 in the reverse rotation direction (time t23). Therefore, the driving force of the main motor M1 is transmitted to the separation cam 150K, and causes the separation cam 150K to rotate in the second rotation direction R2.

The separation cam 150K rotating in the second direction R2 causes the development roller 61K to move from the contact position to the separate position (time t24 to t25).

Next, the protrusion 154 of the separation cam 150K separates from the switching lever 160, and the switching lever 160 is caused to swing from the second transmit position to the second disconnect position. Therefore, the transmission of the driving force from the process motor M2 to the development roller 61K is stopped, and the development roller 61K to stop (time t26).

The controller 2 turns OFF the electromagnetic clutch EC2 after a predetermined amount of time has elapsed from the time when the sensor 4K determines that the development roller 61K is located in the separate position (time t27).

The controller 2 turns ON the electromagnetic clutch EC1 at a time (time t28) when the development roller 61C is caused to move from the contact position to the separate position after the development roller 61K moves from the contact position to the separate position. Therefore, the driving force of the main motor M1 is transmitted to the switching cam 190 and the separation cams 150Y, 150M, and 150C, causing the switching cam 190 to rotate from the second phase to the first phase, and the separation cams 150Y, 150M, and 150Y to rotate in the second rotation direction R2.

Thereafter, the development roller 61C is caused to move from the contact position to the separate position by the separation cam 150 rotating in the second rotation direction R2, at a time after the time t25 when the development roller 61K has moved from the contact position to the separate position (time t29 to t30). Next, the development roller 61M is caused to move from the contact position to the separate position by the separation cam 150M in the second rotation direction R2 (time t31 to t32). Finally, the development roller 61Y is caused to move from the contact position to the separate position by the separation cam 150Y rotating in the second rotation direction R2 (time t33 to t34).

Next, the switching cam 190 rotating to the first phase causes the moving gear 424 to move from the first transmit position to the first disconnect position. Therefore, the driving force of the process motor M2 is not transmitted to the development rollers 61Y, 61M, and 61C, and the rotation of the development rollers 61Y, 61M, and 61C are caused to stop rotating (time t35).

The controller 2 turns OFF the electromagnetic clutch EC1 after a predetermined amount of time has elapsed from the time when the sensor 4C has determined that the development rollers 61Y, 61M, and 61C are located in the separate positions (time t36).

As described above, when the main motor M1 rotates in the reverse direction, the controller 2 controls the operation of the separation mechanism 5 and causes the development rollers 61 (development roller 61Y, development roller 61M, development roller 61C, and development roller 61K) in the contact positions to move to the separate position.

Specifically, when the main motor M1 rotates in the reverse direction, the controller 2 operates the electromagnetic clutch EC1 to thereby control the separation mechanism 5 and causes the development roller 61C to move from the contact position to the separate position after causing the development roller 61K to moves from the contact position to the separate position. The separation mechanism 5 causes the development roller 61M to move from the contact position to the separate position after causing the development roller 61C to move from the contact position to the separate position. The separation mechanism 5 also causes the development roller 61Y to move from the contact position to the separate position after causing the development roller 61M to move from the contact position to the separate position.

The controller 2 stops the rotation of the process motor M2 after the development rollers 61Y, 61M, 61C, and 61K are located in the separate positions (time t37). Therefore, the driving force of the process motor is not transmitted to the photosensitive drums 50, and the photosensitive drums 50 are caused to stop rotating.

Thereafter, the controller 2 turns ON the electromagnetic clutch EC3 (time t38). Therefore, the driving force of the main motor M1 is transmitted to the adjusting cam 230 of the adjusting mechanism 200 and causes the adjusting cam 230 to rotate in the fourth rotation direction R4, from the second cam phase to the first cam phase. Therefore, the nip pressure produced by the heating portion 81 and the pressure portion 82 is switched from the high nip pressure to the low nip pressure (time t39 to t40).

The controller 2 turns OFF the electromagnetic clutch EC3 when the nip pressure produced by the heating portion 81 and the pressure portion 82 has been switched from the high nip pressure to the low nip pressure (time t41). Thereafter, the controller 2 stops the main motor M1 (time t42).

In the present embodiment, the controller 2 operates the electromagnetic clutch EC2 to control the separation mechanism 5, and causes the development roller 61K located in the separate position to move from the separate position to the contact position (time t18 to t19), and after causing the development roller 61K to move to the contact position causes the development roller 61K to move from the contact position to the separate position (time t24 to t25) while the development roller 61C is located in the contact positon (time t14 to t29).

The separation mechanism 5 also causes the development roller 61C located in the separate position to move from the separate position to the contact position (time t13 to t14), and after causing the development roller 61C to move to the contact position, causes the development roller 61C to move from the contact position to the separate position (time t29 to t30) while the development roller 61M is located in the contact position (time t12 to t31).

The separation mechanism 5 also causes the development roller 61M located in the separate position to move from the separate position to the contact position (time t11 to t12), and after causing the development roller 61M to move to the contact position, causes the development roller 61C to move from the contact position to the separate position (time t31 to t32) while the development roller 61Y is located in the contact position (time t10 to t33).

When executing the printing process in the black-and-white print mode, the controller 2 keeps the electromagnetic clutch EC2 turned OFF, and controls the main motor M1, the process motor M2, the electromagnetic clutch EC1, and the electromagnetic clutch EC3 as in the case where the printing process is executed in the color print mode.

Next, advantageous effects of the image forming apparatus 1 configured as described above in accordance with the present embodiment will be described.

Since the image forming apparatus 1 comprises the separation gear train GT1, the fixing gear train GT2, and the adjusting gear train GT3, the contact and separation of the development rollers 61, the driving of the fixing device 80, and the switching of the nip pressure of the fixing device 80 can be operated by one main motor M1. Therefore, the number of motors in the image forming apparatus can be reduced.

Since the moving gear 131 is used to switch the state of the transmission of the driving force from the main motor M1 to the fixing device 80 between a transmit state and a disconnect state, the cost can be reduced compared to an alternative configuration in which an electromagnetic clutch is used, for example.

Since the moving gear 131 is located in the transmit position when the main motor M1 rotates in the forward direction, a sheet S can be conveyed by the fixing device 80. Also, since the moving gear 131 is located in the disconnect positon when the main motor M1 rotates in the reverse direction, transmission of the driving force of the main motor M1 to the fixing device 80 can be stopped.

Since the clutch connecting gear 135 rotates about an axis common to that about which the gear 104 of the separation gear train GT1 rotates, a gear train including the separation gear train GT1 and the adjusting gear train GT3 can be arranged in a more compact manner overall.

Since the rotation direction of the separation cam 150 is switched to the first rotation direction R1 and to the second rotation direction R2, the shape of the separation cam 150 can be designed more freely. Since the separation cam 150 can be made smaller in size, the image forming apparatus 1 can be made smaller in size.

To elaborate, if a separation cam is rotated only in one direction to slide the cam follower 170 between the no-push position and the push position, the separation cam needs a first guide surface for guiding the cam follower 170 from the no-push position to the push position, and a second guide surface for guiding the cam follower 170 from the push position to the no-push position. Therefore, the shape of the cam portion is determined for this end to a certain extent, and there is little freedom in the design of the shape of the separation cam. Since two guide surfaces are needed, the cam portion needs to be made larger, and the separation cam needs to be made larger. There is no such limitation in the present embodiment, so the shape of separation cam can be designed more freely, and the separation cam 150 can be made smaller in size.

Since the motor gear MG1 of the main motor M1 engages with both the gear 101 of the separation gear train GT1 and the gear 141 of the sheet feeder gear train GT4, the driving force of the main motor M1 can be directly transmitted to the separation gear train GT1 and the sheet feeder gear train GT4.

Since the first ejection roller 83 and the second ejection roller 91 receive the driving force of the main motor M1 from the fixing gear train GT2, the first ejection roller 83 and the second ejection roller 91 can be driven by the main motor M1. As a result, the number of motors in the image forming apparatus 1 can be reduced.

Since the development roller 61K in the separate position is moved from the separate position to the contact positon and the development roller 61K moved to the contact position is moved to the separate position, while the development roller 61C is located in the contact positon, the development roller 61C does not move from the contact position to the separate position when the development roller is located in the contact position.

In the image forming apparatus 1, when the development roller 61C moves from the contact position to the separate position, the cam follower 170C pushes the development cartridge 60C, and the development cartridge 60C is pushed in the direction parallel to the rotation axis, thus, the drawer 55 would possibly move to some extent or bend. Consequently, the drawer 55 would undesirably shift in position, so that the relative position of the photosensitive drum 50K and the sheet S would shift undesirably. In the present embodiment, since the development roller 61C does not move from the contact position to the separate position when the development roller 61K is located in the contact position, the relative position of the photosensitive drum 50K and the sheet S is not shifted undesirably when the toner image on the photosensitive drum 50K is being transferred to the sheet S, the image quality is not degraded.

Since the rotation direction of the separation cam 150 of the separation mechanism 5 can be switched by the main motor M1 rotating in the forward direction and the reverse direction, the shape of the separation cam 150 can be designed more freely. The separation cam 150 can also be made smaller in size. Therefore, the image forming apparatus 1 can be made smaller in size.

When executing a printing process in the color print mode, the time for which the development roller 61K, (i.e., the roller more frequently used because the development roller 61K is used in both the color print mode and the black-and-white print mode) is in contact with the photosensitive drum 50K can be made shorter in that the development roller 61K contacts the photosensitive drum 50K after the development roller 61C contacts the photosensitive drum 50C, and the development roller 61K separates from the photosensitive drum 50K before the development roller 61C separates from the photosensitive drum 50C. Therefore, the black toner used in the development roller 61K and the development roller 61K can be made long-lasting.

Since the electromagnetic clutch EC1 regulates the motion of the separation cams 150Y, 150M, and 150C, and the electromagnetic clutch EC2 regulates the motion of the separation cam 150K, the contact and separation of each development rollers 61 (61Y, 61M, 61C, and 61K) can be controlled more precisely.

Since one electromagnetic clutch EC1 regulates the motion of the separation cams 150Y, 150M, and 150C, the cost can be reduced compared to an alternative configuration in which each separation cam 150Y, 150M, and 150C comprises an electromagnetic clutch, for example.

Since the electromagnetic clutch EC3 disconnect when the main motor M1 rotate in the reverse direction, the driving force from the main motor M1 can be stopped from being transmitted to the adjusting cam 230.

Since the switching cam 190, which is a member that moves the moving gear 424, moves the moving gear 424 to the first transmit position when the main motor M1 rotates in the forward direction, and moves the moving gear 424 to the first disconnect position when the main motor M1 rotates in the reverse direction, the shape of the switching cam 190 can be designed more freely. The switching cam can also be made smaller in size.

To elaborate, if a switching cam is configured to rotate in only one direction to move the moving gear 424 between the first transmit position and the first disconnect position, the whole circumference of the switching cam (cam portion) is used to cause the moving gear 424 to move from the first disconnect positon to the first transmit position, to be restrained in the first transmit position, to move from the first transmit position to the first disconnect position, and to be retained in the first disconnect position. Therefore, the shape of the switching cam is determined to a certain extent, and the shape of the switching cam cannot be designed freely. The cam portion also becomes larger in size, and the switching cam becomes larger in size. In the present embodiment, there is no such limitation, and the shape of the switching cam 190 can be designed more freely, and the switching cam can also be made smaller in size.

In the present embodiment, the timing of the contact and separation of the development rollers 61Y, 61M, and 61C as regulated by the separation cams 1501Y, 150M, and 150C and the timing of the starting and stopping of the rotations of the development rollers 61Y, 61M, and 61C as regulated by just controlling the switching cam 190 can be synchronized by the operation of the electromagnetic clutch EC1. Therefore, the number of electromagnetic clutches can be reduced compared to an alternative configuration in which an electromagnetic clutch for regulating the motions of the separation cams 1501Y, 150M, and 150C and an electromagnetic clutch for regulating the motions of the switching cam 190 are provided separately, and the timing of the contact and separation of the development rollers 61Y, 61M, and 61C and the timing of the starting and stopping of the rotation of the development rollers 61Y, 61M, and 61C are synchronized. Therefore, the cost can be reduced. Also, the synchronization of the timing of the contact and separation, and the starting and stopping of the rotations, of the development rollers 61Y, 61M, and 61C can be regulated with more simplicity.

Since the moving gear 424 is used to switch the transmitting and disconnecting of the driving force to the development rollers 61Y, 61M, and 61C, the cost can be reduced compared to an alternative configuration in which electromagnetic clutches are used, for example.

Since the switching cam 190 receives the driving force of the main motor M1 from the cam gear 115M, the gear train can be arranged in a compact manner compared to an alternative configuration in which the image forming apparatus 1 comprises another gear train, as provided beside the separation gear train GT1, for transmitting a driving force of the main motor M1 to the switching cam 190.

The starting and the stopping of the rotation of the switching cam 190 can be controlled by controlling the starting and the stopping of the rotations of the cam gears 115Y, 115M, and 115C. Therefore, the control of the cam gears 115Y, 115M, and 115C, and switching cam 190 can be simplified.

Since the cam gear 115 is located on a first side as defined by a side surface thereof facing in a direction parallel to the rotation axis of the idle gear 118, and the switching cam 190 is located on a second side, opposite to the first side, of the metal sheet 15, the shape and position of the switching cam 190 can be designed more freely. The gear train including the separation gear train GT1 and the switching gear train GT8 can also be arranged in a more compact manner overall.

Since the moving gear 424 is located in the first transmit position at a time before the development rollers 61Y, 61M, and 61C are located in the contact positions, the development rollers 61Y, 61M, and 61C can be caused to rotate before the development rollers 61Y, 61M, and 61C come in contact with the corresponding photosensitive drums 50Y, 50M, and 50C. Since the moving gear 424 is located in the first disconnect positon at a time after the development rollers 61Y, 61M, and 61C are located in the separate positions, the development rollers 61Y, 61M, and 61C can be stopped rotating after the development rollers 61Y, 61M, and 61C separate from the corresponding photosensitive drums 50Y, 50M, and 50C.

Since the switching lever 160 is located in the second transmit position at a time before the development roller 61K is located in the contact position, the development roller 61K can be caused to rotate before the development roller 61K comes in contact with the photosensitive drum 50K. Since the switching lever 160 is located in the second disconnect position at a time after the development roller 61K is located in the separate position, the development roller 61K can be stopped rotating after the development roller 61K separate from the photosensitive drum 50K.

Since the first gear 436 of the second development roller gear train GT7 rotates about the same axis as that about which the coupling gear 426K rotates, the second development roller gear train GT7 can be arranged more compactly as viewed from the direction parallel to the axis of rotation of the first gear 436 and the coupling gear 426K.

Since the rotation resistance member 300 for applying rotation resistance to the idle gear 118 that engages with the cam gear 115Y is provided, the free rotating of the cam gear 115Y can be restrained. Therefore, the sudden sliding of the cam follower 170Y by the free rotation of the cam gear 115Y can be restrained.

Since the rotation resistance member 300 pushes the idle gear 118 in a direction parallel to the rotation axis of the idle gear 118, the rotation resistance member 300 can be arranged more compactly relative to the idle gear 118 as viewed from the direction parallel to the rotation axis of the idle gear 118.

Since the rotation resistance member 300 is a leaf spring, the rotation resistance member 300 can be arranged more compactly relative to the idle gear 118. Since the rotation resistance member 300 is a leaf spring, the rotation resistance member 300 can be arranged more compactly in the direction of the rotation axis of the idle gear 118 compared to an alternative configuration in which the rotation resistance member 300 is a coil spring, for example.

Since the annular first rib 118D of the idle gear 118 is kept in contact with the metal sheet 15 by the pushing force of the rotation resistance member 300, a necessary amount of rotation resistance can be applied to the idle gear 118 without restraining the rotation of the idle gear 118 too much.

Since the first rib 118D is located at an end portion of the idle gear 118 in a plane perpendicular to the rotation axis of the idle gear 118, the contact area of the first rib 118D and the metal sheet 15 can be increased. Therefore, a necessary amount of rotation resistance can be applied sufficiently to the idle gear 118 by the contact of the first rib 118D and the metal sheet 15.

Since the cam gear 115Y and the rotation resistance member 300 are located on opposite sides of the metal sheet 15 as defined by the opposite side surfaces facing in the directions parallel to the rotation axis of the idle gear, the shape and location of the rotation resistance member 300 can be designed more freely.

Since the rotation resistance member 300 push a second rib 118E having a pitch diameter larger than the pitch diameter of the first gear portion 118B, a necessary amount of rotation resistance can be applied to the idle gear 118 with a smaller load. Since the diameter of the first gear portion 118B can be made smaller, the separation gear train can be made compact, and the members such as the photosensitive drums can be arranged compactly. Therefore, the image forming apparatus can be made smaller in size.

Since the idle gear 118, to which the rotation resistance is applied, engages with both the cam gear 115Y and the cam gear 115M, the free rotation of the cam gear 115Y and the cam gear 115M can be restrained. Therefore, the sudden sliding of the cam follower 170Y and cam follower 170M by the free rotation of the cam gear 115Y and the cam gear 115M can be restrained.

Since the cam gear 115C engages with the cam gear 115M via one gear 116, the idling of the cam gear 115C can be restrained. Therefore, the sudden sliding of the cam follower 170C by the free rotation of the cam gear 115C can be restrained.

Since the stopper 530 is provided, the rotation of the cam follower 170 can be restrained. Therefore, the sudden sliding of the cam follower 170 by the rotation of the cam follower 170 can be restrained.

In the configuration that the cam follower 170 is biased by the spring 430 toward the no-push position, because the free rotation of the cam gears 115Y, 115M, and 115C can be restrained by the rotation resistance member 300, the sudden sliding of the cam followers 170Y, 170M, and 170C by the free rotation of the cam gears 115Y, 115M, and 115C can be restrained.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiment, the fixing gear train GT2 is configured to transmit the driving force of the main motor M1 to the heating roller 81A (heating portion 81); it is however to be understood that the fixing gear train may be configured to transmit the driving force of the main motor, for example, to the pressure portion. The fixing gear train may alternatively be configured to transmit the driving force of the main motor M1 to both the heating portion and the pressure portion.

In the above-described embodiment, the heating portion 81 is configured to include the heating roller 81A; it is however to be understood that a heating portion may be configured to include an endless belt, for example. Also, in the above-described embodiment, the pressure portion 82 is a pressure roller; it is however to be understood that a pressure portion may be a configuration, for example, comprising an endless belt, and a pad that nips the belt between the pad and the heating portion.

In the above-described embodiment, the separation cam 150 is configured to move the development roller 61 from the separate position to the contact position when the main motor M1 rotates in the forward direction, and moves the development roller 61 from the contact positon to the separate position when the main motor M1 rotates in the reverse direction. It is however to be understood that, for example, a separation cam may be configured to, when a main motor that rotates in only one direction rotates, move a development roller from the separate position to the contact position, and move the development roller from the contact position to the separate position.

In the above-described embodiment, the transmitting and disconnecting of the driving force to the fixing device 80 is switched by the moving gear 131; it is however to be understood that a transmitting and disconnecting of the driving force to the fixing device may be switched by a electromagnetic clutch, for example.

In the above-described embodiment, the nip pressure cam 230 is configured to switch the nip pressure to be produced by the heating portion 81 and the pressure portion 82 between two pressures; the low nip pressure and the high nip pressure. It is however to be understood that a nip pressure may be switched to three or more pressures, for example. In other words, the second nip pressure may include a plurality of nip pressures. The heating portion and the pressure portion may also be separate from each other at the first nip pressure.

In the above-described embodiment, the adjusting cam 230 is configured to move the pressure portion 82 to switch the nip pressure; it is however to be understood that an adjusting cam may be configured to move the heating portion instead of the pressure portion to switch the nip pressure. The adjusting cam may alternatively move both the heating portion and the pressure portion to switch the nip pressure.

In the above-described embodiment, the separation cams 150Y, 150M, and 150C are controlled in synchronization; it is however to be understood that separation cams 150Y, 150M, and 150C may be controlled individually.

In the above-described embodiment, the transmitting and disconnecting of the driving force to the development roller 61K is switched by the switching lever 160 and the planetary gear train 180; it is however to be understood that transmitting and disconnecting of a driving force to a development roller 61K may be switched by a switching cam as is the case with the development rollers 61Y, 61M, and 61C.

In the above-described embodiment, the cam gear 115 is located on a first side as defined by a side surface thereof facing in a direction parallel to the rotation axis of the idle gear 118, and the switching cam 190 is located on a second side, opposite to the first side, of the metal sheet 15; it is however to be understood that a cam gear and a switching gear may be located at the same side of a metal sheet.

In the above-described embodiment, switching cam 190 is configured to receive the driving force from the separation gear train GT1; it is however to be understood that a gear train for transmitting a driving force to a switching cam may be provided other than a separation gear train.

In the above-described embodiment the stopper 530 has a shape of a wall; it is however to be understood that a stopper may have a shape of a bar. In the above-described embodiment, the stopper 530 is formed integrally with the cover wall 510; it is however to be understood that the stopper may be a member fixed to a cover wall.

Further, for example, if a separation cam is configured to rotate only in one direction, a stopper may be configured to have one stopper that contacts a side of an arm to restrain a cam follower from rotating instead of a configuration having two stoppers that hold an arm. An image forming apparatus may also be configured to not comprise a stopper, and instead a boss of the cam and a slide shaft of a cam follower may engage, and the cross section of the engaging part may have a triangular shape, a rectangular shape, a D shape, an oval shape, and the like that restrains the rotation of the cam follower.

In the above-described embodiment, the first rib 118D is located at an end portion of the idle gear 118 in the plane perpendicular to the rotation axis of the idle gear 118; it is however to be understood that a first rib may be located inside of an end portion of an idle gear in a plane perpendicular to a rotation axis of an idle gear.

In the above-described embodiment, the rotation resistance member 300 is a leaf spring; it is however to be understood that a rotation resistance member may be a coil spring and the like instead of a leaf spring. Further a rotation resistance member may be a sponge and the like that is an elastic body other than a spring. Further, a rotation resistance member may push the idle gear in a direction parallel to the rotation axis, opposite to the direction in the present embodiment. A rotation resistance member may also push an idle gear in a direction perpendicular to a rotation axis of the idle gear.

In the above-described embodiment, the photosensitive drums 50 are rotatably supported by the drawer 55; it is however to be understood that photosensitive drums may be installable in and detachable from a drawer. Specifically, an image forming apparatus may be configured to comprise at least one drum cartridge having a photosensitive drum, and the drum cartridge may be installable into and detachable from the drawer. The image forming apparatus may be configured to comprise a cartridge having both the drum cartridge and the development cartridge 60 in the above-described embodiment, and the cartridge may be installable into and detachable from the drawer.

In the above-described embedment, the image pharming apparatus 1 is a color printer that can from a color image; it is however to be understood that an image forming apparatus may be a black-and white only printer that may form only a black-and-white image. Further the image forming apparatus may be a photocopier, a multifunction printer, or the like.

Each element explained above in connection with the embodiments and modified examples may be combined where appropriate for practical implementation.

What is claimed is:

1. An image forming apparatus, comprising:

a first photosensitive drum;

a first development roller movable relative to the first photosensitive drum between a contact position in which the first development roller is in contact with the first photosensitive drum and a separate position in which the first development roller is separate from the first photosensitive drum;

a first separation cam configured to move the first development roller between the contact position and the separate position when receiving a driving force;

a fixing device comprising a heating portion and a pressure portion, the fixing device being configured to convey a sheet nipped between the heating portion and the pressure portion when receiving a driving force;

an adjusting cam configured to switch a nip pressure to be produced by the heating portion and the pressure portion between a first nip pressure and a second nip pressure higher than the first nip pressure when receiving a driving force;

a main motor;

a separation gear train configured to transmit a driving force of the main motor to the first separation cam;

a fixing gear train configured to transmit the driving force of the main motor received from the separation gear train to the fixing device; and an adjusting gear train configured to transmit the driving force of the main motor received from the separation gear train to the adjusting cam wherein the main motor is rotatable in forward and reverse directions, and wherein the first separation cam is configured to move the first development roller from the separate position to the contact position when the motor rotates in the forward direction and move the first development roller from the contact position to the separate position when the main motor rotates in the reverse direction.

2. The image forming apparatus according to claim 1, wherein the fixing gear train comprises:

an output gear configured to output the driving force of the main rotor to the fixing device; and a moving gear capable of being moved, when receiving a driving force, relative to the output gear between-a transmit position in which the moving gear is engaged with the output gear, and a disconnect position in which the moving gear is disengaged from the output gear.

3. The image forming apparatus according to claim 2, wherein the moving gear is located in the transmit position when the main motor rotates in the forward direction, and is located in the disconnect position when the main motor rotates in the reverse direction.

4. The image forming apparatus according to claim 2, further comprising an electromagnetic clutch switchable to a transmit state in which the driving force of the main motor is transmitted from the separation gear train to the adjusting gear train, and a disconnect state in which the driving force of the main motor is not transmitted from the separation gear train to the adjusting gear train.

5. The image forming apparatus according to claim 4, wherein the adjusting gear train includes a clutch connecting gear configured to rotate when the electromagnetic clutch is located in the transmit state, and wherein the clutch connecting gear rotates about an axis that is coaxial with an axis of a gear included in the separation gear train.

6. The image forming apparatus according to claim 5, wherein the first separation cam is configured to move the first development roller between the contact position and the separate position when receiving a driving force.

7. The image forming apparatus according to claim 6, further comprising:

a first development cartridge comprising the first development roller, the first development cartridge being movable relative to the first photosensitive drum between a first position in which the first development roller is located in the contact position and a second position in which the first development roller is located in the separate position; and a first cam follower configured to slide, according as the first separation cam is rotated, in a direction parallel to a rotation axis of the first separation cam between a push position in which the first cam follower pushes and causes the first development cartridge to be located in the second position and a non-push position in which the first development cartridge is located in the first position.

8. The image forming apparatus according to claim 6, wherein the moving gear is located in the transmit position when the main motor rotates in the forward direction, and is located in the disconnect position when the main motor rotates in the reverse direction.

9. The image forming apparatus according to claim 1, wherein the heating portion includes a heating roller, the pressure portion is a pressure roller, the fixing device being configured to nip a sheet between the heating roller and the pressure roller, and the fixing gear train is configured to transmit the driving force of the main motor received from the separation gear train to the heating roller.

10. The image forming apparatus according to claim 1, further comprising a process motor configured to drive the first photosensitive drum and the first development roller.

11. The image forming apparatus according to claim 1, further comprising an ejection roller configured to eject a sheet conveyed out from between the heating portion and the pressure portion, when receiving the driving force of the main motor from the fixing gear train.

12. The image forming apparatus according to claim 1, comprising:

a second photosensitive drum;

a second development roller movable relative to the second photosensitive drum between a contact position in which the second development roller is in contact with the second photosensitive drum and a separate position in which the second development roller is separate from the second photosensitive drum; and a second separation cam configured to move the second development roller between the contact position and the separate position when receiving a driving force.

13. The image forming apparatus according to claim 12, wherein the first separation cam is configured to receive a driving force to rotate and move the first development roller between the contact position and the separate position, and the second separation cam is configured to receive a driving force to rotate and move the second development roller between the contact position and the separate position, wherein the separation gear train includes:

a first separation gear train configured to transmit the driving force of the main motor to the first separation cam; and a second separation gear train configured to transmit the driving force of the main motor received from the first separation gear train to the second separation cam.

14. An image forming apparatus, comprising:

a first photosensitive drum;

a first development roller movable relative to the first photosensitive drum between a contact position in which the first development roller is separate from the first photosensitive drum;

a first separation cam configured to move the first development roller between the contact position and the separate position when receiving a driving force;

a fixing device comprising a heating portion and a pressure portion, the fixing device being configured to convey a sheet ripped between the heating portion and the pressure portion when receiving a driving force;

an adjusting cam configured to switch a nip pressure to be produced by the heating portion and the pressure portion between a first nip pressure and a second nip pressure higher than the first nip pressure when receiving a driving force;

a main motor;

a separation gear train configured to transmit a driving force of the main motor to the first separating cam;

a fixing gear train configured to transmit the driving force of the main motor received from the separation gear train to the fixing device; and an adjusting gear train configured to transmit the driving force of the main motor received from the separation gear train to the adjusting cam;

a sheet feeder mechanism configured to feed a sheet to the first photosensitive drum when receiving a driving force;

a sheet feeder gear train configured to transmit the driving force of the main motor to the sheet feeder unit; and a motor gear provided on an output shaft of the main motor, wherein the motor gear is engaged with a gear included in the separation gear train, and a gear included in the sheet feeder gear train.

15. An image forming apparatus, comprising:

a first photosensitive drum;

a first development roller movable relative to the first photosensitive drum between contact position in which the first development roller is in contact with the first photosensitive drum and a separate position in which the first development roller is separate from the first photosensitive drum;

a first separation cam configured to move the first development roller between the contact position and the separate position when receiving a driving force, a fixing device comprising a heating portion and a pressure portion, the fixing device being configured to convey a sheet nipped bot the heating portion and the pressure portion when receiving a driving force;

an adjusting cam configured to switch a nip pressure to be produced by the beating portion and the pressure portion between a first nip pressure and a second nip pressure higher than the first nip pressure when giving a driving force;

a main motor;

a separation gear train configured to it a driving force of the main motor to the first separation cam;

a fixing gear train configured to transmit the driving force of the main motor received from the separation gear train to the fixing device; and an adjusting gear train configured to transmit the driving force of the main motor received from the separate gear train to the adjusting cam;

a second photosensitive drum located downstream of the first photosensitive drum in a direction of conveyance of a sheet;

a second development roller movable relative to the second photosensitive drum between a contact position in which the second development roller is in contact with the second photosensitive drum and a separate position in which the second development roller is separate from the second photosensitive drum;

a separation mechanism including the first separation cam configured to rotate and thereby cause the first development roller to move between the contact position and the separate position, and a second separation cam configured to rotate and thereby cause the second development roller to move between the contact position and the separate position; and a controller, wherein the controller is configured to exercise control over the separation mechanism such that while the first development roller is located in the contact position, the second development roller located in the separate position is moved from the separate position to the contact position, and thereafter moved from the contact position to the separate position.

16. The image forming apparatus according to claim 15, wherein the controller exercises control over the separation mechanism such that the first development roller is moved from the separate position to the contact position, and thereafter the second development roller is moved from the separate position to the contact position, and wherein the controller exercises control over the separation mechanism such that the second development roller is moved from the contact position to the separate position, and thereafter the first development roller is moved from the contact position to the separate position.

17. The image forming apparatus according to claim 16, wherein the main motor is a motor that drives the separation mechanism and is configured rotate in forward and reverse directions, wherein when the main motor rotates in the forward direction, the controller is configured to exercise control over the separation mechanism such that the first development roller is moved from the separate position to the contact position, and thereafter the second development roller is moved from the separate position to the contact position, and wherein when the main motor rotates in the reverse direction, the controller is configured to exercise control over the separation mechanism such that the second development roller is moved from the contact position to the separate position, and thereafter the first development roller is moved from the contact position to the separate position.

18. The image forming apparatus according to claim 17, further comprising:

a first development cartridge having the first development roller being movable relative to the first photosensitive drum between a first position in which the first development roller is located in the contact position and a second position in which the first development roller is located in the separate position; and a second development cartridge having the second development roller being movable relative to the second photosensitive drum between a first position in which the second development roller is located in the contact position and a second position in which the second development roller is located in the separate position, wherein the separation mechanism includes:

a first cam follower configured to slide, according as the first separation cam is rotated, in a direction parallel to a rotation axis of the first separation cam, between a push position in which the first cam follower pushes and causes the first development cartridge to be located in the second position and a no-push position in which the first development cartridge is located in the first position; and a second cam follower configured to slide, according as the second separation cam is rotated, in a direction parallel to a rotation axis of the second separation cam, between a push position in which the second cam follower pushes and causes the second development cartridge to be located in the second position and a no-push position in which the second development cartridge is located in the first position.

* * * * *